(12) United States Patent
Tsuruoka

(10) Patent No.: US 8,035,705 B2
(45) Date of Patent: Oct. 11, 2011

(54) IMAGE PROCESSING SYSTEM, IMAGE PROCESSING METHOD, AND IMAGE PROCESSING PROGRAM PRODUCT

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 841 days.

(21) Appl. No.: 12/107,157

(22) Filed: Apr. 22, 2008

(65) Prior Publication Data

US 2008/0204577 A1    Aug. 28, 2008

Related U.S. Application Data

(63) Continuation of application No. PCT/JP2006/318967, filed on Sep. 25, 2006.

(30) Foreign Application Priority Data

Oct. 26, 2005 (JP) .................................. 2005-311704

(51) Int. Cl.
*H04N 5/208* (2006.01)
*H04N 5/217* (2006.01)
*H04N 5/21* (2006.01)
*G06K 9/40* (2006.01)

(52) U.S. Cl. ......... 348/252; 348/241; 348/625; 382/266

(58) Field of Classification Search .................. 348/241, 348/248, 252, 625; 382/266, 269
See application file for complete search history.

(56) References Cited

U.S. PATENT DOCUMENTS

| | | | |
|---|---|---|---|
| 5,606,375 A | 2/1997 | Lee | 348/606 |
| 5,715,015 A | 2/1998 | Lee | 348/629 |
| 6,628,842 B1 | 9/2003 | Nagao | 382/266 |
| 2002/0102023 A1 | 8/2002 | Yamauchi | 382/199 |
| 2003/0118246 A1 | 6/2003 | August | 382/260 |
| 2004/0027469 A1 | 2/2004 | Tsuruoka | 348/241 |
| 2004/0091145 A1 | 5/2004 | Kohashi et al. | 382/162 |
| 2005/0099515 A1 | 5/2005 | Tsuruoka | 348/241 |
| 2005/0157189 A1 | 7/2005 | Sambongi | 348/241 |
| 2006/0227227 A1 | 10/2006 | Tsuruoka | 348/241 |

FOREIGN PATENT DOCUMENTS

| | | |
|---|---|---|
| EP | 0 700 216 | 3/1996 |
| EP | 0 760 585 | 3/1997 |
| EP | 1 551 173 | 7/2005 |
| EP | 1 677 516 | 7/2006 |
| EP | 1 694 077 | 8/2006 |
| EP | 1947840 A1 * | 7/2008 |

(Continued)

OTHER PUBLICATIONS

International Preliminary Report on Patentability (PCT/IB/373), prepared for PCT/JP2006/318967, dated Apr. 29, 2008.*

(Continued)

*Primary Examiner* — David N Spector
(74) *Attorney, Agent, or Firm* — Ostrolenk Faber LLP

(57) ABSTRACT

An image processing system including: a CCD which outputs an image signal; an edge extraction unit which extracts an edge signal from the image signal; a false edge estimation unit which estimates an edge signal that arises due to noise components based upon the image signal; an edge correction unit which corrects the edge signal by performing coring processing based upon the edge signal that arises due to noise components; and an edge enhancement unit which performs enhancement processing on the image signal based upon the edge signal thus corrected.

30 Claims, 26 Drawing Sheets

FOREIGN PATENT DOCUMENTS

| | | |
|---|---|---|
| JP | 8-107565 | 4/1996 |
| JP | 9-121366 | 5/1997 |
| JP | 2003-304549 | 10/2003 |
| JP | 2004-72422 | 3/2004 |
| JP | 2004-88149 | 3/2004 |
| JP | 2004-318356 | 11/2004 |
| JP | 2005-130297 | 5/2005 |
| JP | 2005-175718 | 6/2005 |
| WO | WO 2004/019608 | 3/2004 |
| WO | WO 2005/041560 | 5/2005 |
| WO | WO 2005/057938 | 6/2005 |

OTHER PUBLICATIONS

English-language translation of Japanese Patent Application Publication JP 2004-318356A1.*

International Search Report mailed Dec. 5, 2006 in corresponding PCT International Application No. PCT/JP2006/318967.

European Search Report prepared for PCT/JP2006/318967, dated Mar. 22, 2010.

* cited by examiner

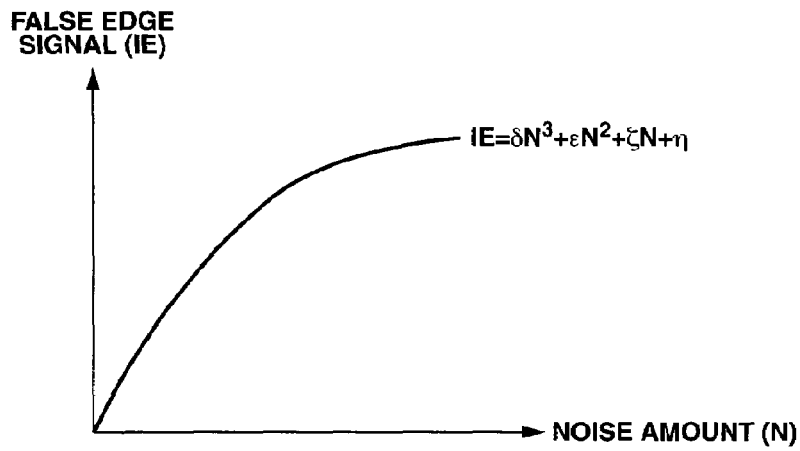
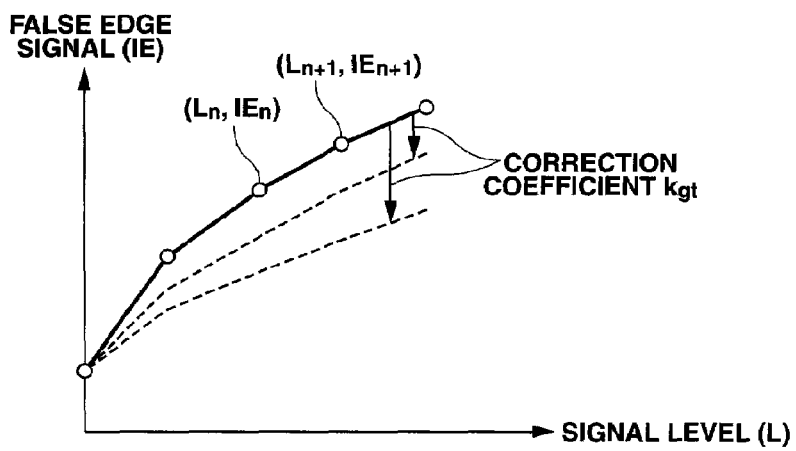

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |

| Cy00 | Ye10 | Cy20 | Ye30 | Cy40 | Ye50 |
|------|------|------|------|------|------|
| G01  | Mg11 | G21  | Mg31 | G41  | Mg51 |
| Cy02 | Ye12 | Cy22 | Ye32 | Cy42 | Ye52 |
| Mg03 | G13  | Mg23 | G33  | Mg43 | G53  |
| Cy04 | Ye14 | Cy24 | Ye34 | Cy44 | Ye54 |
| G05  | Mg15 | G25  | Mg35 | G45  | Mg55 |

FIG.37A

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |

FIG.37B

|     | G10 |     | G30 |     |
|-----|-----|-----|-----|-----|
| G01 |     | G21 |     | G41 |
|     | G12 |     | G32 |     |
| G03 |     | G23 |     | G43 |
|     | G14 |     | G34 |     |

FIG.37C

| R00 |  | R20 |  | R40 |
|-----|--|-----|--|-----|
|     |  |     |  |     |
| R02 |  | R22 |  | R42 |
|     |  |     |  |     |
| R04 |  | R24 |  | R44 |

FIG.37D

|  |  |  |  |  |
|--|--|--|--|--|
|  | B11 |  | B31 |  |
|  |  |  |  |  |
|  | B13 |  | B33 |  |
|  |  |  |  |  |

FIG.37E

| G10 |  | G30 |  | G50 |
|-----|--|-----|--|-----|
|  | G21 |  | G41 |  |
| G12 |  | G32 |  | G52 |
|  | G23 |  | G43 |  |
| G14 |  | G34 |  | G54 |

FIG.37F

|  |  |  |  |  |
|--|--|--|--|--|
|  | R20 |  | R40 |  |
|  |  |  |  |  |
|  | R22 |  | R42 |  |
|  |  |  |  |  |
|  | R24 |  | R44 |  |

FIG.37G

|  |  |  |  |  |
|--|--|--|--|--|
| B11 |  | B31 |  | B51 |
|  |  |  |  |  |
| B13 |  | B33 |  | B53 |
|  |  |  |  |  |

FIG.37H

| G01 |  | G21 |  | G41 |
|-----|--|-----|--|-----|
|  | G12 |  | G32 |  |
| G03 |  | G23 |  | G43 |
|  | G14 |  | G34 |  |
| G05 |  | G25 |  | G45 |

FIG.37I

|  |  |  |  |  |
|--|--|--|--|--|
|  |  |  |  |  |
| R02 |  | R22 |  | R42 |
|  |  |  |  |  |
| R04 |  | R24 |  | R44 |
|  |  |  |  |  |

FIG.37J

|  | B11 |  | B31 |  |
|--|-----|--|-----|--|
|  |  |  |  |  |
|  | B13 |  | B33 |  |
|  |  |  |  |  |
|  | B15 |  | B35 |  |

FIG.37K

|  | G21 |  | G41 |  |
|--|-----|--|-----|--|
| G12 |  | G32 |  | G52 |
|  | G23 |  | G43 |  |
| G14 |  | G34 |  | G54 |
|  | G25 |  | G45 |  |

FIG.37L

|  |  |  |  |  |
|--|--|--|--|--|
|  |  |  |  |  |
|  | R22 |  | R42 |  |
|  |  |  |  |  |
|  | R24 |  | R44 |  |
|  |  |  |  |  |

FIG.37M

| B11 |  | B31 |  | B51 |
|-----|--|-----|--|-----|
|  |  |  |  |  |
| B13 |  | B33 |  | B53 |
|  |  |  |  |  |
| B15 |  | B35 |  | B55 |

FIG.38A

|  | -3/4 |  | 5/4 |  |
|---|---|---|---|---|
| -3/4 |  | -5/2 |  | 5/4 |
|  | -9/2 |  | 15/2 |  |
| -3/4 |  | -5/2 |  | 5/4 |
|  | -3/4 |  | 5/4 |  |

FIG.38B

|  |  | -3/4 |  |  |
|---|---|---|---|---|
|  | -9/2 |  | 11/2 |  |
| -3/4 |  | -1 |  | 5/4 |
|  | -9/2 |  | 11/2 |  |
|  |  | -3/4 |  |  |

FIG.38C

|  | 5/4 |  | 5/4 |  |
|---|---|---|---|---|
| 5/4 |  | 15/2 |  | 5/4 |
|  | -5/2 |  | -5/2 |  |
| -3/4 |  | -9/2 |  | -3/4 |
|  | -3/4 |  | -3/4 |  |

FIG.38D

|  |  | 5/4 |  |  |
|---|---|---|---|---|
|  | 11/2 |  | 11/2 |  |
| -3/4 |  | -1 |  | -3/4 |
|  | -9/2 |  | -9/2 |  |
|  |  | -3/4 |  |  |

IMAGE PROCESSING SYSTEM, IMAGE PROCESSING METHOD, AND IMAGE PROCESSING PROGRAM PRODUCT

CROSS REFERENCE TO RELATED APPLICATION

This application is a continuation application of PCT/JP2006/318967 filed on Sep. 25, 2006 and claims benefit of Japanese Application No. 2005-311704 filed in Japan on Oct. 26, 2005, the entire contents of which are incorporated herein by this reference.

BACKGROUND OF THE INVENTION

1. Field of the Invention

The present invention relates to an image processing system, image processing method, and an image processing program product for extracting edge signals from an image signal acquired by an image pickup device.

2. Description of the Related Art

In general, digital image pickup devices such as digital cameras, digital video cameras, etc., comprise an image pickup device, an analog circuit which performs various kinds of analog processing for an analog signal outputted from the image pickup device, and an A/D converter which converts the signal outputted from the analog circuit into a digital signal.

In general, digital signals thus outputted from the A/D converter of such a digital image pickup device contain various noise components. With conventional techniques, in order to extract an edge signal from the image signal with such noise components, predetermined processing, i.e., so-called coring processing, is performed, thereby suppressing the adverse effects of such noise components.

Examples of such techniques include a technique disclosed in Japanese Unexamined Patent Application Publication No. 8-107565, in which edge components are extracted for each of the R, G, and B signals so as to perform the coring processing using predetermined noise identification reference values. Such an arrangement reduces the adverse effects of thermal noise, thereby allowing the edge components to be extracted with high precision.

Also, Japanese Unexamined Patent Application Publication No. 9-121366 discloses a technique in which determination is made whether or not the edge signal is noise based upon the correlation between the R, G, and B signals and the amplitude of the edge signal. In a case in which determination has been made that the edge signal is noise, the coring processing is performed. Such a technique suppresses the adverse effects of noise among these color signals, thereby allowing the edge components to be extracted with high precision.

Also, Japanese Unexamined Patent Application Publication No. 2005-130297 discloses a technique in which the noise component is dynamically estimated based upon the image signal so as to dynamically control the coring processing. Such an arrangement enables the edge component to be extracted with high precision regardless of dynamic fluctuation of the noise component.

Also, Japanese Unexamined Patent Application Publication No. 2005-175718 discloses a technique in which dynamic estimation of the amount of noise is performed with respect to the luminance signal and the color difference signal so as to perform high-quality noise reduction processing.

In the aforementioned technique disclosed in Japanese Unexamined Patent Application Publication No. 8-107565, the noise identification reference values are provided in the form of static values. However, the noise arising due to the image pickup device can dynamically fluctuate due to various factors such as the image signal level, the gain thereof, the temperature of the image pickup device when the image is acquired, etc. Accordingly, such a technique disclosed in this patent application Publication does not have a function of performing optimum noise estimation giving consideration to such dynamic fluctuations of these factors. In some cases, this leads to reduction in the precision of the coring processing results. Also, in the aforementioned technique disclosed in this Patent Application Publication, the edge signal is corrected based upon the noise components. However, the nature of the noise component differs from that of the edge signal. Accordingly, such a technique does not ensure high-precision correction.

In the aforementioned technique disclosed in Japanese Unexamined Patent Application Publication No. 9-121366, noise identification is performed based upon the correlation between the color signals. Accordingly, in a case in which there is little correlation between color signals in the subject image, e.g., in a case in which image pickup is performed for a subject that is almost a single color image, such a technique provides coring processing with reduced precision. This leads to a reduction in the precision of the edge component extraction. Also, in the technique disclosed in this patent application Publication, the edge signal is corrected based upon the noise components. Accordingly, for the above-described reason, such a technique has a problem of poor correction precision.

Also, in the aforementioned technique disclosed in Japanese Unexamined Patent Application Publication No. 2005-130297, the edge signal is corrected based upon the noise components. Therefore, for the above-described reason, such a technique also has a problem of poor correction precision.

On the other hand, the purpose of the aforementioned technique disclosed in Japanese Unexamined Patent Application Publication No. 2005-175718 is not to extract the edge components with high precision. However, this Patent Application Publication discloses a technique in which the noise reduction processing and the edge extraction processing are performed as mutually independent processes. Accordingly, such a technique has a problem of performing the noise reduction processing and the edge extraction processing without mutual cooperation.

The present invention has been made in view of the aforementioned problems. Accordingly, it is an object thereof to provide an image processing system, image processing method, and an image processing program product which provide a function of performing stable extraction of the edge components with high precision even if the image signal contains various kinds of noise.

Furthermore, it is another object of the present invention to provide a low-cost image processing system, image processing method, and image processing program product which are capable of acquiring high-quality image signals.

SUMMARY OF THE INVENTION

In order to achieve the aforementioned problems, an image processing system according to a first aspect of the present invention is an image processing system for processing an image signal received from an image pickup device. The image processing system comprises: edge extracting means which extracts an edge signal from the image signal; false edge estimating means which estimates an edge signal that arises due to noise components based upon the image signal;

and edge correcting means which corrects the edge signal based upon the edge signal that arises due to the noise components.

Also, an image processing method according to a second aspect of the present invention is an image processing method for processing an image signal received from an image pickup device. The method comprises: an edge extraction step for extracting an edge signal from the image signal; a false edge estimation step for estimating an edge signal that arises due to noise components based upon the image signal; and an edge correction step for correcting the edge signal based upon the edge signal that arises due to noise components.

An image processing system according to a third aspect of the present invention is an image processing system for processing an image signal received from an image pickup device. The image processing system comprises: an edge extracting unit which extracts an edge signal from the image signal; a false edge estimating unit which estimates an edge signal that arises due to noise components based upon the image signal; and an edge correcting unit which corrects the edge signal based upon the edge signal that arises due to the noise components.

An image processing program product according to a fourth aspect of the present invention is an image processing program product which allows a computer to execute processing on an image signal received from an image pickup device. The image processing program product comprises: a first module which extracts an edge signal from the image signal; a second module which estimates an edge signal that arises due to noise components based upon the image signal; and a third module which corrects the edge signal based upon the edge signal that arises due to the noise components.

BRIEF DESCRIPTION OF THE DRAWINGS

FIG. 4A and FIG. 4B are diagrams which show the structures of a horizontal edge extraction filter and a vertical edge extraction filter applicable to the 3×3 pixel target region according to the embodiment 1.

FIG. 7 is a line graph which shows the relation between the amount of noise and the false edge signal according to the embodiment 1.

FIG. 8 is a line graph for describing the edge model according to the embodiment 1.

FIG. 9 is a line graph for describing the calculation method for calculating the false edge signal based upon the edge model according to the embodiment 1.

FIG. 37A, FIG. 37B, FIG. 37C, FIG. 37D, FIG. 37E, FIG. 37F, FIG. 37G, FIG. 37H, FIG. 37I, FIG. 37J, FIG. 37K, FIG. 37L, and FIG. 37M are diagrams which show an example of a method for extracting Y/C signals from the image signal obtained from an image pickup device including a Bayer-type primary color filter mounted on the front face thereof according to the embodiment 5.

FIG. 38A, FIG. 38B, FIG. 38C, and FIG. 38D are diagrams which show the patterns of a horizontal edge extraction filter and a vertical edge extraction filter corresponding to color component of the target pixel according to the embodiment 5.

DETAILED DESCRIPTION OF THE PREFERRED EMBODIMENT(S)

Description will be made below regarding embodiments of the present invention with reference to the drawings.

Embodiment 1

Figure 1:
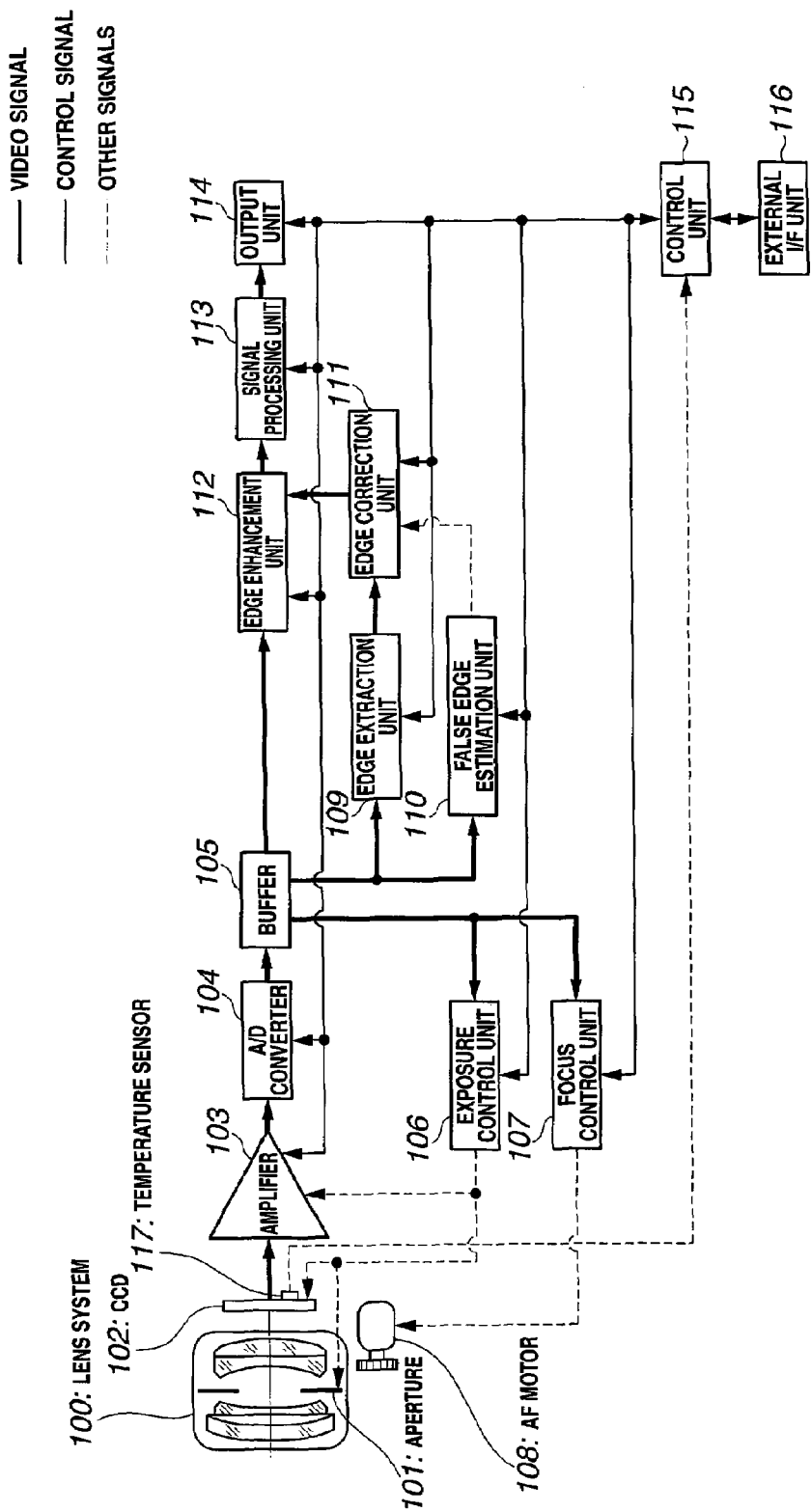
FIG. 1 is a block diagram which shows a configuration of an image processing system according to an embodiment 1 of the present invention.
Figures 2, 3:
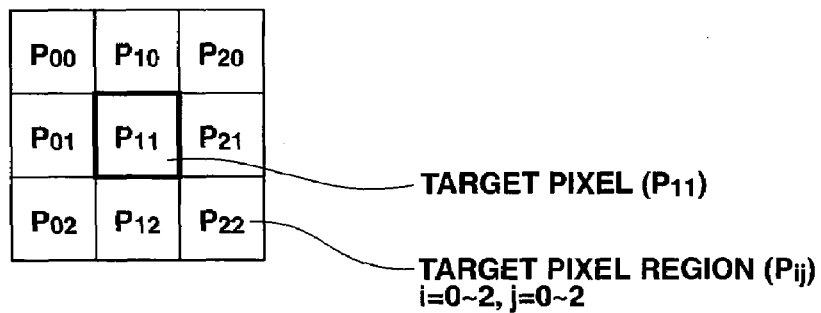
FIG. 2 is a diagram which shows a structure of a target region which is 3×3 pixels in area and which is used for edge extraction processing according to the embodiment 1.
FIG. 3 is a diagram which shows a structure of an isotropic edge extraction filter applicable to the 3×3 pixel target region, according to the embodiment 1.
Figure 5:
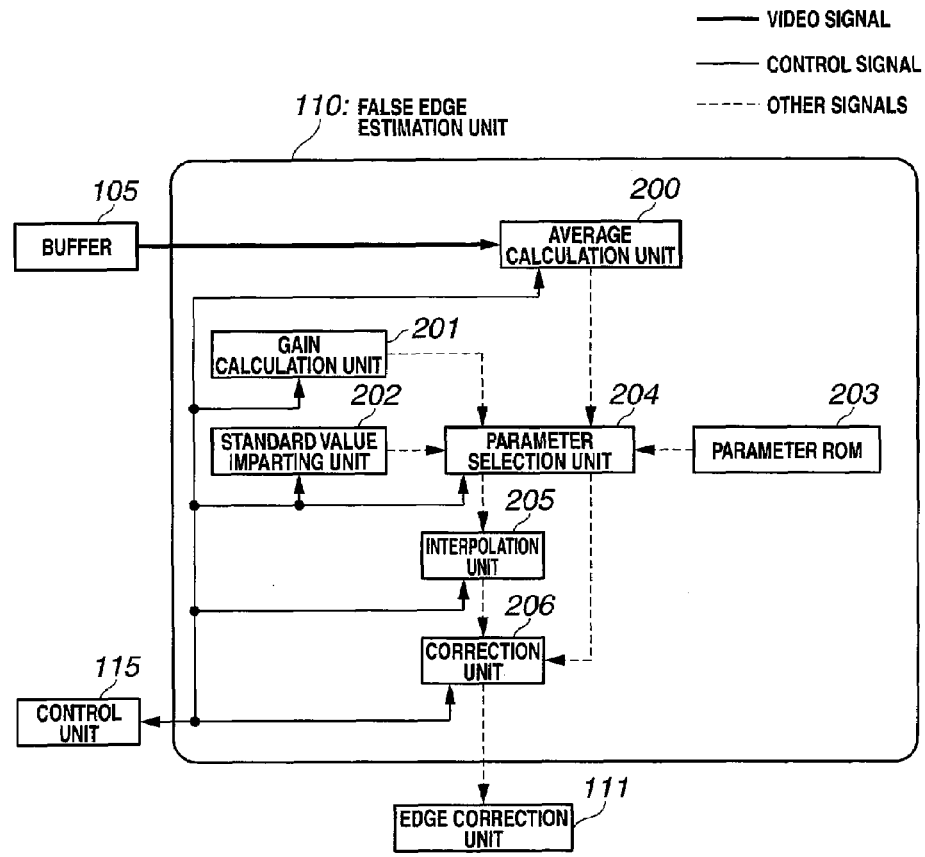
FIG. 5 is a block diagram which shows a configuration of a false edge estimation unit according to the embodiment 1.
Figure 6:
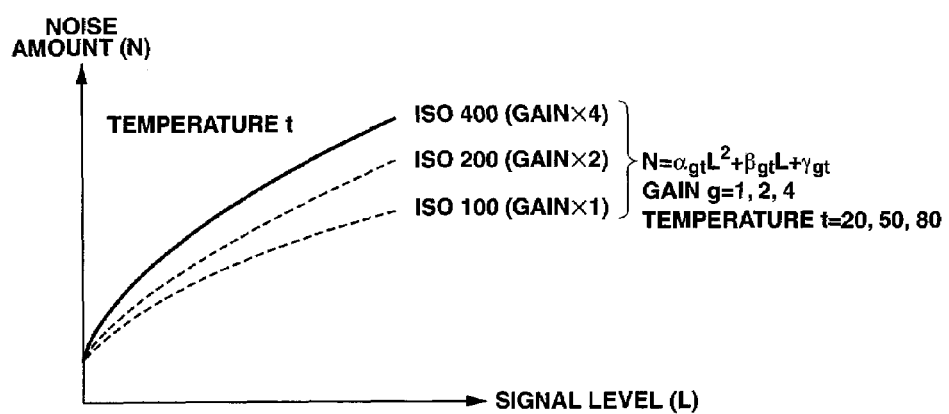
FIG. 6 is a line graph which shows the relation between the amount of noise and the signal level according to the embodiment 1.
Figure 10:
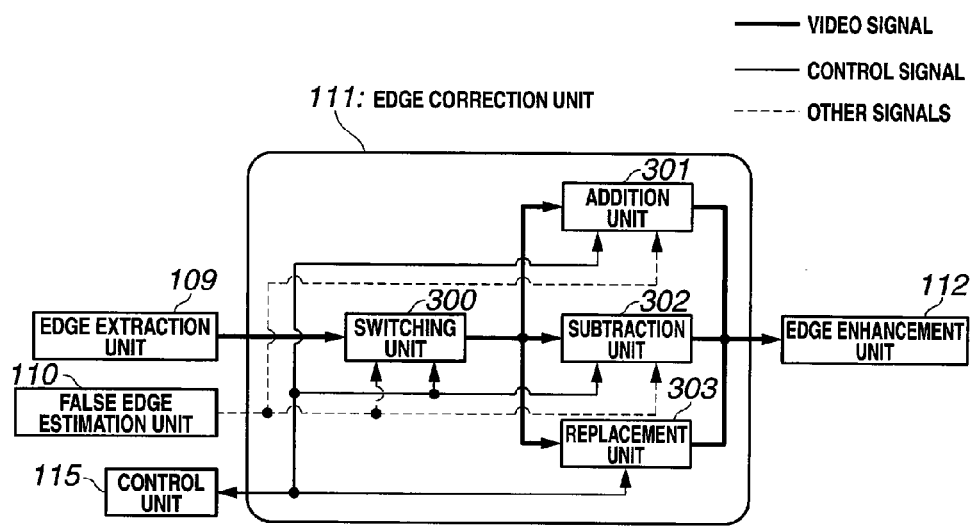
FIG. 10 is a block diagram which shows a configuration of an edge correction unit according to the embodiment 1.
Figure 11:
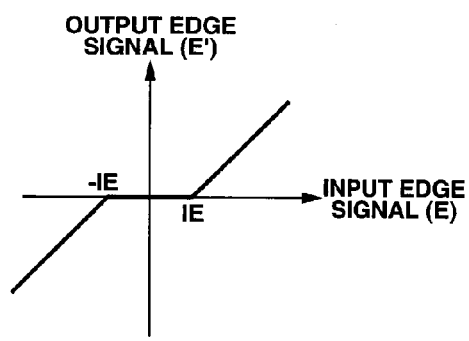
FIG. 11 is a line graph which shows the response of the coring processing performed by the edge correction unit according to the embodiment 1.
Figure 12:
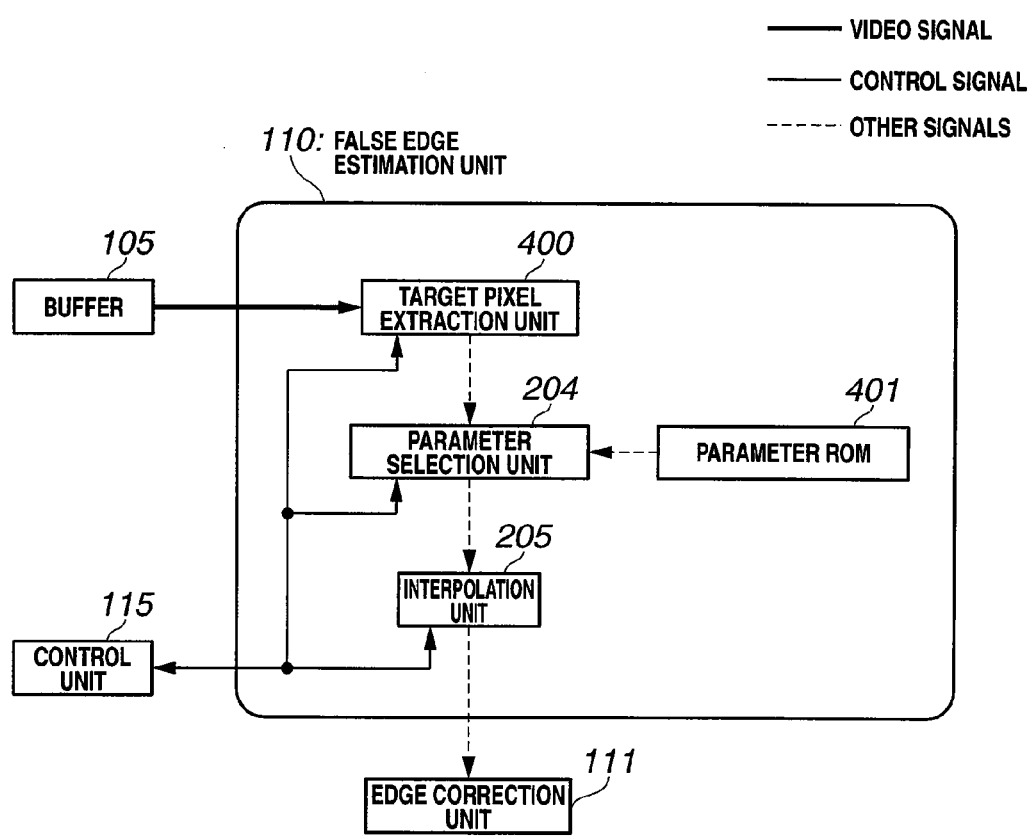
FIG. 12 is a block diagram which shows another configuration example of the false edge estimation unit according to the embodiment 1.
Figure 13:
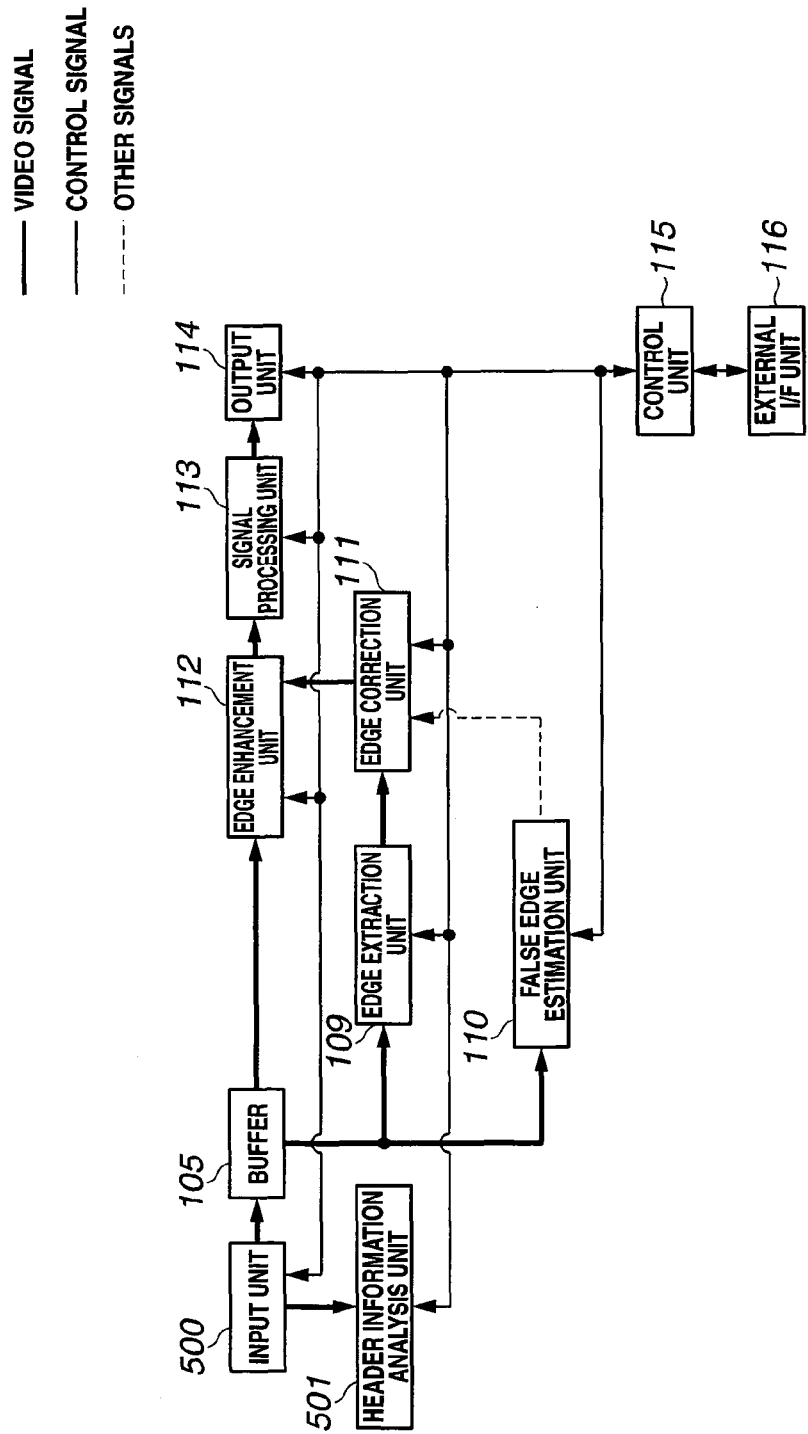
FIG. 13 is a block diagram which shows another configuration example of the image processing system according to the embodiment 1.
Figure 14:
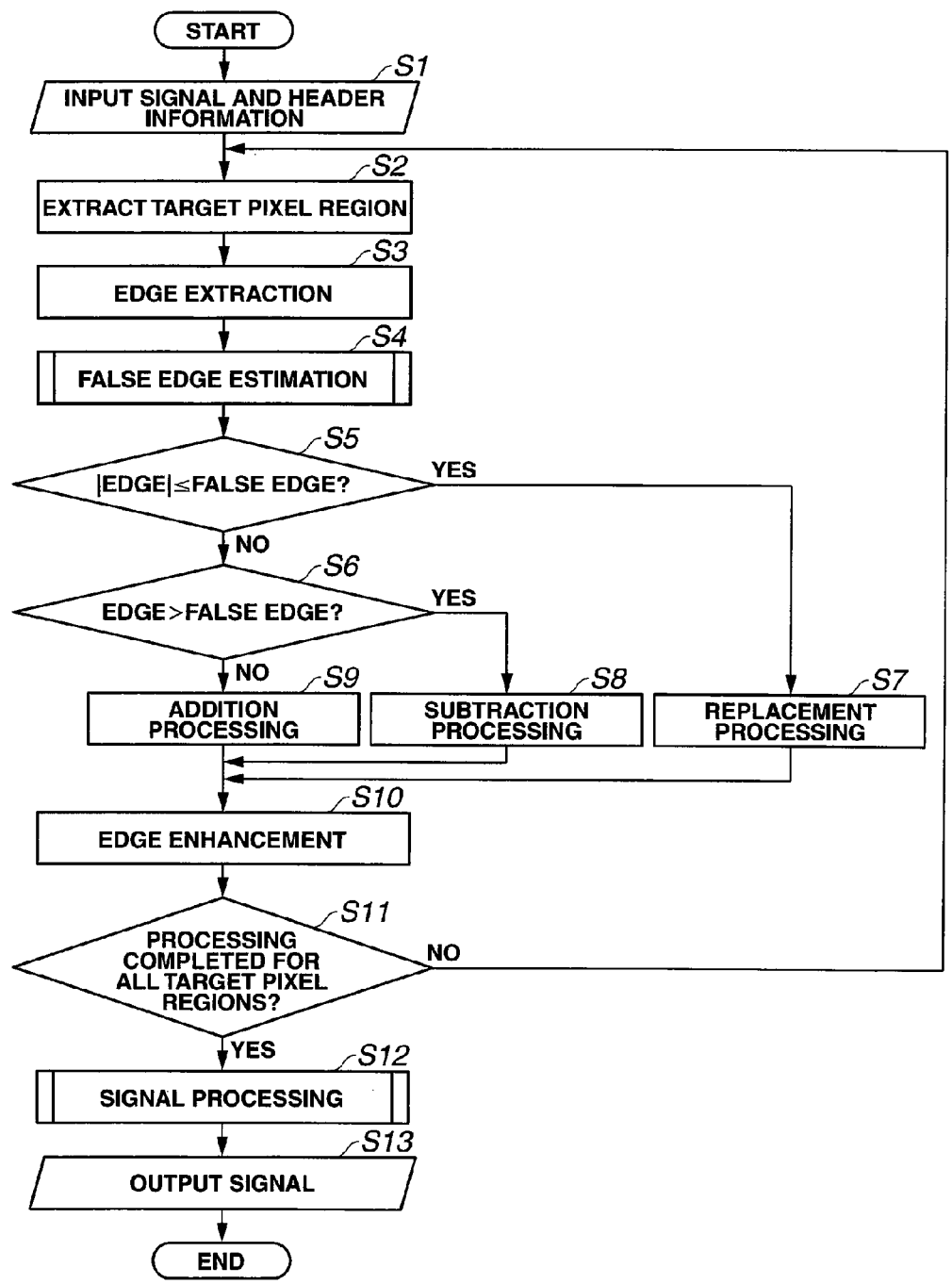
FIG. 14 is a flow chart which shows the overall flow of the signal processing performed according to an image processing program according to the embodiment 1.
Figure 15:
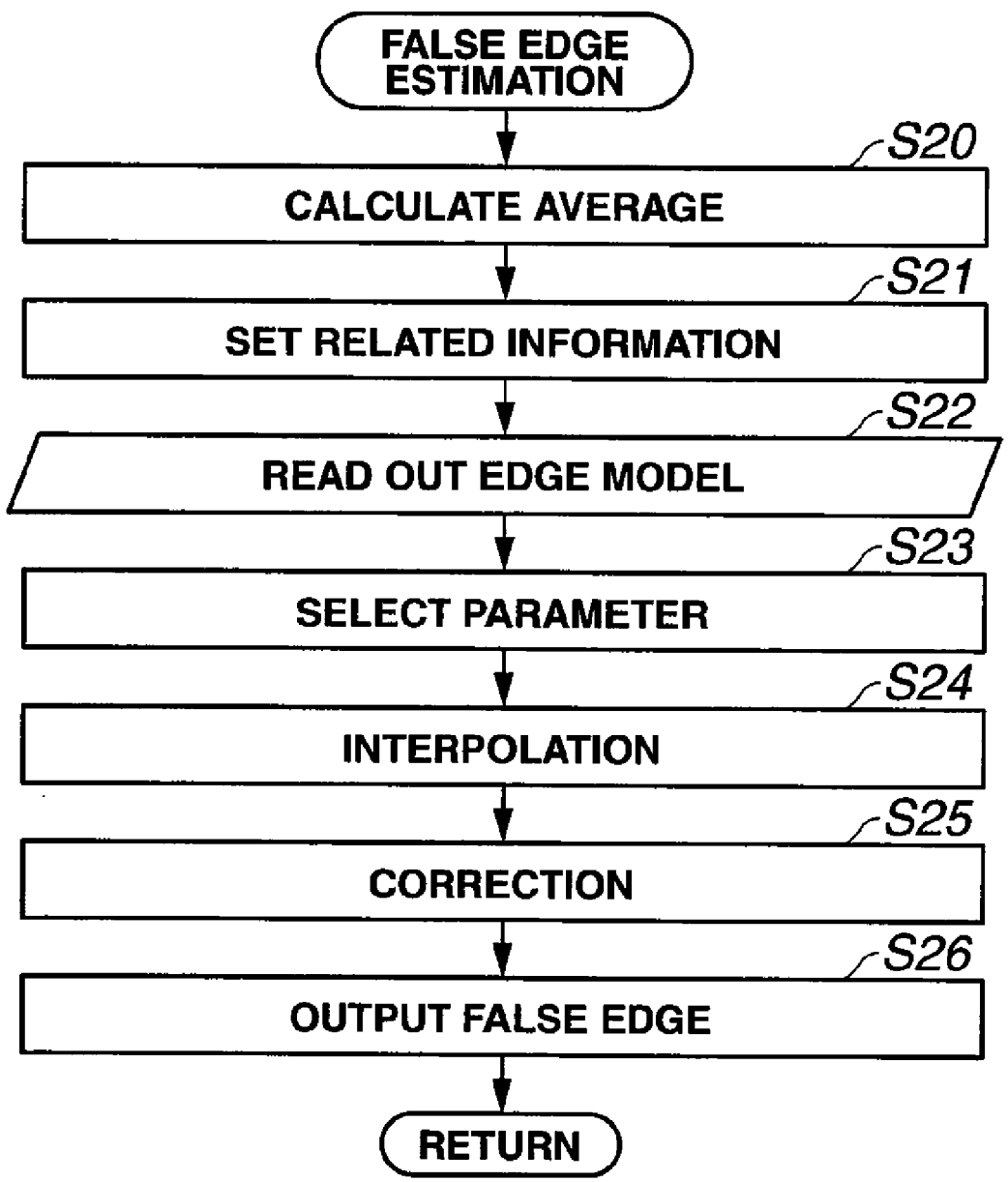
FIG. 15 is a flow chart which shows the detailed flow of the false edge estimation performed in Step S4 shown in FIG. 14.

FIG. 1 through FIG. 15 show an embodiment 1 of the present invention. FIG. 1 is a block diagram which shows a configuration of an image processing system. FIG. 2 is a diagram which shows a structure of a target region which is 3×3 pixels in area and which is used for edge extraction processing. FIG. 3 is a diagram which shows a structure of an isotropic edge extraction filter applicable to the 3×3 pixel size target region. FIG. 4A and FIG. 4B show the structures of a horizontal edge extraction filter and a vertical edge extraction filter applicable to the 3×3 pixel size target region. FIG. 5 shows a block diagram which shows a configuration of a false edge estimation unit. FIG. 6 is a line graph which shows the relation between the amount of noise and the signal level. FIG. 7 is a line graph which shows the relation between the amount of noise and the false edge signal. FIG. 8 is a line graph for describing the edge model. FIG. 9 is a line graph for describing the calculation method for calculating the false edge signal based upon the edge model. FIG. 10 is a block diagram which shows a configuration of an edge correction unit. FIG. 11 is a line graph which shows the response of the coring processing performed by the edge correction unit. FIG. 12 is a block diagram which shows another configuration example of the false edge estimation unit. FIG. 13 is a block diagram which shows another configuration example of the image processing system. FIG. 14 is a flow chart which shows the overall flow of the signal processing according to an image processing program. FIG. 15 is a flow chart which shows the detailed flow of the false edge estimation performed in Step S4 shown in FIG. 14.

First, description will be made regarding the configuration of the image processing system with reference to FIG. 1. Description will be made with reference to FIG. 1 regarding an example in which the image processing system according to the present invention is applied to a digital camera.

The image processing system includes a lens system 100, an aperture 101, a CCD 102, a temperature sensor 117, an amplifier 103, an A/D converter 104, a buffer 105, an exposure control unit 106, a focus control unit 107, an AF motor 108, an edge extraction unit 109, a false edge estimation unit 110, an edge correction unit 111, an edge enhancement unit 112, a signal processing unit 113, an output unit 114, a control unit 115, and an external I/F unit 116.

The lens system 100 forms an optical image of the subject on the image pickup surface of the CCD 102.

The aperture 101 defines the range of the aperture through which the luminous flux from the subject passes, on the basis of which the image of the subject is formed by means of the lens system 100. The aperture 101 adjusts the luminance of the optical image formed on the image pickup surface of the CCD 102.

The CCD 102 is an image pickup device which performs photoelectric conversion of the optical image thus formed, and which outputs the image in the form of an analog image signal. It should be noted that description will be made in the present embodiment regarding an arrangement employing a single monochrome CCD as the CCD 102. Here, the image pickup device is not restricted to a CCD, rather, other kinds of image pickup devices such as CMOS sensors or the like may be employed.

The temperature sensor 117 is collection means or noise estimation means, which essentially measures the temperature of the CCD 102, and outputs the temperature thus measured to the control unit 115.

The amplifier 103 amplifies the image signal outputted from the CCD 102. The gain of the amplifier 103 is set by the exposure control unit 106 under the control of the control unit 115.

The A/D converter 104 converts the analog image signal, which is outputted from the CCD 102 and which is amplified by the amplifier 103, into a digital image signal under the control of the control unit 115.

The buffer 105 temporarily stores the digital image signal outputted from the A/D converter 104.

In the pre-shooting mode, under the control of the control unit 115, the exposure control unit 106 obtains the luminance level of the image signal stored in the buffer 105, and controls the aperture value of the aperture 101, the electronic shutter speed of the CCD 102, the gain of the amplifier 103, and so forth, so as to provide an optimum exposure, giving consideration to the ISO sensitivity set beforehand, the permissible shutter speed that corresponds to the limit of image stability, etc.

In the pre-shooting mode, under the control of the control unit 115, the focus control unit 107 detects the edge magnitude in the image signal stored in the buffer 105, and controls the AF motor 108 such that the edge magnitude thus detected exhibits the maximum value, thereby acquiring a focused image signal.

The AF motor 108 is a driving source which drives an AF lens included within the lens system 100 under the control of the focus control unit 107.

The edge extraction unit 109 is edge extraction means which sequentially extracts a 3×3 pixel size target region as shown in FIG. 2 from the image signal stored in the buffer 105, and extracts the edge signal E for the target pixel using an edge extraction filter as shown in FIG. 3, for example, under the control of the control unit 115 in the real shooting mode.

The false edge estimation unit 110 is false edge estimating means which sequentially extracts the same 3×3 pixel size target region as that processed by the edge extraction unit 109 from the image signal stored in the buffer 105, and estimates the false edge signal IE that arises due to noise components for the target pixel $P_{11}$, under the control of the control unit 115 in the real shooting mode.

The edge correction unit 111 is edge correction means which performs coring processing for the edge signal E extracted by the edge extraction unit 109 using the false edge signal IE received from the false edge estimation unit 110 under the control unit 115.

The edge enhancement unit 112 is edge enhancement means which sequentially extracts the target pixel $P_{11}$ contained in the same 3×3 pixel size region as that processed by the edge extraction unit 109, and performs edge enhancement processing under the control of the control unit 115 using the edge signal E' subjected to the coring processing by the edge correction unit 111.

Under the control of the control unit 115, the signal processing unit 113 performs known compression processing etc., for the edge-enhanced image signal outputted from the edge enhancement unit 112, and outputs the signal thus processed to the output unit 114.

The output unit 114 stores the image signal outputted from the signal processing unit 113 in a storage medium such as a memory card or the like.

The control unit 115 comprises a microcomputer or the like, for example. The control unit 115 is connected to the amplifier 103, the A/D converter 104, the exposure control unit 106, the focus control unit 107, the edge extraction unit 109, the false edge estimation unit 110, the edge correction unit 111, the edge enhancement unit 112, the signal processing unit 113, the output unit 114, and the external I/F unit 116, in a bidirectional manner, thereby providing control means which controls the overall operation of the digital camera including these components. The control unit 115 is configured such that it receives a signal from the temperature sensor 117 disposed near the CCD 102. The control unit 115 serves as collection means, noise estimation means, and gain calculation means.

The external I/F unit 116 is an interface which allows the user to perform input operations and so forth, for the digital camera employing this image processing system. The external I/F unit 116 includes a power supply switch which allows the user to turn the power supply on and off, a shutter button which allows the user to start the shooting operation, a mode switching button which allows the user to switch the current mode to one from among various kinds of modes such as the image shooting mode, etc. Specifically, the external I/F unit 116 allows the user to input an instruction to start the pre-shooting operation by half pressing a two-stage shutter button, and to input an instruction to start the real shooting operation by full pressing this shutter button. Furthermore, with such an arrangement, the user can adjust the settings of the ISO sensitivity etc., through the external I/F unit 116. The external I/F unit 116 outputs the information thus inputted to the control unit 115.

Next, description will be made regarding the operation of the digital camera as shown in FIG. 1 with reference to the flow of the image signal.

Before the shooting operation, the user sets the shooting conditions such as the ISO sensitivity etc., beforehand through the external I/F unit 116.

Subsequently, when the user half-presses the shutter button provided in the external I/F unit 116 in the form of a two-step switch, the digital camera enters the pre-shooting mode.

Then, the CCD 102 performs photoelectric conversion of the image of the subject formed through the lens system 100 and the aperture 101, thereby outputting the subject image in the form of an analog image signal.

The analog image signal is amplified by the amplifier 103 giving consideration to the ISO sensitivity, following which the analog image signal is converted by the A/D converter 104 into a digital image signal, which is stored in the buffer 105.

The image signal thus stored in the buffer 105 is transmitted to the exposure control unit 106 and the focus control unit 107.

The exposure control unit 106 controls the aperture value of the aperture 101, the electronic shutter speed of the CCD 102, the gain of the amplifier 103, etc., based upon the image signal so as to obtain an appropriate exposure, as described above.

The focus control unit 107 detects the edge magnitude based upon the image signal, as described above. The focus control unit 107 controls the AF motor 108 such that the edge magnitude thus detected exhibits the maximum value, thereby obtaining a focused signal.

After the focus adjustment and the exposure adjustment thus performed, when the user full-presses the shutter button provided in the external I/F unit 116 in the form of a two-step switch, the digital camera enters the real shooting mode.

Then, like the pre-shooting operation, the image signal is transmitted to the buffer 105. In the real shooting operation, the image is acquired under the exposure conditions obtained by the exposure control unit 106 and the focus conditions obtained by the focus control unit 107. These shooting conditions are transmitted to the control unit 115.

The image signal stored in the buffer 105, which was acquired in the real shooting operation, is transmitted to the edge extraction unit 109, the false edge estimation unit 110, and the edge enhancement unit 112.

Under the control of the control unit 115, the edge extraction unit 109 sequentially extracts the 3×3 pixel size target region $P_{ij}$ (i=0 to 2, j=0 to 2) including the target pixel $P_{11}$ as shown in FIG. 2, and extracts the edge signal E for the target pixel $P_{11}$ using an edge extraction filter as shown in FIG. 3. The edge filter shown in FIG. 3 is an example of an isotropic edge extraction filter. It should be noted that the edge extraction filter thus employed is not restricted to such an isotropic edge extraction filter shown in FIG. 3. For example, an arrangement may be made in which a horizontal-direction edge extraction filter Eh as shown in FIG. 4A and a vertical-direction edge extraction filter Ev as shown in FIG. 4B are separately applied, following which the edge signal E is calculated using the following Expression 1.

$$E = \sqrt{E_h^2 + E_v^2}$$ [Expression 1]

It is needless to say that other known edge extraction methods may be employed, instead of the aforementioned edge extraction filters. Subsequently, the edge extraction unit 109 transmits the edge signal E thus extracted to the edge correction unit 111.

Under the control of the control unit 115, the false edge estimation unit 110 sequentially extracts the same 3×3 pixel size target region $P_{ij}$ as that processed by the edge extraction unit 109 so as to estimate the false edge signal IE that arises due to the noise components of the target pixel $P_{11}$. Then, the false edge estimation unit 110 transmits the false edge signal IE that arises due to the noise component, which has been thus estimated, to the edge correction unit 111.

Under the control of the control unit 115, the edge correction unit 111 performs coring processing for the edge signal E received from the edge extraction unit 109 using the false edge signal IE received from the false edge estimation unit 110. The edge correction unit 111 transmits the edge signal E' thus subjected to the coring processing to the edge enhancement unit 112.

Under the control of the control unit 115, the edge enhancement unit 112 sequentially extracts the target pixel $P_{11}$ included in the same 3×3 pixel size pixel region as that processed by the edge extraction unit 109 so as to perform edge enhancement processing according to the following Expression 2 using the edge signal E' thus subjected to the coring processing by the edge correction unit 111.

$$P_{11}' = P_{11} + g \cdot E'$$ [Expression 2]

Note that the reference symbol g in the Expression 2 represents a predetermined gain value, which is set to a value ranging from 0.5 to 4.0, for example. Then, the edge enhancement unit 112 transmits the image signal thus subjected to the edge enhancement processing to the signal processing unit 113.

Here, the aforementioned processing steps performed by the edge extraction unit 109, the false edge estimation unit 110, the edge correction unit 111, and the edge enhancement unit 112 are synchronously performed in increments of the 3×3 pixel size pixel region $P_{ij}$ under the control of the control unit 115. With such an arrangement, in order to perform the processing for all the image signals (in order to perform the processing for all the pixels as the target pixels), each 3×3 pixel size pixel region as shown in FIG. 2 is set to be the target pixel region, having two rows or columns that overlap with the adjacent target pixel region. That is to say, the current pixel region is set so as to be shifted by one row or one column from the previous pixel region.

Under the control of the control unit 115, the signal processing unit 113 performs known compression processing for the image signal which has been subjected to the edge enhancement processing and which has been outputted from the edge enhancement unit 112, as described above. The signal processing unit 113 transmits the image signal thus processed to the output unit 114.

The output unit 114 stores the image signal outputted from the signal processing unit 113 in a storage medium such as a memory card.

Next, description will be made regarding an example of the configuration of the false edge estimation unit 110 with reference to FIG. 5.

The false edge estimation unit 110 includes an average calculation unit 200, a gain calculation unit 201 which serves as collection means and gain calculation means, a standard value imparting unit 202 which is imparting means, a parameter ROM 203 which is storage means, a parameter selection unit 204 which is parameter selecting means, and an interpolation unit 205 which is interpolating means, and a correction unit 206 which is interpolating means.

With such an arrangement, the buffer 105 is connected to the average calculation unit 200. Furthermore, the average calculation unit 200 is connected to the parameter selection unit 204. Each of the gain calculation unit 201, the standard value imparting unit 202, and the parameter ROM 203 is connected to the parameter selection unit 204. The parameter selection unit 204 is connected to the interpolation unit 205 and the correction unit 206. The interpolation unit 205 is connected to the edge correction unit 111 via the correction unit 206.

Furthermore, the control unit 115 is connected in a bidirectional manner to the average calculation unit 200, the gain calculation unit 201, the standard value imparting unit 202, the parameter selection unit 204, the interpolation unit 205, and the correction unit 206, thereby controlling these components.

Next, description will be made regarding the operation of the false edge estimation unit 110 having such a configuration.

Under the control of the control unit 115, the average calculation unit 200 reads out from the buffer 105 the image signal of the target pixel region $P_{ij}$ of interest as shown in FIG. 2, and calculates the average value AV of the image signal of the target pixel region $P_{ij}$ according to the following Expression 3.

$$AV = \frac{1}{9} \sum_{i=0,2} \sum_{j=0,2} P_{ij} \qquad \text{[Expression 3]}$$

Then, the average calculation unit 200 transmits the average value AV thus calculated to the parameter selection unit 204.

The gain calculation unit 201 obtains the gain with regard to the amplifier 103 based upon at least one of the ISO sensitivity and the exposure conditions information transmitted from the control unit 115. The gain calculation unit 201 transmits the gain thus obtained to the parameter selection unit 204.

Furthermore, the control unit 115 acquires the temperature information with respect to the CCD 102 from the temperature sensor 117, and transmits the temperature information thus acquired to the parameter selection unit 204.

The parameter selection unit 204, the interpolation unit 205, and the correction unit 206 estimate the false edge signal IE that arises due to the noise components based upon the average value of the target pixel region received from the average calculation unit 200, the gain information received from the gain calculation unit 201, and the temperature information received from the control unit 115.

Now, description will be made regarding the estimation of the false edge signal IE with reference to FIG. 6 through FIG. 9.

First, the relation between the signal level L and the amount of noise N is plotted in FIG. 6. The amount of noise N has a tendency to increase according to an increase in the signal level L as shown in the drawing. Specifically, the amount of noise increases according to an increase in the signal level L in a quadratic curve manner. If the increase in the amount of noise N as shown in FIG. 6 is approximated by a quadratic function, as disclosed in Japanese Unexamined Patent Application Publication No. 2005-175718, then the increase in the amount of noise N is represented by the following Expression 4.

$$N = \alpha L^2 + \beta L + \gamma \qquad \text{[Expression 4]}$$

Here, the reference symbols α, β, and γ represent constant terms.

However, the amount of noise N changes not only according to the change in the signal level L, but also according to the change in the temperature of the image pickup device and the change in the gain of the image signal. For example, FIG. 6 is a graph in which the amount of noise N is plotted at a certain temperature t with respect to three kinds of ISO sensitivities, i.e., ISO 100 (gain=×1), ISO 200 (gain=×2), and ISO 400 (gain=×4).

Each of the curves shown in FIG. 6 can be approximated by the Expression 4. However, the coefficients change according to the change in the ISO sensitivity that corresponds to the gain. Also, the amount of noise N changes according to the change in the temperature of the image pickup device, which is not shown. In general, the amount of noise N increases according to an increase in the temperature of the image pickup device (Note that examples at temperatures of 20° C., 50° C., and 80° C., are shown).

Accordingly, the noise model is formed giving consideration to the aforementioned dependence of the amount of noise on the gain g and the temperature t. Specifically, the amount of noise N is represented by the following Expression 5.

$$N = \alpha_{gt} L^2 + \beta_{gt} L + \gamma_{gt} \qquad \text{[Expression 5]}$$

Here, the reference symbols $\alpha_{gt}$, $\beta_{gt}$, and $\gamma_{gt}$ represent constant terms depending upon the gain g and the temperature t.

FIG. 7 is a graph in which the false edge signal IE that arises due to the noise components is plotted. The false edge signal IE shown in FIG. 7 is obtained as follows: first, the amount of noise N is added to the image signal in a flat region; then, an edge extraction filter as shown in FIG. 3 or FIG. 4A and FIG. 4B is applied to the image signal thus subjected to the noise addition, thereby obtaining the false edge signal IE.

The false edge signal IE has a tendency to increase according to an increase in the amount of noise N, as shown in the drawing. Specifically, the false edge signal IE increases in a cubic curve manner according to an increase in the amount of noise. If the increase in the false edge signal IE as shown in FIG. 7 is approximated by a cubic function, then the increase in the false edge signal IE is represented by the following Expression 6.

$$IE = \delta N^3 + \epsilon N^2 + \xi N + \eta \qquad \text{[Expression 6]}$$

Here, the reference symbols $\delta$, $\epsilon$, $\xi$, and $\eta$ represent constant terms, which are uniquely determined after the edge extraction filter has been determined.

An edge model can be formed by making a combination of the aforementioned Expression 5 and Expression 6, thereby providing in the form of an expression the relation between the signal level L and the false edge signal IE that arises due to the noise component.

An arrangement may be made in which multiple edge model functions are stored, and the false edge signal is calculated for each case. However, such an arrangement imposes a large processing load. In order to solve this problem, the present embodiment employs a simplified edge model as shown in FIG. 8. That is to say, in the simplified model as shown in FIG. 8, a function which provides the maximum edge signals is employed as a base edge model. Furthermore, the base edge model thus employed is approximated by a line graph having a predetermined number of inflection points. Here, each inflection point of the line graph is represented by coordinate data $(L_n, IE_n)$ which is consisted of the signal level L and the false edge signal IE. Note that the reference symbol n represents the index number of each inflection point. Furthermore, a correction coefficient $k_{gt}$ is prepared for introducing other edge models from the aforementioned base edge model. The correction coefficient $k_{gt}$ is calculated based upon each edge model and the base edge model using a least squares method. With such an arrangement, the base edge model is multiplied by the correction coefficient $k_{gt}$ thus calculated, thereby introducing each of the other edge models.

Description will be made with reference to FIG. 9 regarding a method for calculating the false edge signal based upon the simplified edge model as shown in FIG. 8.

Let us consider a case in which a false edge signal IE is obtained that corresponds to a given signal level l, gain g, and given temperature t, for example. First, the section of the base edge model to which the signal level l belongs is searched. Here, let us say that the signal level l belongs to the section between the inflection points $(L_n, IE_n)$ and $(L_{n+1}, IE_{n+1})$. In this case, the base false edge signal $IE_1$ according to the base edge model is obtained using a linear interpolation according to the following Expression 7.

$$IE_l = \frac{IE_{n+1} - IE_n}{L_{n+1} - L_n}(l - L_n) + IE_n \qquad \text{[Expression 7]}$$

Next, the base false edge signal $IE_1$ thus obtained is multiplied by the correction coefficient $k_{gt}$ according to the following Expression 8, thereby obtaining the false edge signal IE.

$$IE = k_{gt} \cdot IE_1 \qquad \text{[Expression 8]}$$

Returning to description with reference to FIG. 5, the coordinate data $(L_n, IE_n)$ and the correction coefficient $k_{gt}$ are stored in the parameter ROM 203.

The parameter selection unit 204 sets the signal level l based upon the average value AV of the target region calculated by the average calculation unit 200. Furthermore, the parameter selection unit 204 sets the gain g based upon the gain information from the gain calculation unit 201. Moreover, the parameter selection unit 204 sets the temperature t based upon the temperature information received from the control unit 115.

Next, the parameter selection unit 204 searches the parameter ROM 203 for the coordinate data $(L_n, IE_n)$ and $(L_{n+1}, IE_{n+1})$ that represent the section to which the signal level l belongs. The parameter selection unit 204 transmits the coordinate data thus obtained to the interpolation unit 205. Furthermore, the parameter selection unit 204 searches the parameter ROM 203 for the correction coefficient $k_{gt}$, and transmits the correction coefficient $k_{gt}$ thus acquired to the correction unit 206.

Under the control of the control unit 115, the interpolation unit 205 calculates the base false edge signal $IE_1$ according to the base edge model based on the Expression 7 using the signal level l received from the parameter selection unit 204 and the coordinate data $(L_n, IE_n)$ and $(L_{n+1}, IE_{n+1})$ that represent the section to which the signal level l belongs. The base false edge signal $IE_1$ thus obtained is transmitted to the correction unit 206.

Under the control of the control unit 115, the correction unit 206 calculates the false edge signal IE using the correction coefficient $k_{gt}$ received from the parameter selection unit 204 and the base false edge signal $IE_1$ received from the interpolation unit 205 according to the Expression 8. The false edge signal IE thus calculated is used as the false edge signal IE of the target pixel $P_{11}$. The correction unit 206 transmits the false edge signal IE thus estimated to the edge correction unit 111.

It should be noted that, in the aforementioned step for calculating the false edge signal, it is not indispensable to acquire the information such as the temperature t and the gain g every time an image is acquired. That is to say, an arrangement may be made in which given information is stored in the standard value imparting unit 202, and the aforementioned calculation step is omitted. Such an arrangement provides high-speed processing and allows the power consumption to be reduced.

Next, description will be made regarding an example of the configuration of the edge correction unit 111 with reference to FIG. 10.

The edge correction unit 111 includes a switching unit 300, an addition unit 301 which is coring means, subtraction unit 302 which is another coring means, and a replacement unit 303 which is yet another coring means.

The edge extraction unit 109 is connected to the switching unit 300. The switching unit 300 is connected to each of the addition unit 301, the subtraction unit 302, and the replacement unit 303. Each of the addition unit 301, the subtraction unit 302, and the replacement unit 303 is connected to the edge enhancement unit 112. Furthermore, the false edge estimation unit 110 is connected to each of the switching unit 300, the addition unit 301, and the subtraction unit 302.

The control unit 115 is connected in a bidirectional manner to the switching unit 300, the addition unit 301, the subtraction unit 302, and the replacement unit 303, thereby controlling these components.

Next, description will be made regarding the operation of the edge correction unit 111 having such a configuration.

Under the control of the control unit 115, the switching unit 300 reads out from the edge extraction unit 109 the edge signal E that corresponds to the target pixel $P_{11}$, and reads out from the false edge estimation unit 110 the false edge signal IE that corresponds to the target pixel $P_{11}$.

Subsequently, in a case of –IE>E, the switching unit 300 transmits the edge signal E to the addition unit 301. In a case of E>IE, the switching unit 300 transmits the edge signal E to the subtraction unit 302. In a case of IE≧E≧–IE, the switching unit 300 transmits the edge signal E to the replacement unit 303.

When the addition unit 301 receives the edge signal E transmitted from the switching unit 300, under the control of the control unit 115, the addition unit 301 reads out the false edge signal IE from the false edge estimation unit 110, corrects the edge signal E by adding the false edge signal IE to the edge signal E, and transmits the edge signal E' thus corrected to the edge enhancement unit 112.

When the subtraction unit 302 receives the edge signal E transmitted from the switching unit 300, under the control of the control unit 115, the subtraction unit 302 reads out the false edge signal IE from the false edge estimation unit 110, corrects the edge signal E by subtracting the false edge signal IE from the edge signal E, and transmits the edge signal E' thus corrected to the edge enhancement unit 112.

When the replacement unit 303 receives the edge signal E transmitted from the switching unit 300, under the control of the control unit 115, the replacement unit 303 corrects the edge signal E by replacing the edge signal E by 0, and transmits the edge signal E' thus corrected to the edge enhancement unit 112.

Such three-pattern processing is represented by the following Expression 9.

$$E' = \begin{cases} E + IE & (-IE > E) \\ E - IE & (E > IE) \\ 0 & (IE \geq E \geq -IE) \end{cases} \quad \text{[Expression 9]}$$

FIG. 11 shows a curve according to the Expression 9 which represents such properties. Such an arrangement provides coring processing in which, in a case in which the absolute value of the input edge signal E is equal to or smaller than the false edge signal IE, the output edge signal E' is set to 0.

Description has been made above regarding an arrangement in which the edge signal that arises due to the noise components is estimated using related information such as the temperature of the image pickup device, the ISO sensitivity, exposure information, etc. However, the present invention is not restricted to such an arrangement. For example, an arrangement may be made in which the edge signal that arises due to the noise components is estimated based upon the signal level alone, as shown in FIG. 12.

FIG. 12 shows generally the same configuration as that shown in FIG. 5, except that the gain calculation unit 201, the standard value imparting unit 202, and the correction unit 206 are not included, and the average calculation unit 200 and the parameter ROM 203 are replaced by a target pixel extraction unit 400 and a parameter ROM 401 which is storage means. The other basic components of the false edge estimation unit 110 shown in FIG. 12 are the same as those shown in FIG. 5. Accordingly, the same components are denoted by the same reference numerals, and description thereof will be omitted as appropriate. Description will be mainly made only regarding the different components.

The buffer 105 is connected to the target pixel extraction unit 400. The target pixel extraction unit 400 is connected to the parameter selection unit 204. The parameter ROM 401 is connected to the parameter selection unit 204. The parameter selection unit 204 is connected to the interpolation unit 205. The interpolation unit 205 is connected to the edge correction unit 111.

Furthermore, the control unit 115 is also connected in a bidirectional manner to the target pixel extraction unit 400, thereby controlling the target pixel extraction unit 400.

Under the control of the control unit 115, the target pixel extraction unit 400 reads out the target pixel $P_{11}$ as shown in FIG. 2 from the buffer 105, and transmits the target pixel $P_{11}$ thus read out to the parameter selection unit 204.

The parameter selection unit 204 and the interpolation unit 205 estimate the false edge signal IE that arises due to the noise components based upon the signal level of the target pixel $P_{11}$ received from the target pixel extraction unit 400.

That is to say, the parameter ROM 401 stores only the coordinate data ($L_n$, $IE_n$) which represents the inflection points of a single edge model that corresponds to a predetermined temperature and a predetermined gain value as shown in FIG. 8. Description will be made below regarding an arrangement in which the edge model thus stored is used as a base edge model.

The parameter selection unit 204 searches the parameter ROM 401 for the coordinate data ($L_n$, $IE_n$) and ($L_{n+1}$, $IE_{n+1}$) that represent the section to which the signal level 1 of the target pixel $P_{11}$ belongs. The parameter selection unit 204 transmits the coordinate data thus obtained to the interpolation unit 205.

Under the control of the control unit 115, the interpolation unit 205 calculates the base false edge signal $IE_1$ according to the base edge model based on the Expression 7 using the signal level 1 received from the parameter selection unit 204 and the coordinate data ($L_n$, $IE_n$) and ($L_{n+1}$, $IE_{n+1}$) that represent the interval to which the signal level 1 belongs. The base false edge signal $IE_1$ thus calculated is transmitted to the edge correction unit 111 as the false edge signal IE.

Such an arrangement as shown in FIG. 12 provides a simplified configuration for estimating the edge signal that arises due to the noise components, thereby providing a low-cost image processing system.

Description has been made above regarding an arrangement applied to a digital camera as an image processing system. Accordingly, the image processing system integrally comprises an image pickup unit including the lens system 100, the aperture 101, the CCD 102, the temperature sensor 117, the amplifier 103, the A/D converter 104, the exposure control unit 106, the focus control unit 107, and the AF motor 108.

However, the image processing system is not restricted to such an arrangement. For example, an arrangement may be made in which the image pickup unit is provided in the form of a separate unit, as shown in FIG. 13. That is to say, with the image processing system shown in FIG. 13, an image is acquired by an image pickup unit provided in the form of a separate unit, and the image signal thus acquired is stored in a storage medium such as a memory card or the like in the form of unprocessed raw data. Then, the image signal is read out from the storage medium, and the image signal thus read out is processed. It should be noted that the related information, e.g., the shooting conditions with respect to the image signal, are stored in the storage medium in the form of a header or the like. Note that the transmission of the various kinds of information from the separate image pickup unit to the image processing system is not restricted to such an arrangement in which the various kinds of information are transmitted via such a storage medium. Also, such information may be transmitted via a communication line or the like.

The image processing system shown in FIG. 13 has generally the same configuration as that of the image processing system shown in FIG. 1, except that the lens system 100, the aperture 101, the CCD 102, the temperature sensor 117, the amplifier 103, the A/D converter 104, the exposure control unit 106, the focus control unit 107, and the AF motor 108 are not included, and an input unit 500 and a header information analysis unit 501 are further included. The other basic components of the image processing system shown in FIG. 13 are the same as those shown in FIG. 1. Accordingly, the same components are denoted by the same reference numerals, and description thereof will be omitted as appropriate. Description will be mainly made only regarding the different components.

The input unit 500 is connected to each of the buffer 105 and the header information analysis unit 501. Furthermore, the control unit 115 is connected in a bidirectional manner to the input unit 500 and the header analysis unit 501, thereby controlling these components.

Next, description will be made below regarding the difference in operation of the image processing system shown in FIG. 13.

For example, when the processing operation is started via the external I/F unit 116, such as a mouse, keyboard, etc., the image signal and the header information stored in the storage medium, such as a memory card or the like, is read out via the input unit 500.

Of the information read out via the input unit 500, the image signal is transmitted to the buffer 105, and the header information is transmitted to the header information analysis unit 501.

The header information analysis unit 501 extracts the information (i.e., the aforementioned exposure conditions, ISO sensitivity, the temperature of the image pickup device, etc.) in the image shooting operation based upon the header information transmitted from the input unit 500, and transmits the information thus extracted to the control unit 115.

The subsequent processing is the same as that of the image processing system shown in FIG. 1.

Description has been made regarding an arrangement in which the processing is performed by means of hardware. However, the present invention is not restricted to such an arrangement. Also, an arrangement may be made in which the image signal received from the CCD 102 is stored in a storage medium such as a memory card or the like in the form of unprocessed raw data, and the related information such as the shooting conditions (e.g., the temperature, the gain, etc., of the image pickup device in the shooting step, which are transmitted from the control unit 115) is also stored in the storage medium in the form of header information. With such an arrangement, the information stored in the storage medium is read out and the processing is performed according to an image processing program which is provided in the form of software and which is executed by a computer. It should be noted that the transmission of various kinds of information from the image pickup unit to the computer is not restricted to an arrangement in which such information is transmitted via a storage medium. Also, such information may be transmitted via a communication line or the like.

Description will be made with reference to FIG. 14 regarding a main routine for the processing executed according to the image processing program.

When the processing starts, first, the image signal is read out, and the header information such as the temperature, gain, etc., of the image pickup device are read out (Step S1).

Next, the 3×3 pixel size target region including the target pixel as shown in FIG. 2 is extracted (Step S2).

Then, the edge signal is extracted for the target pixel using an isotropic edge extraction filter as shown in FIG. 3, for example (Step S3).

Subsequently, the false edge signal that arises due to the noise components is estimated for the target pixel, which will be described later with reference to FIG. 15 (Step S4).

Subsequently, determination is made whether or not the absolute value of the edge signal is equal to or smaller than the false edge signal (Step S5).

Here, in a case in which the absolute value of the edge signal is greater than the false edge signal, additional determination is made whether or not the edge signal is greater than the false edge signal (Step S6).

In a case in which determination has been made in Step S6 that the edge signal is equal to or smaller than the false edge signal (−IE>E), the false edge signal is added to the edge signal (Step S9).

In a case in which determination has been made in Step S6 that the edge signal is greater than the false edge signal (E>IE), the false edge signal is subtracted from the edge signal (Step S8).

On the other hand, in a case in which determination has been made in Step S5 that the absolute value of the edge signal is equal to or smaller than the false edge signal (IE≧E≧−IE), the edge signal value is replaced by 0 (Step S7).

Upon completion of the processing in any one of these Steps 7 through 9, edge enhancement processing is performed according to Expression 2 for the image signal using the edge signal thus corrected (Step S10).

Next, determination is made whether or not the processing has been performed on all the target pixel regions (step S11). In a case in which all the target pixel regions have not been subjected to the processing, the flow returns to the aforementioned Step S2, where the above-described processing is repeatedly performed on the next target pixel region.

On the other hand, in a case in which all the target pixel regions have been subjected to the processing, signal processing such as known compression processing is performed (Step S12). Then, the image signal thus processed is outputted (Step S13), whereupon this processing series is completed.

Next, description will be made with reference to FIG. 15 regarding the aforementioned processing in Step S4 shown in the aforementioned FIG. 14 for estimating the false edge.

When the processing in Step S4 shown in FIG. 14 is started, first, the average value of the target pixel region is calculated according to the Expression 3 (Step S20).

Next, the related information such as the temperature, gain, etc., is set based upon the header information thus read out (Step S21). It should be noted that, in a case in which the header information does not contain a required parameter, a predetermined standard value is set.

Subsequently, the coordinate data of the base edge model and the correction coefficients are read out (Step S22).

Then, the coordinate data set that represents the section to which the average of the target pixel region belongs, and the corresponding correction coefficient, are selected (Step S23).

Subsequently, the base false edge signal is obtained by performing the interpolation processing according to the Expression 7 (Step S24).

Next, the false edge signal is obtained by performing the correction processing according to the Expression 8 (Step S25).

Subsequently, the false edge signal thus calculated is outputted (Step S26), and the flow returns from this processing to the processing shown in FIG. 14.

The above-described embodiment 1 provides an image processing system having the following functions. That is to say, various kinds of information relating to the edge signal that arises due to the noise components are dynamically obtained every time an image is acquired. A standard value is set if the information cannot be obtained. Then, interpolation processing is performed based upon these various kinds of information, the image signal, and the base edge model, so as to obtain the false edge signal that arises due to the noise components. Subsequently, correction processing is performed on the edge signal using the false edge signal thus obtained.

With such an image processing system, the edge signal is corrected based upon an edge signal that has the same nature as the edge signal. Thus, such an arrangement allows the edge components to be stably extracted with high precision even if the image signal contains various kinds of noise components.

The present embodiment dynamically accommodates the conditions which change every time an image is acquired. Such an arrangement allows the edge signal that arises due to the noise components to be estimated with high precision.

Furthermore, with such an arrangement, a standard value is set in a case in which the required information is unavailable. Thus, such an arrangement allows the edge signal that arises due to the noise components to be estimated even in such a case. This ensures the stable the processing results.

With such an arrangement, the edge signal that arises due to the noise components is estimated based upon a model, thereby allowing the edge signal to be estimated with high precision.

With such an arrangement employing a simplified model, the interpolation processing based upon such a simplified model is provided in a simple manner, thereby providing a low-cost system.

Embodiment 2

Figure 16:
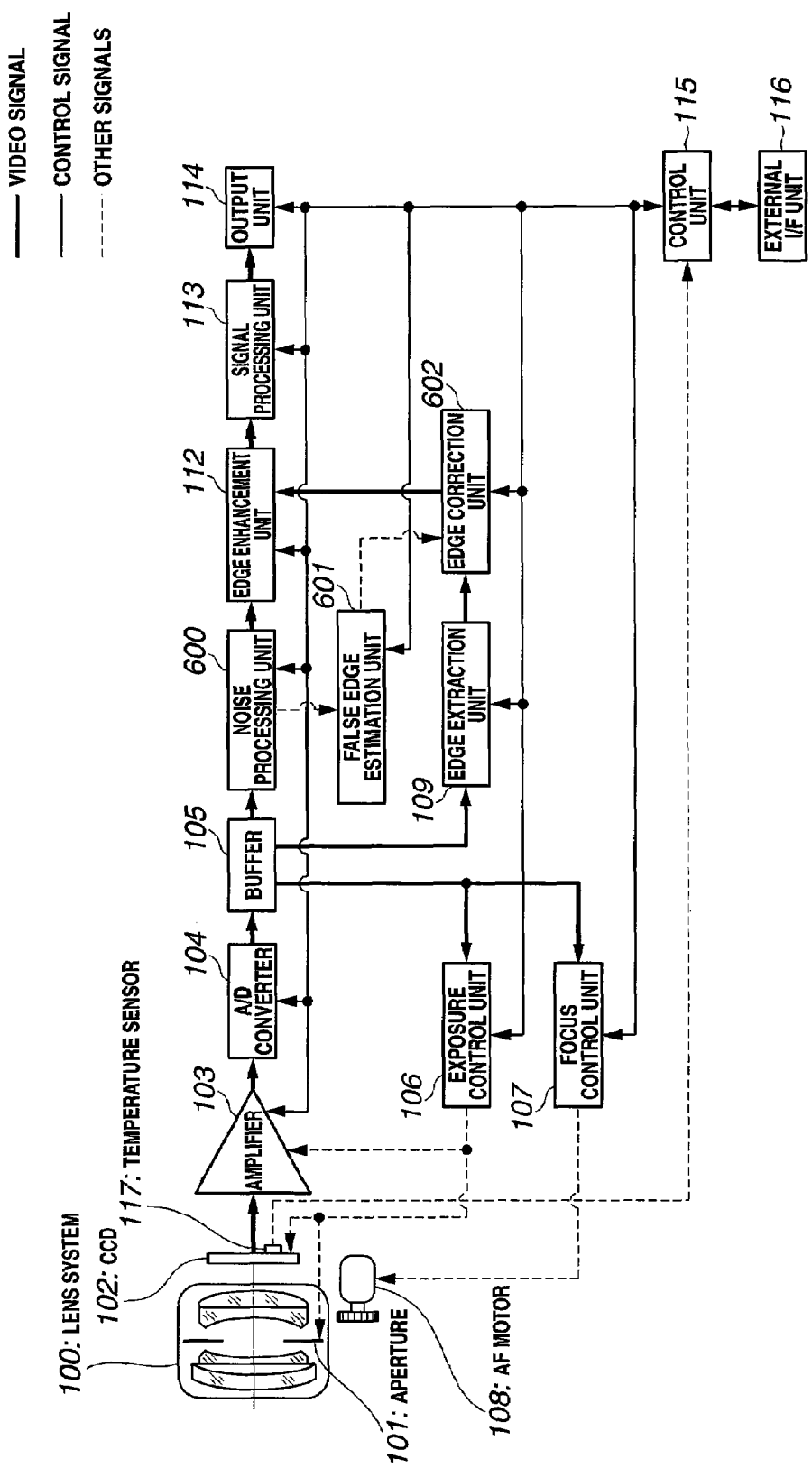
FIG. 16 is a block diagram which shows a configuration of an image processing system according to an embodiment 2 of the present invention.
Figure 17:
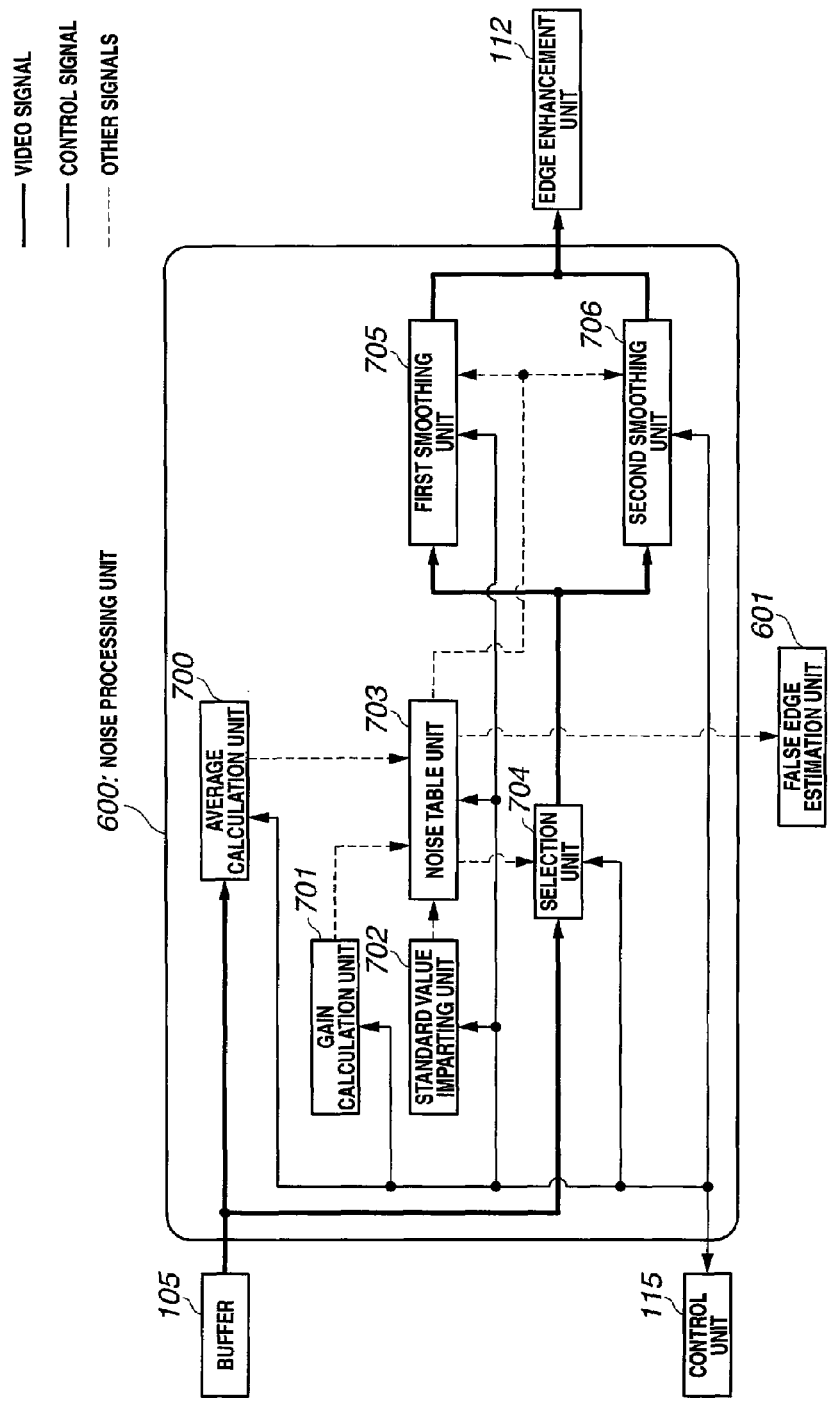
FIG. 17 is a block diagram which shows a configuration of a noise processing unit according to the embodiment 2.
Figure 18:
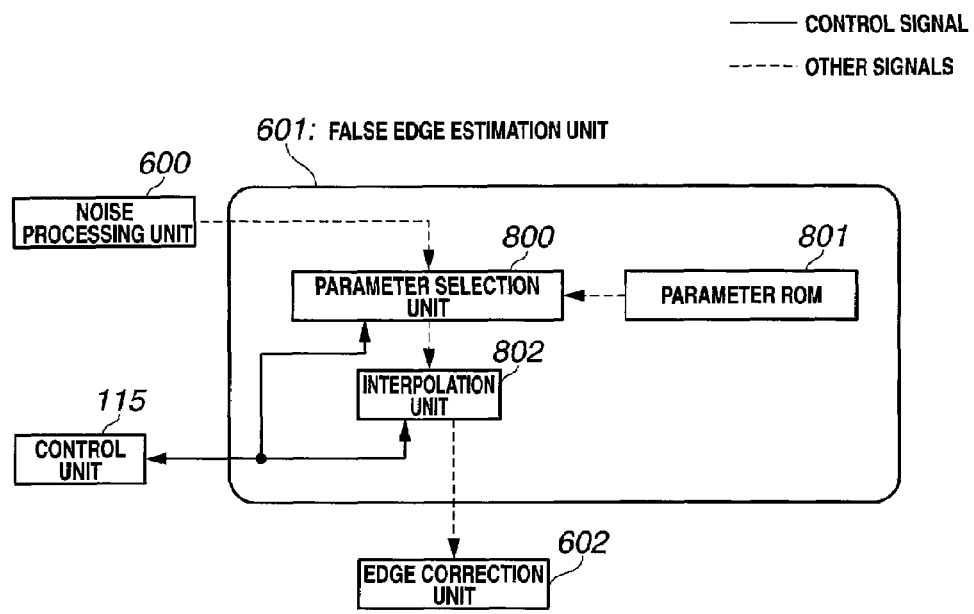
FIG. 18 is a block diagram which shows an example of the configuration of a false edge estimation unit according to the embodiment 2.
Figure 19:
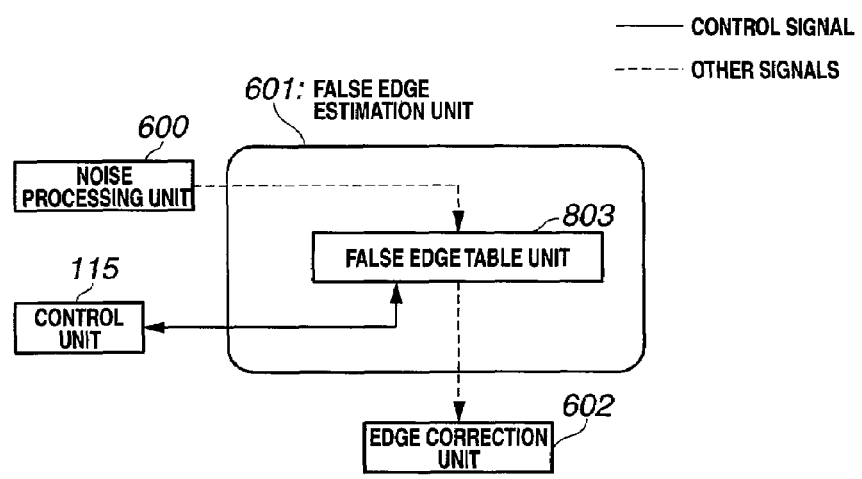
FIG. 19 is a block diagram which shows another example of the configuration of the false edge estimation unit according to the embodiment 2.
Figure 20:
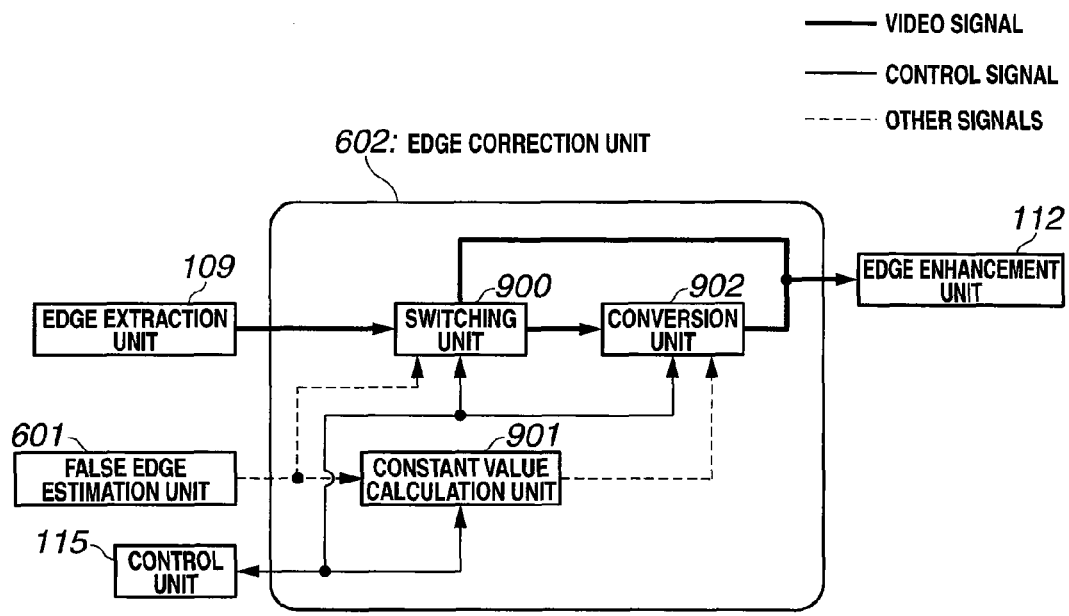
FIG. 20 is a block diagram which shows a configuration of an edge correction unit according to the embodiment 2.
Figure 21:
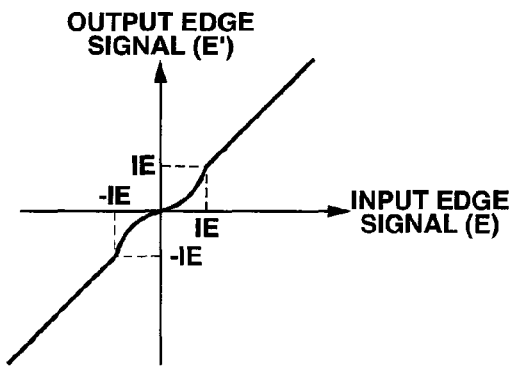
FIG. 21 is a line graph which shows the response of the coring processing performed by the edge correction unit according to the embodiment 2.
Figure 22:
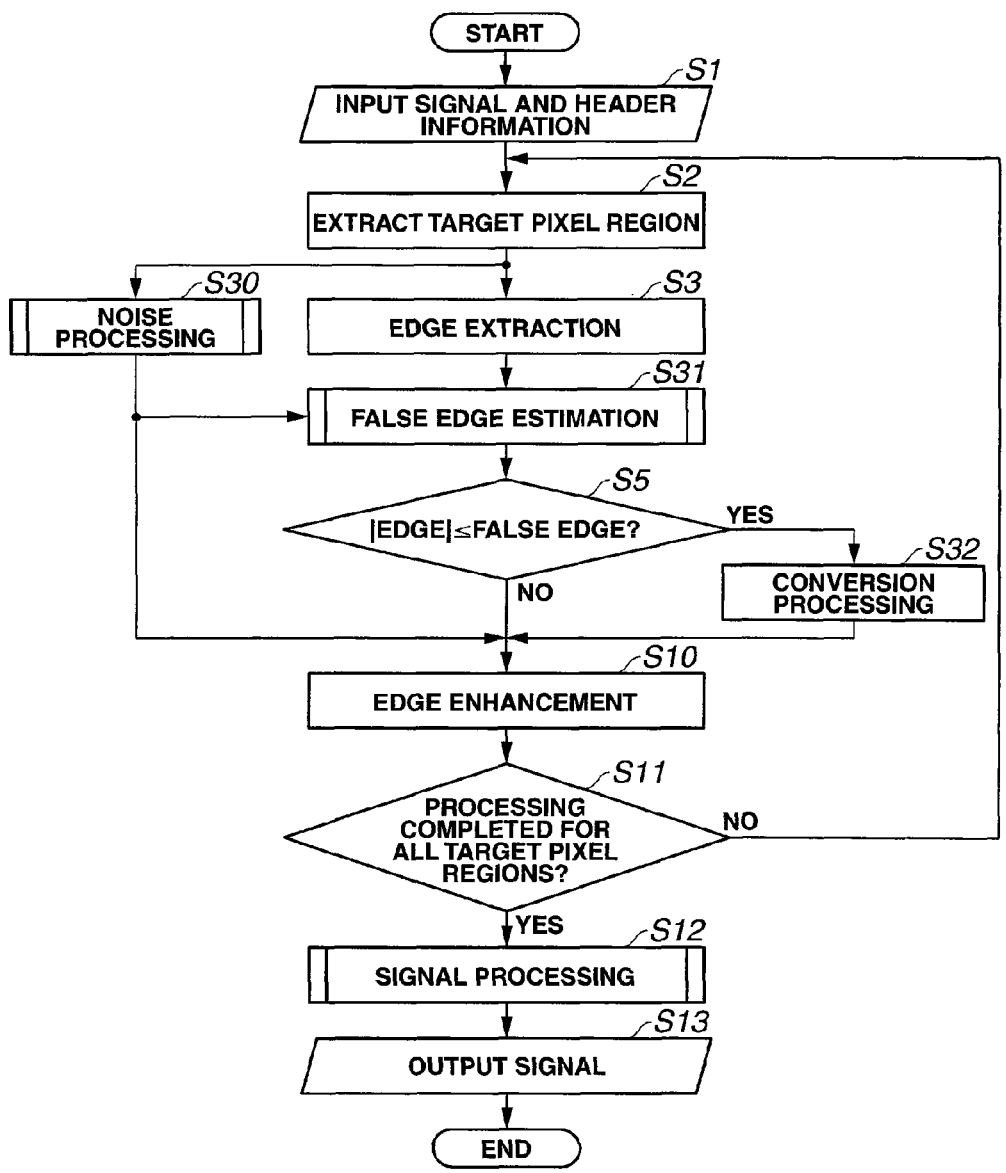
FIG. 22 is a flow chart which shows the overall flow of the signal processing performed according to an image processing program according to the embodiment 2.
Figure 23:
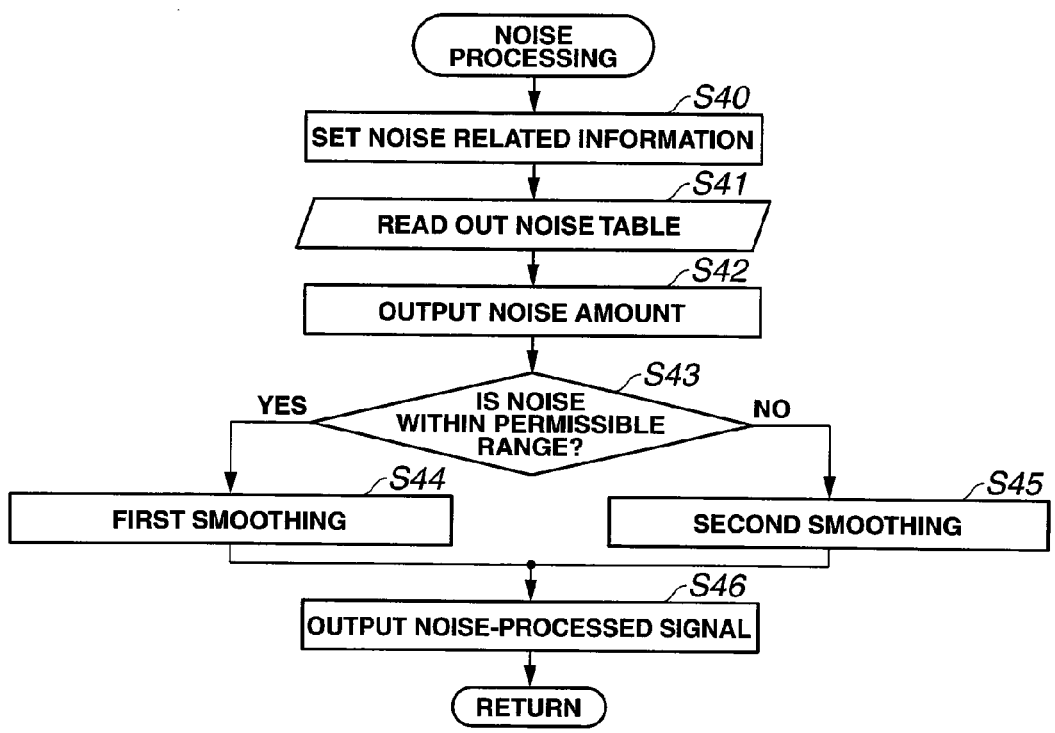
FIG. 23 is a flow chart which shows the detailed noise processing performed in Step S30 shown in FIG. 22.
Figure 24:
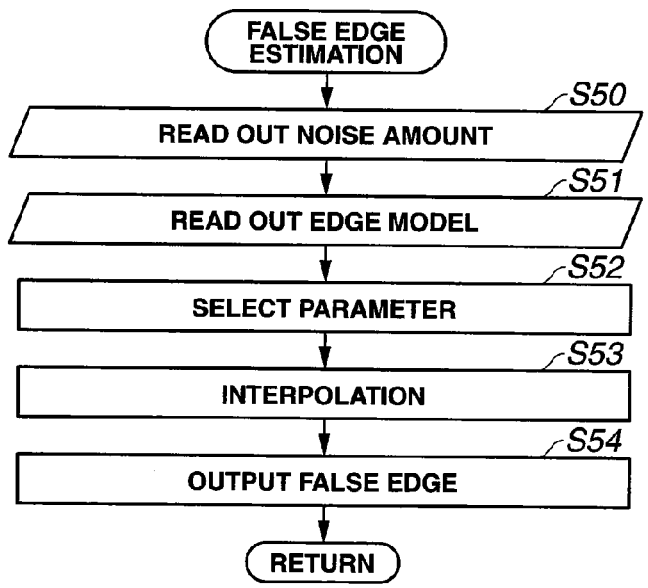
FIG. 24 is a flow chart which shows the detailed processing for estimating the false edge in Step S31 shown in FIG. 22.

FIG. 16 through FIG. 24 show an embodiment 2. Specifically, FIG. 16 is a block diagram which shows a configuration of an image processing system. FIG. 17 is a block diagram which shows a configuration of a noise processing unit. FIG. 18 is a block diagram which shows an example of the configuration of a false edge estimation unit. FIG. 19 is a block diagram which shows another example of the configuration of the false edge estimation unit. FIG. 20 is a block diagram which shows a configuration of an edge correction unit. FIG. 21 is a line graph which shows the response of the coring processing performed by the edge correction unit. FIG. 22 is a flow chart which shows the overall flow of the signal processing according to an image processing program. FIG. 23 is a flow chart which shows the detailed noise processing performed in Step S30 shown in FIG. 22. FIG. 24 is a flow chart which shows the detailed processing for estimating the false edge in Step S31 shown in FIG. 22.

The same components in the embodiment 2 as those in the above-described embodiment 1 are denoted by the same reference numerals, and description thereof will be omitted. Description will be mainly made only regarding the different components.

First, description will be made regarding the configuration of the image processing system with reference to FIG. 16.

FIG. 16 shows an example in which the image processing system according to the present invention is applied to a digital camera.

The image processing system shown in FIG. 16 has generally the same configuration as that of the image processing system according to the above-described embodiment 1 shown in FIG. 1, except that a part of the configuration is changed. Specifically, in the image processing system according to the embodiment 2, the false edge estimation unit 110 and the edge correction unit 111 shown in FIG. 1 are replaced by a false edge estimation unit 601 which is false edge estimating means and an edge correction unit 602 which is edge correcting means, and a noise processing unit 600 which is noise processing means is further included. The other basically components are the same as those of the embodiment 1, and the same components will be referred to as the same terms, and are denoted by the same reference numerals.

Description will be made below only regarding the different components.

The buffer 105 is connected to the exposure control unit 106, the focus control unit 107, the noise processing unit 600, and the edge extraction unit 109. The noise processing unit 600 is connected to each of the edge enhancement unit 112 and the false edge estimation unit 601. Each of the edge extraction unit 109 and the false edge estimation unit 601 is connected to the edge correction unit 602. The edge correction unit 602 is connected to the edge enhancement unit 112.

Furthermore, the control unit 115 is connected in a bidirectional manner to the noise processing unit 600, the false edge estimation unit 601, and the edge correction unit 602, thereby controlling these components.

Next, description will be made regarding the operation of the image processing system as shown in FIG. 16 with reference to the flow of the image signal. The operation of the image processing system according to the embodiment 2 is basically the same as that of the above-described embodiment 1, and accordingly, description will be made mainly regarding the different components.

Under the control of the control unit 115, the noise processing unit 600 sequentially extracts the 3×3 pixel size target region $P_{ij}$ including the target pixel $P_{11}$ as shown in FIG. 2. Then, the noise processing unit 600 estimates the amount of noise N with respect to the target pixel $P_{11}$ based upon a noise model so as to perform the smoothing processing as disclosed in Japanese Unexamined Patent Application Publication No. 2005-175718. The noise processing unit 600 transmits the amount of noise N thus estimated to the false edge estimation unit 601, and transmits the target pixel $NR\_P_{11}$ thus subjected to the smoothing processing to the edge enhancement unit 112.

Under the control of the control unit 115, the false edge estimation unit 601 reads out the amount of noise N with respect to the target pixel $P_{11}$ from the noise processing unit 600, and estimates the false edge signal IE that arises due to the noise components of the target pixel $P_{11}$. The false edge estimation unit 601 transmits the false edge signal IE that arises due to the noise components thus estimated to the edge correction unit 602.

Under the control of the control unit 115, the edge correction unit 602 performs conversion processing on the edge signal E received from the edge extraction unit 109 using the false edge signal IE received from the false edge estimation unit 601 and a predetermined function. The edge correction unit 602 transmits the edge signal E' thus subjected to the conversion processing to the edge enhancement unit 112.

Under the control of the control unit 115, the edge enhancement unit 112 performs edge enhancement processing on the target pixel NR_$P_{11}$, thus subjected to smoothing processing by the noise processing unit 600, using the converted edge signal E' received from the edge correction unit 602 according to the following Expression 10.

$$P_{11}' = NR\_P_{11} + g \cdot E' \qquad \text{[Expression 10]}$$

Note that the reference symbol "g" in the Expression 10 represents a predetermined gain value, in a range from around 0.5 to 4.0, for example. Then, the edge enhancement unit 112 transmits the image signal thus subjected to edge enhancement processing to the signal processing unit 113.

Here, the edge extraction unit 109, the noise processing unit 600, the false edge estimation unit 601, the edge correction unit 602, and the edge enhancement unit 112 synchronously perform the aforementioned processing in increments of the 3×3 pixel size pixel regions under the control of the control unit 115.

Under the control of the control unit 115, the signal processing unit 113 performs known compression processing etc., on the image signal which has been outputted from the edge enhancement unit 112 and which has been subjected to the edge enhancement processing. The signal processing unit 113 transmits the signal thus processed to the output unit 114.

The output unit 114 stores the image signal, which has been outputted from the signal processing unit 113, in a storage medium such as a memory card or the like.

Next, description will be made regarding an example of the configuration of the noise processing unit 600 with reference to FIG. 17.

The noise processing unit 600 includes an average calculation unit 700, a gain calculation unit 701 which is noise estimating means, a standard value imparting unit 702 which is another noise estimating means, a noise table unit 703 which is yet another noise estimating means, a selection unit 704, a first smoothing unit 705 which is noise reducing means, and a second smoothing unit 706 which is another noise reducing means.

The buffer 105 is connected to each of the average calculation unit 700 and the selection unit 704. Each of the average calculation unit 700, the gain calculation unit 701, and the standard value imparting unit 702, is connected to the noise table unit 703. The noise table unit 703 is connected to each of the selection unit 704, the first smoothing unit 705, the second smoothing unit 706, and the false edge estimation unit 601. The selection unit 704 is connected to each of the first smoothing unit 705 and the second smoothing unit 706. Each of the first smoothing unit 705 and the second smoothing unit 706 is connected to the edge enhancement unit 112.

The control unit 115 is connected in a bidirectional manner to the average calculation unit 700, the gain calculation unit 701, the standard value imparting unit 702, the noise table unit 703, the selection unit 704, the first smoothing unit 705, and the second smoothing unit 706, thereby controlling these components.

Next, description will be made regarding the operation of the noise processing unit 600 having such a configuration.

Under the control of the control unit 115, the average calculation unit 700 sequentially extracts from the buffer 105 the 3×3 pixel size target region $P_{ij}$ including the target pixel $P_{11}$ as shown in FIG. 2, and calculates the average value AV according to the Expression 3. The average calculation unit 700 transmits the average value AV thus calculated to the noise table unit 703.

The gain calculation unit 701 obtains the gain with regard to the amplifier 103 based upon at least one of the ISO sensitivity and the exposure conditions transmitted from the control unit 115, and transmits the gain thus obtained to the noise table 703.

Furthermore, the control unit 115 acquires the temperature information with respect to the CCD 102 from the temperature sensor 117, and transmits the temperature information thus acquired to the noise table unit 703.

The noise table unit 703 estimates the amount of noise based upon the average value received from the average calculation unit 700, the gain information received from the gain calculation unit 701, and the temperature information received from the control unit 115. The noise table unit 703 serves as a lookup table which provides the relation between the temperature, the signal level, the gain, and the amount of noise, which is formed using a technique disclosed in Japanese Unexamined Patent Application Publication No. 2005-175718, for example. The noise table unit 703 transmits the amount of noise N thus estimated, and the average value AV received from the average calculation unit 700, to each of the selection unit 704, the first smoothing unit 705, and the second smoothing unit 706. Furthermore, the noise table unit 703 transmits the amount of noise N thus estimated to the false edge estimation unit 601.

The selection unit 704 reads out the average value AV and the amount of noise N from the noise table unit 703 under the control of the control unit 115. Subsequently, the selection unit 704 sets the upper permissible amount of noise Noise_Up and the lower permissible amount of noise Noise_Low according to the following Expression 11.

$$\text{Noise\_Up} = AV + \frac{N}{2} \qquad \text{[Expression 11]}$$
$$\text{Noise\_Low} = AV - \frac{N}{2}$$

Then, under the control of the control unit 115, the selection unit 704 reads out the target pixel $P_{11}$ from the buffer 105, and determines whether or not the amount of noise of the target pixel $P_{11}$ is within the aforementioned permissible range. The determination provides one of three determination patterns, i.e., 1) the amount of noise of the target pixel $P_{11}$ is within the permissible range (Noise_Up$\geq P_{11} \geq$Noise_Low), 2) the amount of noise of the target pixel $P_{11}$ is greater than the upper permissible amount of noise ($P_{11}$>Noise_Up), and 3) the amount of noise of the target pixel $P_{11}$ is smaller than the lower permissible amount of noise (Noise_Low>$P_{11}$).

In a case in which determination has been made that the amount of noise of the target pixel $P_{11}$ is within the permissible noise range, the selection unit 704 transmits the target pixel $P_{11}$ to the first smoothing unit 705. Alternatively, the selection unit 704 transmits the target pixel $P_{11}$ to the second smoothing unit 706.

The first smoothing unit 705 uses the average AV received from the noise table unit 703 as it is, without any additional processing, as the target pixel NR_$P_{11}$ subjected to the smoothing processing according to the following Expression 12, thereby outputting the target pixel NR_$P_{11}$.

$$NR\_P_{11} = AV \qquad \text{[Expression 12]}$$

On the other hand, the second smoothing unit 706 performs correction of the target pixel $P_{11}$ received from the selection unit 704, using the average value AV and the amount of noise N received from the noise table unit 703. Then, the second smoothing unit 706 uses the target pixel $P_{11}$ thus subjected to correction as the target pixel NR_$P_{11}$ subjected to the smoothing processing. In a case in which the amount of noise of the target pixel $P_{11}$ is greater than the upper permissible amount of noise, the second smoothing unit 706 performs correction according to the following Expression 13.

$$NR\_P_{11} = P_{11} - \frac{N}{2} \quad \text{[Expression 13]}$$

On the other hand, in a case in which the amount of noise of the target pixel $P_{11}$ is smaller than the lower permissible amount of noise, the second smoothing unit 706 performs correction according to the following Expression 14.

$$NR\_P_{11} = P_{11} + \frac{N}{2} \quad \text{[Expression 14]}$$

The target pixel $NR\_P_{11}$ thus subjected to the smoothing processing by the first smoothing unit 705 or the second smoothing unit 706 is transmitted to the edge enhancement unit 122.

Next, description will be made regarding an example of the configuration of the false edge estimation unit 601 with reference to FIG. 18.

The false edge estimation unit 601 includes a parameter selection unit 800 which is parameter selecting means, a parameter ROM 801 which is storage means, and an interpolation unit 802 which is interpolating means.

Each of the noise processing unit 600 and the parameter ROM 801 is connected to the parameter selection unit 800. The parameter selection unit 800 is connected to the interpolation unit 802. The interpolation unit 802 is connected to the edge correction unit 602.

Furthermore, the control unit 115 is connected in a bidirectional manner to the parameter selection unit 800 and the interpolation unit 802, thereby controlling these components.

Description will be made regarding the operation of the false edge estimation unit 601 having such a configuration.

The parameter selection unit 800 and the interpolation unit 802 estimate the false edge signal IE that arises due to the noise components based upon the amount of noise N with respect to the target pixel $P_{11}$ received from the noise processing unit 600. Description will be made below regarding a method for estimating the false edge signal IE with reference to FIG. 7 described in the embodiment 1 of the present invention.

As shown in FIG. 7, the relation of the amount of noise N and the false edge signal IE can be approximated based upon an edge model employing a cubic function. Furthermore, the cubic function is approximated by a line graph having a predetermined number of inflection points. Here, each inflection point of the line graph is represented by the coordinate data $(N_n, IE_n)$, which consists of the amount of noise N and the false edge signal IE. Note that the reference symbol n represents the index number of each inflection point.

Then, in order to obtain the false edge signal IE that corresponds to a given amount of noise N, search processing is performed which detects the section of the edge model to which the given amount of noise N belongs. Now, let us say that the given amount of noise N belongs to the section between the inflection points $(N_n, IE_n)$ and $(N_{n+1}, IE_{n+1})$. With such an arrangement, the false edge signal IE is obtained based upon the edge model using a linear interpolation according to the following Expression 15.

$$IE = \frac{IE_{n+1} - IE_n}{N_{n+1} - N_n}(N - N_n) + IE_n \quad \text{[Expression 15]}$$

Returning to description with reference to FIG. 18, the coordinate data set $(N_n, IE_n)$ which represents the inflection points of the aforementioned edge model is stored in the parameter ROM 801.

Under the control of the control unit 115, the parameter selection unit 800 reads out the amount of noise N with respect to the target pixel $P_{11}$ from the noise processing unit 600. Next, the parameter selection unit 800 searches the parameter ROM 801 for the coordinate data $(N_n, IE_n)$ and $(N_{n+1}, IE_{n+1})$ that represent the section to which the amount of noise N belongs. The parameter selection unit 800 transmits the coordinate data thus obtained to the interpolation unit 802.

Under the control of the control unit 115, the interpolation unit 802 calculates the false edge signal IE according to the Expression 15 using the amount of noise N and the coordinate data $(N_n, IE_n)$ and $(N_{n+1}, IE_{n+1})$ that represent the section to which the amount of noise N belongs and which are received from the parameter selection unit 800. Then, the interpolation unit 802 transmits the false edge signal IE thus calculated to the edge correction unit 602. Description has been made above regarding an arrangement in which the edge signal that arises due to the noise components is estimated by performing an interpolation computation based upon a model. However, the present invention is not restricted to such an arrangement. For example, an arrangement may be made in which the edge signal that arises due to the noise components is estimated using a table, as shown in FIG. 19.

Now, description will be made regarding another example of the configuration of the false edge estimation unit 601 with reference to FIG. 19.

The false edge estimation unit 601 includes an false edge table unit 803 which is storage means.

The noise processing unit 600 is connected to the false edge table unit 803. The false edge table unit 803 is connected to the edge correction unit 602.

Furthermore, the control unit 115 is connected in a bidirectional manner to the false edge table unit 803, thereby controlling the false edge table unit 803.

With such an arrangement, the false edge table unit 803 is a table which stores the relation between the amount of noise N and the false edge signal IE as shown in FIG. 7.

Under the control of the control unit 115, reading out the amount of noise N with respect to the target pixel $P_{11}$, the false edge table unit 803 transmits the corresponding false edge signal IE to the edge correction unit 602.

Description will be made regarding an example of the configuration of the edge correction unit 602 with reference to FIG. 20.

The edge correction unit 602 includes a switching unit 900, a constant calculation unit 901 which is constant calculating means, and a conversion unit 902 which is function converting means.

The edge extraction unit 109 is connected to the switching unit 900. The switching unit 900 is connected to each of the conversion unit 902 and the edge enhancement unit 112. The conversion unit 902 is connected to the edge enhancement unit 112. The false edge estimation unit 601 is connected to each of the switching unit 900 and the constant calculation unit 901. The constant calculation unit 901 is connected to the conversion unit 902.

Furthermore, the control unit 115 is connected in a bidirectional manner to the switching unit 900, the constant calculation unit 901, and the conversion unit 902, thereby controlling these components.

Next, description will be made regarding the operation of the edge correction unit 602 having such a configuration.

Under the control of the control unit 115, the constant calculation unit 901 reads out the false edge signal IE with respect to the target pixel $P_{11}$ from the false edge estimation unit 601. Then, the constant calculation unit 901 calculates the constant term of the function having the response properties as shown in FIG. 21. Here, FIG. 21 shows the curve of the function whereby, when the edge signal E is input, the converted edge signal E' is output. This function is formed of a combination of two linear functions and one cubic function.

$$E' = \begin{cases} E & (E > IE) \\ \dfrac{2}{3IE^2}E^3 + \dfrac{1}{3}E & (IE \geq E \geq -IE) \\ E & (-IE > E) \end{cases} \quad \text{[Expression 16]}$$

With such an arrangement, the constant calculation unit 901 calculates the constant term of the function as shown in FIG. 16. That is to say, the constant calculation unit 901 calculates only one term, i.e., ($\frac{2}{3}IE^2$), and transmits the constant term thus calculated to the conversion unit 902.

Under the control of the control unit 115, the switching unit 900 reads out the edge signal E with respect to the target pixel $P_{11}$ from the edge extraction unit 109, and reads out the false edge signal IE with respect to the target pixel $P_{11}$ from the false edge estimation unit 601. Then, the switching unit 900 makes a comparison between the edge signal E and the false edge signal IE. In a case of IE$\geq$E$\geq$−IE, the switching unit 900 transmits the edge signal E to the conversion unit 902. Alternatively, the switching unit 900 transmits the edge signal E to the edge enhancement unit 112.

Under the control of the control unit 115, upon reception of the edge signal E transmitted from the switching unit 900, the conversion unit 902 converts the edge signal E according to the cubic function in the Expression 16 using the constant term received from the constant calculation unit 901. Then, the conversion unit 902 transmits the converted edge signal E' to the edge enhancement unit 112.

Description has been made above regarding an arrangement in which the image pickup unit is provided in the from of a single unit together with the image processing system. However, the present invention is not restricted to such an arrangement. Like the above-described embodiment 1, an arrangement may be made in which the image pickup device and the image processing system are provided in the form of separate units.

Description has been made above regarding an arrangement in which the processing is performed by means of hardware. However, the present invention is not restricted to such an arrangement. Also, an arrangement may be made in which the image signal received from the CCD 102 is stored in a storage medium such as a memory card in the form of unprocessed raw data, and the related information such as the shooting conditions (e.g., the temperature, the gain, etc., of the image pickup device in the shooting step, which is transmitted from the control unit 115) is also stored in the storage medium in the form of header information. With such an arrangement, the information stored in the storage medium is read out and the processing is performed according to an image processing program which is provided in the form of software and which is executed by a computer. It should be noted that the transmission of various kinds of information from the image pickup unit to the computer is not restricted to transmission via a storage medium. Also, such information may be transmitted via a communication line or the like.

Description will be made with reference to FIG. 22 regarding a main routine of the processing according to the image processing program. Note that, of the steps shown in FIG. 22, generally the same steps shown in FIG. 22 as those in the embodiment 1 described above with reference to FIG. 14 are denoted by the same reference numerals.

When the processing starts, the image signal is read out. Furthermore, the temperature, gain, etc., of the image pickup device, which are stored in the form of header information, are read out (Step 1).

Next, the 3×3 pixel size target region including the target pixel as shown in FIG. 2 is extracted (Step S2).

Then, the edge signal is extracted for the target pixel using an isotropic edge extraction filter as shown in FIG. 3, for example (step S3).

Also, noise processing is performed on the target pixel, as described later with reference to FIG. 23 (Step S30).

Upon completion of the processing in Step S3 and the processing in Step S30, the false edge signal that arises due to the noise components is estimated with respect to the target pixel, as described later with reference to FIG. 24 (Step S31).

Subsequently, determination is made whether or not the absolute value of the edge signal is equal to or smaller than the false edge signal (Step S5).

In a case in which the edge signal is equal to or smaller than the false edge signal, the edge signal is converted using a cubic function as represented by Expression 16 (Step 32).

After the processing in Step S30, in a case in which the processing in Step S32 has been performed, edge enhancement processing is performed on the image signal thus subjected to the noise processing using the edge signal thus converted, as represented by Expression 10. On the other hand, after the processing in Step S30, in a case in which determination has been made in Step S5 that the absolute value of the edge signal is greater than the false edge signal, the edge signal which has not been subjected to any additional processing is employed as the converted edge signal. Then, the edge enhancement processing is performed on the image signal thus subjected to the noise processing using the converted edge signal thus employed as represented by the Expression 10 (Step S10).

Next, determination is made whether or not the processing has been performed on all the target pixel regions (Step S11). In a case in which the processing has not been completed, the flow returns to the aforementioned Step S2, and the above-described processing is repeatedly performed on the next target pixel region.

On the other hand, in a case in which determination has been made that the processing has been completed for all the target pixel regions, signal processing such as known compression processing is performed (Step S12). Then, the image signal thus processed is outputted (Step S13), whereupon the processing series ends.

Next, description will be made with reference to FIG. 23 regarding the noise processing in step S30 shown in FIG. 22 described above.

When the processing in Step S30 shown in FIG. 22 starts, first, the related information such as the temperature, gain, etc., is set based upon the header information thus read out (Step S40). It should be noted that, in a case in which the header information does not contain a required parameter, a predetermined standard value is set.

Subsequently, the noise table is read out (Step S41). The amount of noise is obtained for the target pixel with reference to the noise table thus read out (Step S42).

Then, determination is made whether or not the amount of noise thus obtained is within the permissible range based upon the permissible noise range as represented by the Expression 11 (Step S43).

In a case in which determination has been made that the amount of noise is within the permissible range, the smoothing processing is performed as represented by the Expression 12 (Step S44).

On the other hand, in a case in which the amount of noise is outside the permissible range, the smoothing processing is performed as represented by the Expression 13 or the Expression 14 (Step S45).

Upon the completion of the processing in Step S44 or Step S45, the image signal thus subjected to the noise processing is outputted (Step S46), whereupon the flow returns to the processing shown in FIG. 22.

Next, description will be made with reference to FIG. 24 regarding the false edge estimation processing in Step S31 shown in FIG. 22 described above.

When this processing starts, first, the amount of noise of the target pixel is read out (Step S50). In addition, the coordinate data of the edge model is read out (Step S51).

Next, the coordinate data are selected which represent the section to which the amount of noise of the target pixel region belongs (Step S52).

Subsequently, the base false edge signal is obtained by performing the interpolation processing as represented by the Expression 15 (Step S53).

Then, the false edge signal thus calculated is output (Step S54), whereupon the flow returns to the processing shown in FIG. 22.

The embodiment 2 having such a configuration provides an image processing system having the following functions. That is to say, the noise components are estimated so as to perform the noise reduction processing. Furthermore, the edge signal that arises due to the noise components is dynamically estimated based upon the noise components thus estimated. Moreover, the edge signal extracted from the raw signal is corrected based upon the edge signal that arises due to the noise components.

With such an image processing system, the edge signal is corrected based upon an edge signal that has the same nature as the edge signal. Thus, such an arrangement allows the edge components to be extracted with high precision even if the image signal contains various kinds of noise components.

Furthermore, such an arrangement provides the noise reduction processing which suppresses the adverse effects of noise, thereby obtaining high-quality edge components, while maintaining a minutely sized signal.

Furthermore, such an arrangement employs a combination of the noise reduction processing and the edge signal correction processing. This reduces the system scale, thereby providing a low-cost system.

Furthermore, with such an arrangement, the edge signal that arises due to the noise components is calculated using a model. Such an arrangement allows the edge signal to be estimated with high precision at a low cost.

Also, an arrangement may be made in which the edge signal that arises due to the noise components is calculated using a table. Such an arrangement allows the edge signal to be estimated with high precision at a high speed.

Furthermore, with such an arrangement, the edge signal is converted using a continuous monotone increasing function formed of a combination of multiple functions. Such an arrangement ensures that the edge signal conversion results are continuous, thereby providing high-quality edge signals.

Embodiment 3

Figure 25:
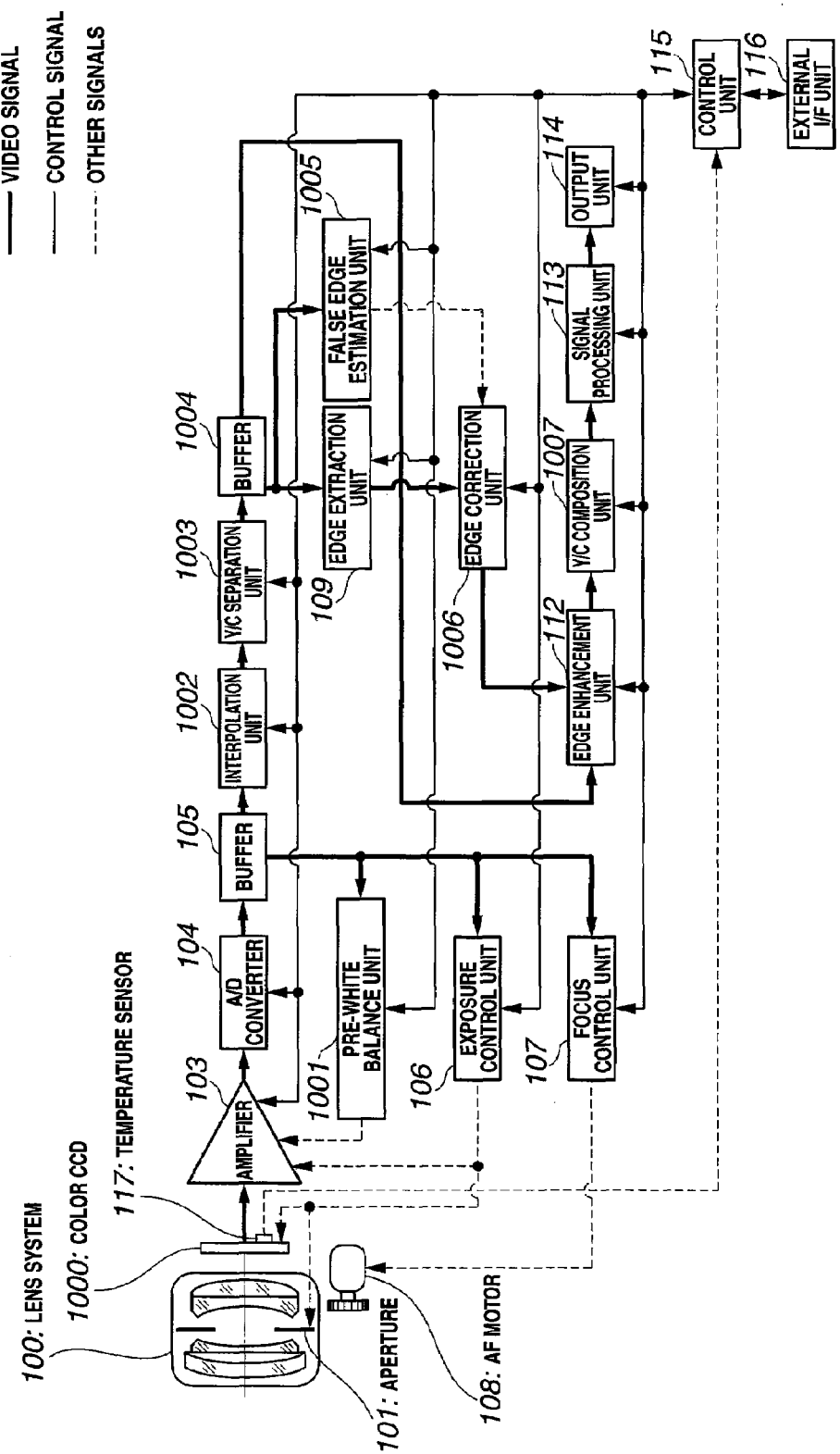
FIG. 25 is a block diagram which shows a configuration of an image processing system according to an embodiment 3 of the present invention.
Figures 26, 27, 28:
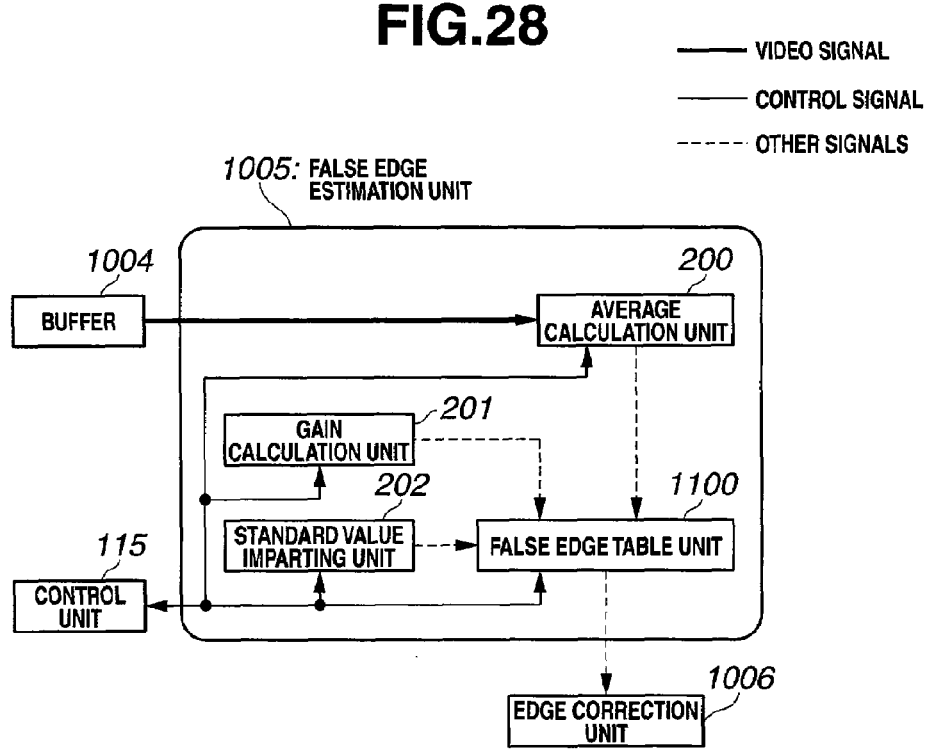
FIG. 26 is a diagram which shows a pattern of a Bayer-type primary color filter according to the embodiment 3.
FIG. 27 is a diagram which shows a pattern of a color-difference line-sequential complementary color filter according to the embodiment 3.
FIG. 28 is a block diagram which shows an example of the configuration of the false edge estimation unit according to the embodiment 3.
Figure 29:
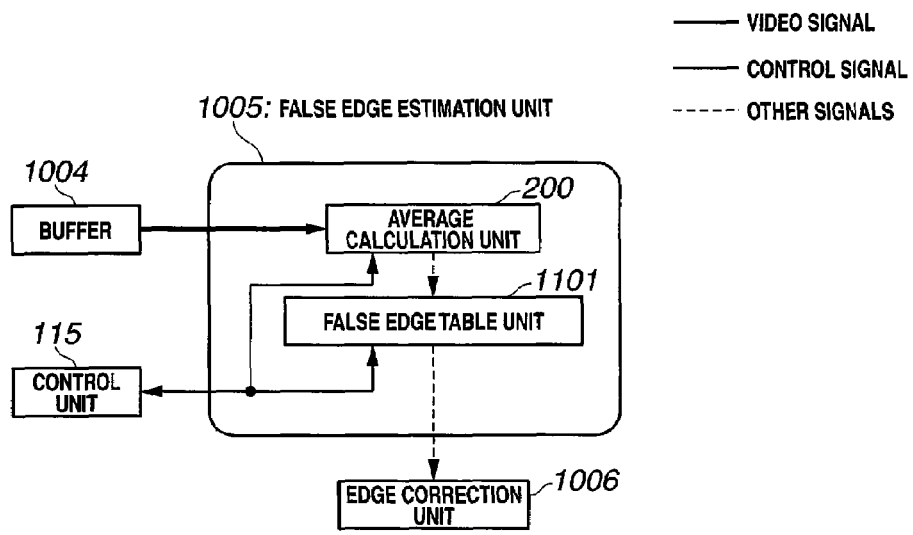
FIG. 29 is a block diagram which shows another example of the configuration of the false edge estimation unit according to the embodiment 3.
Figure 30:
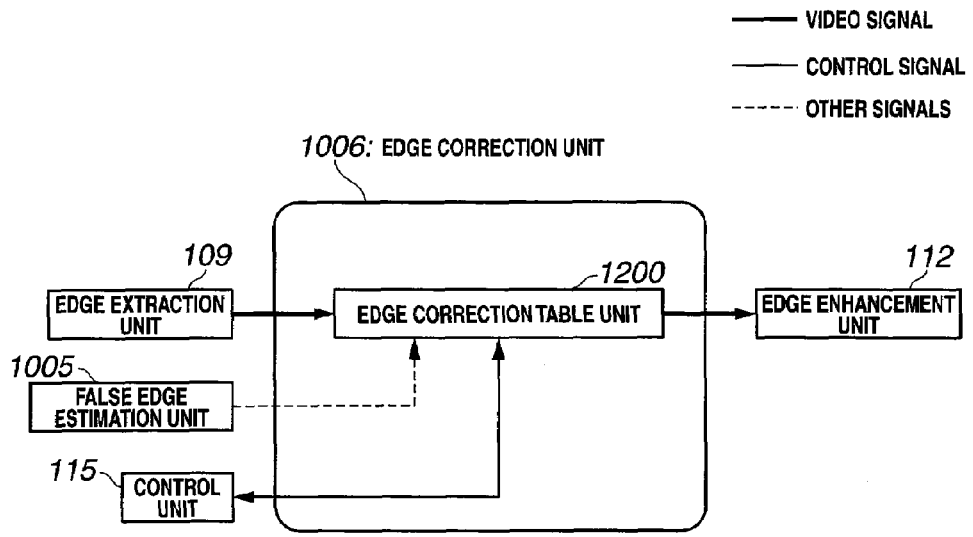
FIG. 30 is a block diagram which shows a configuration of the edge correction unit according to the embodiment 3.
Figure 31A:
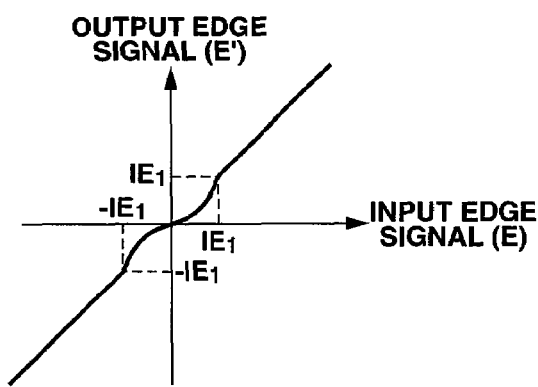
FIG. 31A, FIG. 31B, and FIG. 31C show line graphs each of which shows an example of the response in the coring processing according to the embodiment 3.
Figure 31B:
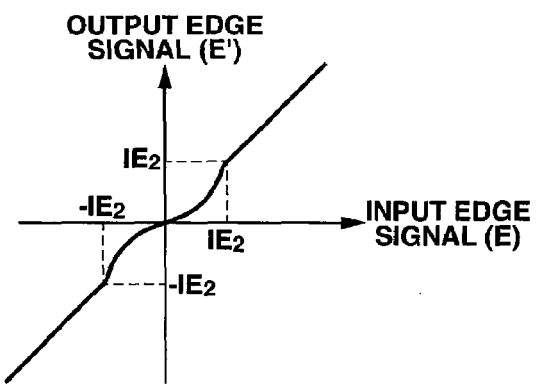
Figure 31C:
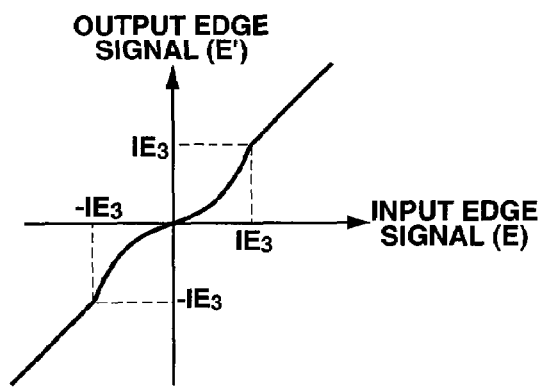
Figure 32:
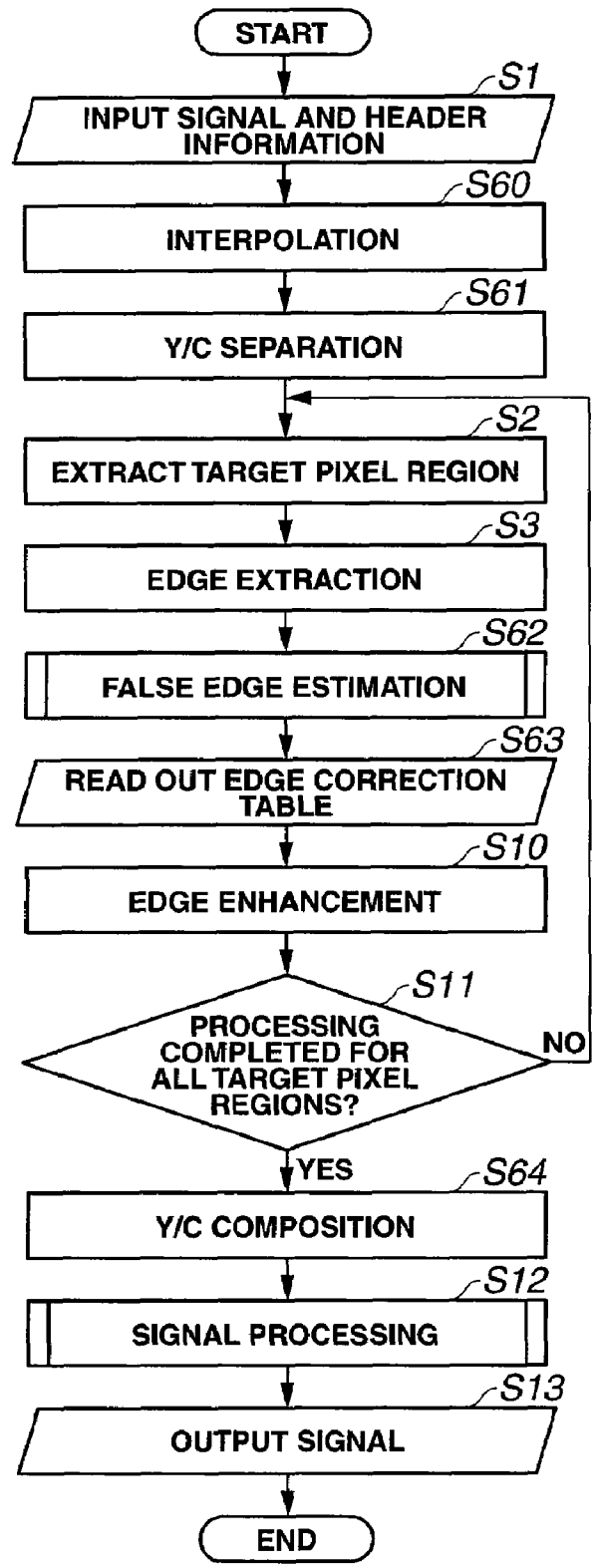
FIG. 32 is a flow chart which shows the overall flow of the signal processing performed according to an image processing program according to the embodiment 3.
Figure 33:
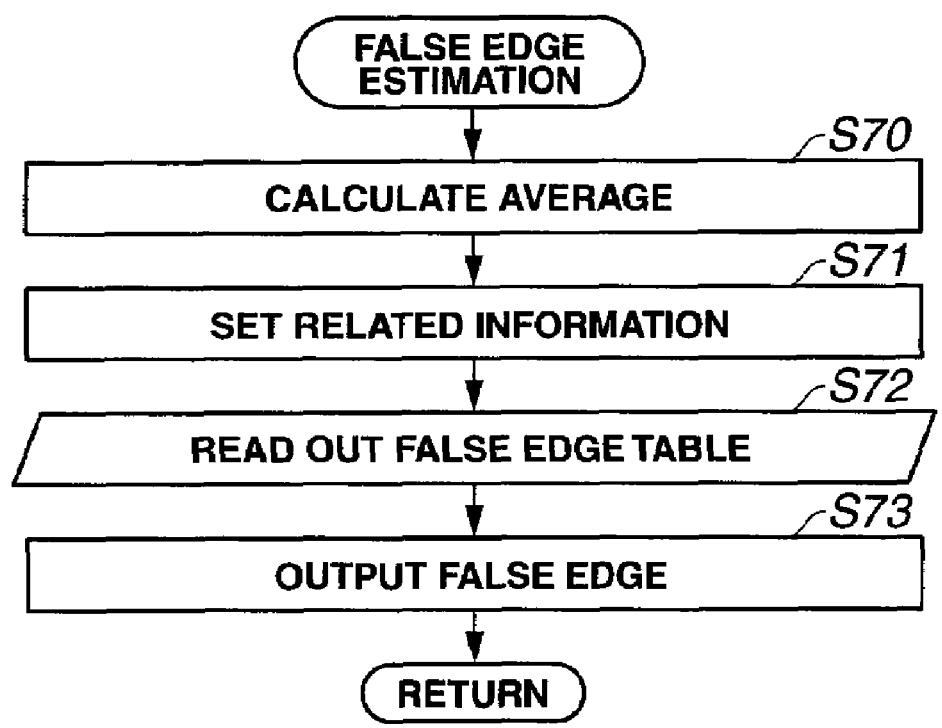
FIG. 33 is a flow chart for making a detailed description of the false edge estimation processing in Step S62 shown in FIG. 32.

FIG. 25 through FIG. 33 show an embodiment 3 according to the present invention. Specifically, FIG. 25 is a block diagram which shows a configuration of an image processing system. FIG. 26 is a diagram which shows a pattern of a Bayer-type primary color filter. FIG. 27 is a diagram which shows a pattern of a color-difference line-sequential complementary color filter. FIG. 28 is a block diagram which shows an example of the configuration of the false edge estimation unit. FIG. 29 is a bloc diagram which shows another example of the configuration of the false edge estimation unit. FIG. 30 is a block diagram which shows a configuration of the edge correction unit. FIG. 31A, FIG. 31B, FIG. 31C show line graphs each of which shows an example of the response in the coring processing. FIG. 32 is a flow chart which shows the overall flow of the signal processing according to an image processing program. FIG. 33 is a flow chart for making a detailed description of the false edge estimation processing in Step S62 shown in FIG. 32.

The same components in the embodiment 3 as those in the above-described embodiment 1 or 2 are denoted by the same reference numerals, and description thereof will be omitted. Description will be mainly made only regarding the difference therebetween.

First, description will be made with reference to FIG. 25 regarding the configuration of the image processing system. FIG. 25 shows an example in which the image processing system according to the present invention is applied to a digital camera.

The image processing system shown in FIG. 25 has generally the same configuration as that of the above-described image processing system according to the embodiment 1 shown in FIG. 1, except that a part thereof is changed. Specifically, the image processing system shown in FIG. 25 has generally the same configuration as that of the embodiment 1, except that the CCD 102, the false edge estimation unit 110, and the edge correction unit 111 shown in FIG. 1 are replaced by a color CCD 1000, a false edge estimation unit 1005 which is false edge estimating means, and an edge correction unit 1006 which is edge correcting means, and a pre-white balance unit 1001, an interpolation unit 1002, and a Y/C separation unit 1003 which is Y/C separating means, a buffer 1004, and a Y/C composition unit 1007 are further included. The other basic components are the same as those of the embodiment 1, and the same components will be referred to as the same terms, and are denoted by the same reference numerals.

Description will be mainly made below only regarding the difference therebetween.

The image signal acquired via the lens system 100, the aperture 101, and the color CCD 1000 is transmitted to the amplifier 103.

The buffer 105 is connected to each of the pre-white balance unit 1001, the interpolation unit 1002, the exposure control unit 106, and the focus control unit 107. The pre-white balance unit 1001 is connected to the amplifier 103. The interpolation unit 1002 is connected to the Y/C separation unit 1003. The Y/C separation unit 1003 is connected to the buffer 1004. The buffer 1004 is connected to each of the edge extraction unit 109, the edge enhancement unit 112, and the false edge estimation unit 1005. Each of the edge extraction unit 109 and the false edge estimation unit 1005 is connected to the edge correction unit 1006. The edge correction unit 1006 is connected to the edge enhancement unit 112. The edge enhancement unit 112 is connected to the Y/C composition unit 1007. The Y/C composition unit 1007 is connected to the signal processing unit 113.

Furthermore, the signal line from the temperature sensor 117 disposed near the color CCD 1000 is connected to the control unit 115.

Furthermore, the control unit 115 is connected in a bidirectional manner to the pre-white balance unit 1001, the interpolation unit 1002, the Y/C separation unit 1003, the false edge estimation unit 1005, the edge correction unit 1006, and the Y/C composition unit 1007, thereby controlling these components.

Next, description will be made regarding the operation of the image processing system as shown in FIG. 25 with reference to the flow of the image signal. The basic operation of the image processing system according to the embodiment 3 is the same as that of the above-described embodiment 1. Accordingly, description will be mainly made only regarding the difference therebetween.

When the user half-presses the shutter button provided in the external I/F unit 116 in the form of a two-step switch, the digital camera enters the pre-shooting mode.

Then, the color CCD 1000 performs photoelectric conversion of the image of the subject formed through the lens system 100 and the aperture 101, thereby outputting the subject image in the form of an analog image signal.

The analog image signal is amplified by the amplifier 103 giving consideration to the ISO sensitivity and the white balance, following which the analog image signal is converted by the A/D converter 104 into a digital image signal, which is stored in the buffer 105.

Description is being made in the present embodiment regarding an arrangement in which a Bayer-type primary color filter as shown in FIG. 26 is mounted on the front face of a single image pickup device. The image pickup device is not restricted to such a CCD. Rather, CMOSs or other image pickup devices may be employed, like the above-described embodiment 1.

Now, description will be made regarding the pattern of the Bayer-type primary color filter with reference to FIG. 26.

The Bayer-type primary color filter as shown in FIG. 26 consists of basic patterns each of which is formed of 2×2 pixels. Each basic pattern includes a red filter pixel and a blue filter pixel at corners opposite to each other. Furthermore, each basic pattern includes two green filter pixels at the other corners opposite to each other.

Subsequently, the image signal stored in the buffer 105 is transmitted to each of the exposure control unit 106, the focus control unit 107, and the pre-white balance unit 1001.

Of these components, the pre-white balance unit 1001 integrates for each color signal the image signal which is within a predetermined level range and which is stored in the buffer 105 (i.e., the image signal is summed up for each color), thereby calculating simple white balance coefficients. The pre-white balance unit 1001 transmits the coefficients thus calculated to the amplifier 103 which then applies gains that differ from one another in increments of color signals, thereby causing the white balance control processing to be performed.

After the processing for the focus control, exposure control, simple white balance control, etc., thus performed, when the user full-presses the shutter button provided in the external I/F unit 116 in the form of a two-step switch, the digital camera enters the real shooting mode.

Then, like the pre-shooting operation, the image signal is transmitted to the buffer 105. In the real shooting operation, the image is acquired using the simple white balance coefficients obtained by the pre-white balance unit 1001, on the exposure condition obtained by the exposure control unit 106 and the focus condition obtained by the focus control unit 107. These shooting conditions are transmitted to the control unit 115.

First, the image signal, which is obtained in the real shooting mode and which is stored in the buffer 105, is transmitted to the interpolation unit 1002.

Under the control of the control unit 115, the interpolation unit 1002 creates three image signals, i.e., R, G, and B image signals using known interpolation processing, and transmits the image signals thus created to the Y/C separation unit 1003.

Under the control of the control unit 115, the Y/C separation unit 1003 converts the R, G, and B signals into the luminance signal Y and the color difference signals Cb and Cr as represented by the following Expression 17.

$$Y = 0.29900R + 0.58700G + 0.11400B$$

$$Cb = -0.16874R - 0.33126G + 0.50000B$$

$$Cr = 0.50000R - 0.41869G - 0.08131B \qquad \text{[Expression 17]}$$

The luminance signal and the color difference signals calculated by the Y/C separation unit 1003 are transmitted to and stored in the buffer 1004.

Under the control of the control unit 115, the edge extraction unit 109 sequentially extracts from the luminance signal Y the 3×3 pixel size target region $P_{ij}$ including the target pixel $P_{11}$ as shown in FIG. 2, and extracts the edge signal E for the target pixel $P_{11}$ using an edge extraction filter as shown in FIG. 3. The edge extraction unit 109 transmits the edge signal E thus extracted to the edge correction unit 1006.

Under the control of the control unit 115, the false edge estimation unit 1005 sequentially extracts, from the luminance signal Y stored in the buffer 1004, the same 3×3 pixel size target region $P_{ij}$ as that processed by the aforementioned edge extraction unit 109, so as to estimate the false edge signal IE that arises due to the noise components of the target pixel $P_{11}$. Then, the false edge estimation unit 1005 transmits the false edge signal IE that arises due to the noise component, which has been thus estimated, to the edge correction unit 1006.

Under the control of the control unit 115, the edge correction unit 1006 performs coring processing for the edge signal E received from the edge extraction unit 109 using the false edge signal IE received from the false edge estimation unit 1005. The edge correction unit 1006 transmits the edge signal E' thus subjected to the coring processing to the edge enhancement unit 112.

Under the control of the control unit 115, the edge enhancement unit 112 sequentially extracts, from the luminance signal Y stored in the buffer 1004, the luminance signal Y that corresponds to the same target pixel $P_{11}$ as that processed by the edge extraction unit 109 so as to perform edge enhancement processing as represented by the following Expression 18 using the edge signal E' thus subjected to the coring processing by the edge correction unit 111.

$$Y' = Y + g \cdot E' \qquad \text{[Expression 18]}$$

Note that the reference symbol g in the Expression 18 represents a predetermined gain value, which is set to a value ranging from 0.5 to 4.0, for example.

Furthermore, the edge enhancement unit 112 extracts the color difference signals Cb and Cr stored in the buffer 1004 that correspond to the same target pixel $P_{11}$ as that processed by the edge extraction unit 109. Then, the edge enhancement unit 112 transmits the color difference signals Cb and Cr thus extracted and the luminance signal Y' thus subjected to the edge enhancement processing to the Y/C composition unit 1007.

The Y/C composition unit 1007 creates the three RGB signals (R', G', B') based upon the luminance signal Y' and the color difference signals Cb and Cr as represented by the following Expression 19.

$$R' = Y' + 1.40200 Cr$$

$$G' = Y' - 0.34414 Cb - 0.71414 Cr$$

$$B' = Y' + 1.77200 Cb \qquad \text{[Expression 19]}$$

The Y/C composition unit 1007 transmits the R', G', and B' signals thus created to the signal processing unit 113.

It should be noted that the aforementioned processing steps performed by the edge extraction unit 109, the false edge estimation unit 1005, the edge correction unit 1006, the edge enhancement unit 112, and the Y/C composition unit 1007 are performed synchronously in increments of the 3×3 pixel size target region $P_{ij}$ under the control of the control unit 115.

Under the control of the control unit 115, the signal processing unit 113 performs known color saturation enhancement processing, compression processing, etc., on the image signal thus subjected to the edge enhancement processing outputted from the edge enhancement unit 112, and transmits the signal thus processed to the output unit 114.

The output unit 114 stores the image signal outputted from the signal processing unit 113 in a storage medium such as a memory card or the like.

Next, description will be made regarding an example of the configuration of the false edge estimation unit 1005 with reference to FIG. 28.

The false edge estimation unit 1005 has basically the same configuration as that of the false edge estimation unit 110 as described above in the embodiment 1 with reference to FIG. 5, except that a false edge table unit 1100 is further included as table conversion means, and the parameter ROM 203, the parameter selection unit 204, the interpolation unit 205, and the correction unit 206 are not included. The other components are the same as those in the embodiment 1. Accordingly, the same components will be referred to as the same terms and are denoted by the same reference numerals. Description will be mainly made below only regarding the difference therebetween.

Each of the average calculation unit 200, the gain calculation unit 201, and the standard value imparting unit 202 is connected to the false edge table unit 1100. The false edge table unit 1100 is connected to the edge correction unit 1006.

The control unit 115 is connected to the false edge table unit 1100 in a bidirectional manner, thereby controlling the false edge table unit 1100.

Next, description will be made regarding the operation of the false edge estimation unit 1005 having such a configuration.

Under the control of the control unit 115, the average calculation unit 200 calculates the average value AV for the target pixel region $P_{ij}$ as shown in FIG. 2 based upon the luminance signal Y stored in the buffer 105. Then, the average calculation unit 200 transmits the average value AV to the false edge table unit 1100.

The gain calculation unit 201 calculates the gain of the amplifier 103 based upon at least one of the ISO sensitivity, the information with respect to the exposure condition, and the white balance coefficients transmitted from the control unit 115. Then, the gain calculation unit 201 transmits the gain thus calculated to the false edge table 1100.

Furthermore, the control unit 115 acquires the temperature information with respect to the color CCD 1000 from the temperature sensor 117, and transmits the temperature information thus acquired to the false edge table unit 1100.

The false edge table unit 1100 outputs the false edge signal IE that arises due to the noise components based upon the average value for the target pixel region received from the average calculation unit 200, the gain information received from the gain calculation unit 201, and the temperature information received from the control unit 115.

Here, the false edge table unit 1100 serves as a lookup table which provides the relation between the signal level, the gain, the temperature, and the false edge signal that arises due to the noise components, which is formed according to the Expression 5 and Expression 6 described above in the embodiment 1. The false edge table unit 1100 transmits the false edge signal IE thus obtained to the edge correction unit 1006.

It should be noted that, in the aforementioned step for calculating the false edge signal, it is not indispensable to acquire the information such as the temperature t and the gain g every time an image is acquired. That is to say, an arrangement may be made in which given information is stored in the standard value imparting unit 202, and the aforementioned calculation step is omitted. Such an arrangement provides high-speed processing and allows the power consumption to be reduced.

Description has been made above regarding an arrangement in which the edge signal that arises due to the noise components is estimated based upon the related information such as the temperature of the image pickup device, the ISO sensitivity, the exposure information, the white balance information, etc. However, the present invention is not restricted to such an arrangement. For example, as shown in FIG. 29, an arrangement may be made in which the edge signal that arises due to the noise components is estimated based upon the luminance signal level alone.

Now, description will be made with reference to FIG. 29 regarding another example of the configuration of the false edge estimation unit 1005.

The false edge estimation unit 1005 shown in FIG. 29 has generally the same configuration as that shown in FIG. 28, except that the gain calculation unit 201 and the standard value imparting unit 202 are not included, and the false edge table unit 1100 is replaced by a false edge table unit 1101 which is table conversion means. The other basic components of the false edge estimation unit 1005 shown in FIG. 29 are the same as those shown in FIG. 28. Accordingly, the same components will be referred to as the same terms, and are denoted by the same reference numerals. Description will be mainly made below only regarding the difference therebetween.

The average calculation unit 200 is connected to the false edge table unit 1101. The false edge table unit 1101 is connected to the edge correction unit 1006.

The control unit 115 is connected to the false edge table unit 1101 in a bidirectional manner, thereby controlling the false edge table unit 1101.

Next, description will be made regarding the operation of the false edge estimation unit 1005.

Under the control of the control unit 115, the average calculation unit 200 calculates the average value AV for the target pixel region $P_{ij}$ as shown in FIG. 2 based upon the luminance signal Y stored in the buffer 105, and transmits the average value AV thus calculated to the false edge table unit 1101.

The false edge table unit 1101 outputs the false edge signal IE that arises due to the noise components based upon the average value AV for the target pixel region $P_{ij}$ received from the average calculation unit 200. Here, the false edge table unit 1101 serves as a lookup table which provides the relation between the signal level at a predetermined gain and a predetermined temperature and the false edge signal that arises due to the noise components, which is formed based upon the Expression 5 and Expression 6 described above in the embodiment 1. The false edge table unit 1101 transmits the false edge signal IE thus obtained to the edge correction unit 1006.

Next, description will be made with reference to FIG. 30 regarding an example of the configuration of the edge correction unit 1006.

The edge correction unit 1006 includes an edge correction table unit 1200 which is table correcting means.

Each of the edge extraction unit 109 and the false edge estimation unit 1005 is connected to the edge correction table unit 1200. The edge correction table unit 1200 is connected to the edge enhancement unit 112.

Furthermore, the control unit 115 is connected to the edge correction table unit 1200 in a bidirectional manner, thereby controlling the edge correction table unit 1200.

Next, description will be made regarding the operation of the edge correction unit 1006 having such a configuration.

Under the control of the control unit 115, the edge correction table unit 1200 reads out from the edge extraction unit 109 the edge signal E that corresponds to the target pixel $P_{11}$, and reads out from the false edge estimation unit 1005 the false edge signal IE that corresponds to the target pixel $P_{11}$.

Here, the edge correction table 1200 is a table which stores the conversion relations that correspond to respective magnitudes of multiple kinds of false edge signals IE, e.g., three kinds of typical false edge signals $IE_k$ (k=1 to 3) as shown in FIG. 31A through FIG. 31C.

Then, the edge correction table unit 1200 selects one conversion relation which is the closest to the false edge signal IE from the typical false edge signals $IE_k$ thus stored, based upon the false edge signal IE received from the false edge estimation unit 1005. Then, the edge correction table unit 1200 obtains the corrected edge signal E' based upon the edge signal E received from the edge extraction unit 109 according to the conversion relation thus selected so as to output. Subsequently, the edge correction table unit 1200 transmits the corrected edge signal E' to the edge enhancement unit 122.

Description has been made above regarding an arrangement in which the image pickup unit is provided in the form of a single unit together with the image processing system. However, the present invention is not restricted to such an arrangement. Also, the image pickup unit may be provided in the form of a separate unit from the image processing system, like the above-described embodiment 1.

Description has been made above regarding a color image pickup device having a configuration in which a Bayer-type primary color filter is mounted on the front face of a single CCD. However, the present invention is not restricted to such an arrangement. Also, for example, an arrangement may be made in which a color-difference line-sequential complementary color filter is mounted on the front face of a single image pickup device. Also, the present invention may be applied to two or three image pickup devices. FIG. 27 shows a pattern of a color-difference line-sequential complementary color filter, for example.

This color-difference line-sequential complementary color filter consists of basic patterns each of which is formed of 2×2 pixels. Each basic pattern includes a cyan (Cy) filter pixel and a yellow (Ye) filter pixel in one line. Furthermore, each basic pattern includes a magenta (Mg) filter pixel and a green (G) filter pixel in the other line. It should be noted that the order of the magenta (Mg) filter pixel and the green (G) filter pixel is reversed every line.

With such an arrangement employing a single image pickup device mounting such a color-difference line-sequential complementary color filter on the front face thereof, the Y/C separation unit 1003 separates the image signals into the luminance signal Y and the color difference signals Cb and Cr as represented by the following Expression 20.

$Y=Cy+Ye+G+Mg$ $Cb=(Cy+Mg)-(Ye+G)$ $Cr=(Ye+Mg)-(Cy+G)$ [Expression 20]

Description has been made above regarding an arrangement in which such processing is performed by means of hardware. However, the present invention is not restricted to such an arrangement. Also, an arrangement may be made in which the image signal received from the color CCD 1000 is stored in a storage medium such as a memory card or the like in the form of unprocessed raw data, and additional information such as the shooting condition (e.g., the temperature, gain, white balance, etc., of the image pickup device in the shooting operation, which is received from the control unit 115) is also stored in the storage medium in the form of header information. With such an arrangement, the information stored in the storage medium may be read out and processed by a computer according to an image processing program provided in the form of software. It should be noted that the transmission of various kinds of information from the image pickup unit to the computer is not restricted to the transmission via a storage medium. Also, the various kinds of information may be transmitted via a communication line or the like.

Description will be made with reference to FIG. 32 regarding a main routine of the processing according to an image processing program. It should be noted that, of the processing steps shown in FIG. 32, generally the same processing steps as those shown in FIG. 14 described above in the embodiment 1 are denoted by the same reference numerals.

When the processing starts, first, the image signal is read out. Furthermore, the header information such as the temperature, gain, white balance coefficients, etc., of the image pickup device is read out (step S1).

Next, known interpolation processing is performed so as to create three color image signals (Step S60).

Subsequently, the luminance signal and the color difference signals are extracted as represented by the Expression 17 (Step S61).

Then, the 3×3 pixel size target region including the target pixel as shown in FIG. 2 is extracted for each of the luminance signal and the color difference signals (step S2).

Subsequently, the edge signal is extracted for the target pixel with respect to the luminance signal using an isotropic edge extraction filter as shown in FIG. 3, for example (step S3).

Furthermore, the false edge signal that arises due to the noise components is estimated for the target pixel as described later with reference to FIG. 33 (Step S62).

Next, a table, which provides multiple kinds of conversion relations as shown in FIG. 31A through FIG. 31C, is read out, and the corrected edge signal is outputted (Step S63).

Subsequently, the edge enhancement processing is performed on the luminance signal using the corrected edge signal as represented by the Expression 18 (Step S10).

Then, determination is made whether or not the processing is completed for all the target pixel regions (Step S11). In a case in which the processing has not been completed, the flow is returned to the aforementioned Step S2, and the above-described processing is repeatedly performed for the next target pixel region.

On the other hand, in a case in which determination has been made that the processing has been completed for all the target pixel regions, three signals, i.e., R', G', and B' signals are created as represented by the Expression 19 (Step S64).

Subsequently, signal processing such as known color saturation enhancement processing, compression processing, etc., is performed (step S12), following which the image signal thus processed is outputted (Step S13), whereupon the processing series ends.

Next, description will be made with reference to FIG. 33 regarding the false edge estimation processing in Step 62 shown in FIG. 32 described above.

When the processing starts in Step S62 shown in FIG. 33, first, the average value of the luminance signal is calculated for the target pixel region (step S70).

Next, the related information such as the temperature, gain, etc., is set based upon the header information read out (Step S71). It should be noted that, in a case in which the header information does not contain a required parameter, a predetermined standard value is set.

Subsequently, the false edge signal is obtained using the false edge table (Step S72).

Then, the false edge signal thus calculated is outputted (Step S73), and this flow returns to the processing shown in FIG. 32.

The above-described embodiment 3 provides an image processing system having the following functions. That is to say, the luminance signal is extracted from the image signal received from the color image pickup device. Furthermore, various kind of information relating to the edge signal that arises due to the noise components is dynamically obtained every time an image is acquired. In a case in which there is unavailable information, a standard value is set for the unavailable information. The false edge signal that arises due to the noise components is obtained based upon the information and the luminance signal thus obtained. Furthermore, the edge signal is corrected based upon the false edge signal thus obtained.

With such an image processing system, the edge signal is corrected based upon an edge signal having the same nature as that of the edge signal. Thus, such an arrangement allows the edge components to be stably extracted with high precision even if the image signal contains various kinds of noise components.

Furthermore, such an image processing system is applicable to a signal received from a color image pickup device. Thus, such an arrangement is applicable to various kinds of image processing systems.

Furthermore, the embodiment 3, dynamically accommodates the conditions, which can change every time an image is acquired. Such an arrangement allows the edge signal that arises due to the noise components to be estimated with high precision.

Furthermore, with the embodiment 3, in a case in which the required information is unavailable, a standard value is set. Such an arrangement allows the edge signal that arises due to the noise components to be estimated, thereby ensuring stable processing results.

Moreover, with the embodiment 3, a conversion table is employed for calculating the edge signal that arises due to the noise components. Such an arrangement allows the edge signal to be estimated with high precision at a high speed.

Embodiment 4

Figure 34:
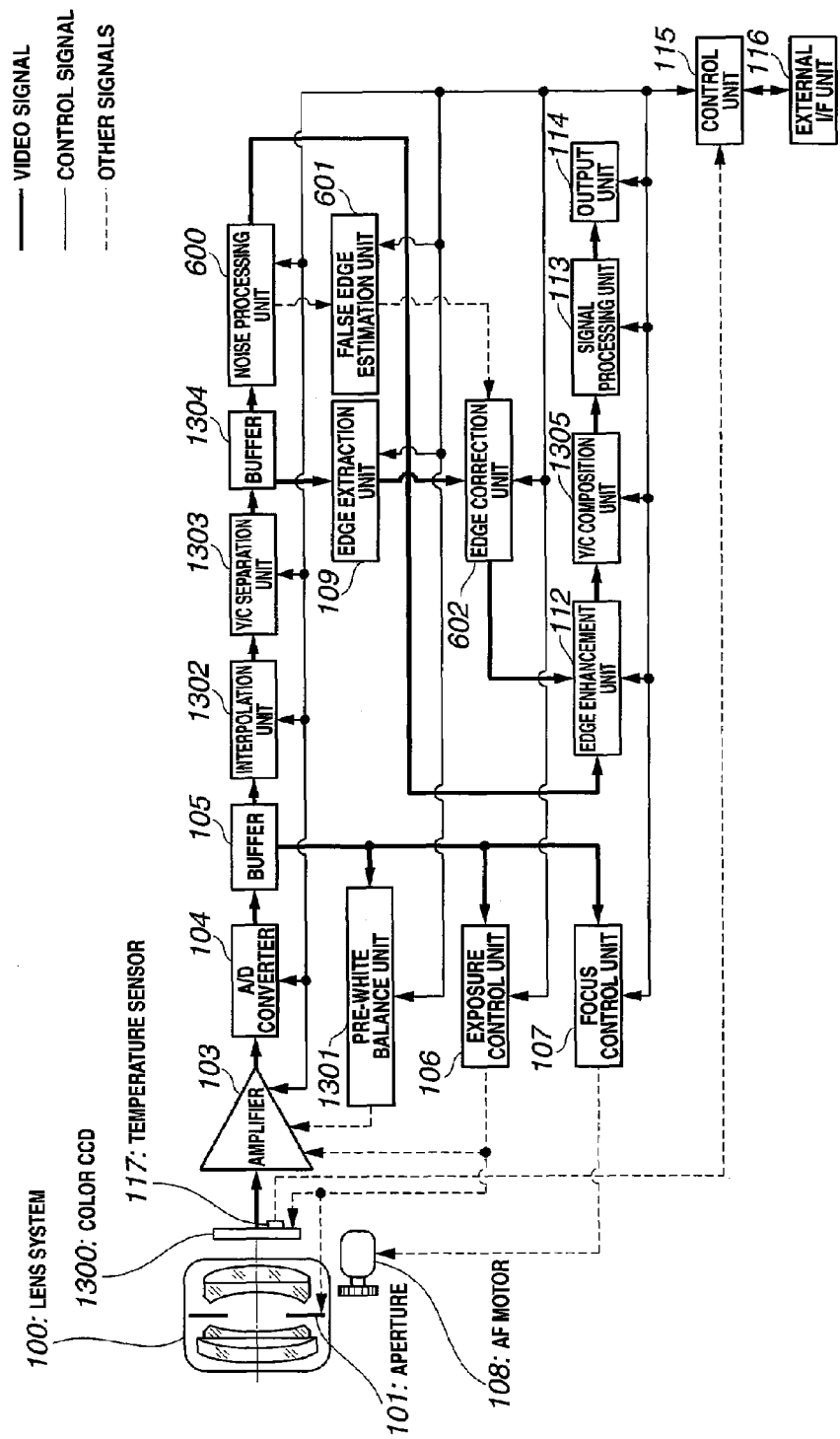
FIG. 34 is a block diagram which shows a configuration of an image processing system according to an embodiment 4 of the present invention.
Figure 35:
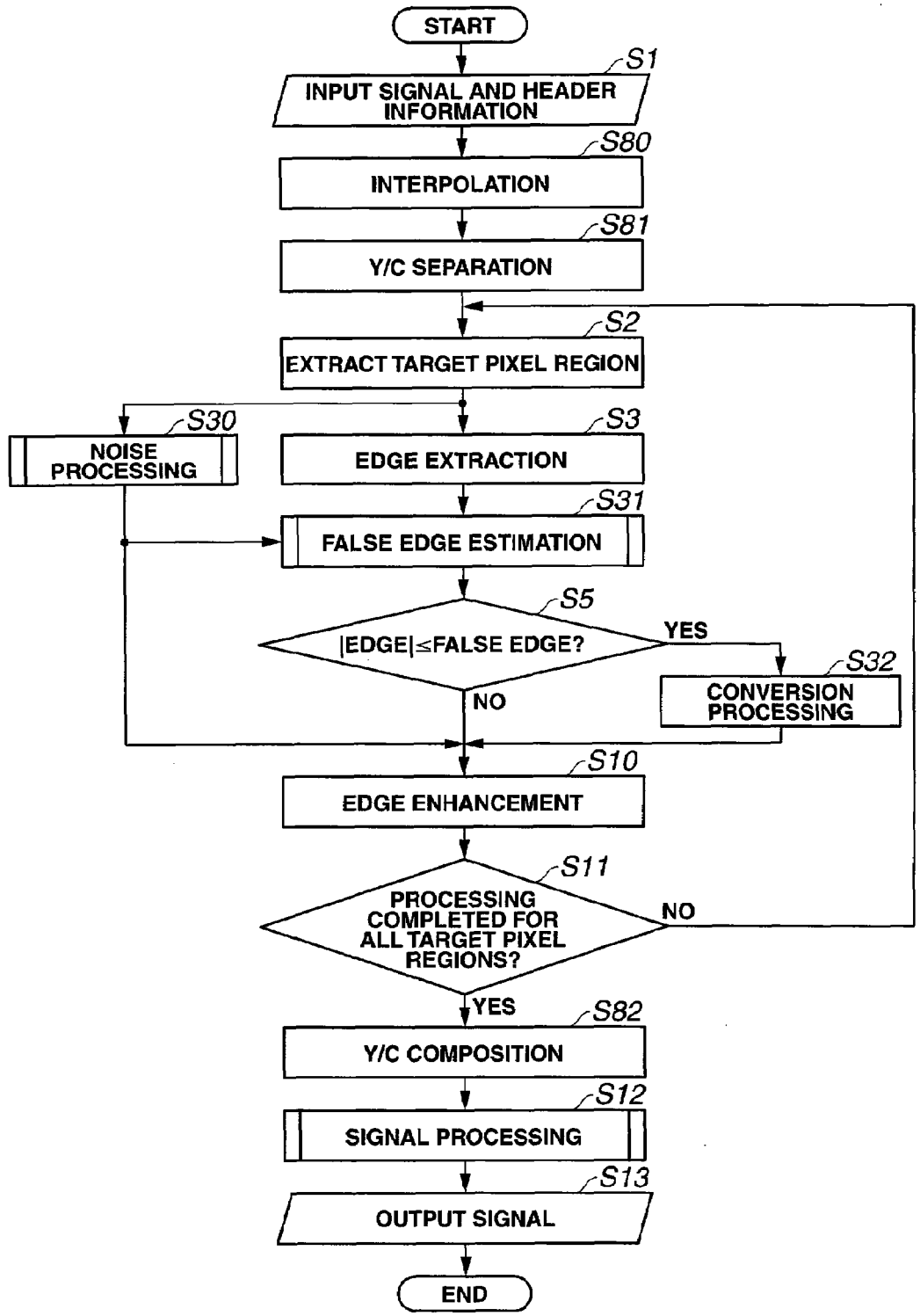
FIG. 35 is a flow chart which shows the overall flow of the signal processing performed according to an image processing program according to the embodiment 4.

FIG. 34 and FIG. 35 show an embodiment 4 according to the present invention. Specifically, FIG. 34 is a block diagram which shows a configuration of an image processing system. FIG. 35 is a flow chart which shows the overall flow of the signal processing according to an image processing program.

In the embodiment 4, the same components as those in the above-described embodiments 1 through 3 are denoted by the same reference numerals, and description thereof will be omitted. Description will be mainly made only regarding the difference therebetween.

First, description will be made with reference to FIG. 34 regarding the configuration of the image processing system. FIG. 34 shows an example in which the image processing system according to the present invention is applied to a digital camera.

The image processing system shown in FIG. 34 has generally the same configuration as that of the above-described image processing system according to the embodiment 2 shown in FIG. 16, except that a part thereof is changed. Specifically, the image processing system shown in FIG. 34 has generally the same configuration as that of the embodiment 2, except that the CCD 102 shown in FIG. 16 is replaced by a color CCD 1300, and a pre-white balance unit 1301, an interpolation unit 1302, a Y/C separation unit 1303 which is Y/C separating means, a buffer 1304, and a Y/C composition unit 1305, are further included. The other basic components in the embodiment 4 are the same as those in the embodiment 2, and the same components will be referred to as the same terms, and are denoted by the same reference numerals.

Description will be mainly made below only regarding the difference therebetween.

The image signal acquired via the lens system 100, the aperture 101, and the color CCD 1300 is transmitted to the amplifier 103.

The buffer 105 is connected to each of the pre-white balance unit 1301, the interpolation unit 1302, the exposure control unit 106, and the focus control unit 107. The pre-white balance unit 1301 is connected to the amplifier 103. The interpolation unit 1302 is connected to the Y/C separation unit 1003. The Y/C separation unit 1303 is connected to the buffer 1304. The buffer 1304 is connected to each of the edge extraction unit 109 and the noise processing unit 600. The edge enhancement unit 112 is connected to the Y/C composition unit 1305. The Y/C composition unit 1305 is connected to the signal processing unit 113.

Furthermore, the signal line from the temperature sensor 117 disposed near the color CCD 1300 is connected to the control unit 115.

Furthermore, the control unit 115 is connected in a bidirectional manner to the pre-white balance unit 1301, the interpolation unit 1302, the Y/C separation unit 1303, the Y/C composition unit 1305, thereby controlling these components.

Next, description will be made regarding the operation of the image processing system as shown in FIG. 34 with reference to the flow of the image signal. The basic operation of the image processing system according to the embodiment 4 is basically the same as that of the above-described embodiment 2. Accordingly, description will be mainly made only regarding the difference therebetween.

When the user half-presses the shutter button provided in the external I/F unit 116 in the form of a two-step switch, the digital camera enters the pre-shooting mode.

Then, the color CCD 1300 performs photoelectric conversion of the image of the subject formed through the lens system 100 and the aperture 101, thereby outputting the subject image in the form of an analog image signal.

The analog image signal is amplified by the amplifier 103 giving consideration to the ISO sensitivity and the white balance, following which the analog image signal is converted by the A/D converter 104 into a digital image signal, which is stored in the buffer 105.

Description is being made in the present embodiment regarding an arrangement in which a Bayer-type primary color filter is mounted on the front face of a single image pickup device. The image pickup device is not restricted to such a CCD. Rather, CMOSs or other image pickup devices may be employed, like the above-described embodiments.

Subsequently, the image signal stored in the buffer 105 is transmitted to each of the exposure control unit 106, the focus control unit 107, and the pre-white balance unit 1301.

Of these components, the pre-white balance unit 1301 sums up for each color signal the image signal which is within a predetermined level range and which is stored in the buffer 105 (i.e., the image signal is summed up for each color), thereby calculating simple white balance coefficients. The pre-white balance unit 1301 transmits the coefficients thus calculated to the amplifier 103, which applies the gains that differ from one another in increments of color signals, thereby performing the white balance control processing.

After the processing for the focus control, exposure control, simple white balance control, etc., thus performed, when the user full-presses the shutter button provided in the external I/F unit 116 in the form of a two-step switch, the digital camera enters the real shooting mode.

Then, like the pre-shooting operation, the image signal is transmitted to the buffer 105. In the real shooting operation, the image is acquired based on the simple white balance coefficients obtained by the pre-white balance unit 1301, the exposure condition obtained by the exposure control unit 106 and the focus condition obtained by the focus control unit 107. These shooting conditions are transmitted to the control unit 115.

First, the image signal, which is obtained in the real shooting operation and which is stored in the buffer 105, is transmitted to the interpolation unit 1302.

Under the control of the control unit 115, the interpolation unit 1302 creates three image signals, i.e., R, G, and B image signals using known interpolation processing, and transmits the image signals thus created to the Y/C separation unit 1303.

Under the control of the control unit 115, the Y/C separation unit 1303 separates the R, G, and B signals into the luminance signal Y and the color difference signals Cb and Cr as represented by the following Expression 17.

The luminance signal and the color difference signals thus calculated by the Y/C separation unit 1303 are transmitted to and stored in the buffer 1304.

Under the control of the control unit 115, the noise processing unit 600 sequentially extracts the 3×3 pixel size target region $P_{ij}$ including the target pixel $P_{11}$ as shown in FIG. 2 in increments of individual luminance signal and color difference signals. Then, the noise processing unit 600 estimates the amount of noise with respect to the target pixel $P_{11}$ based upon a noise model as disclosed in Japanese Unexamined Patent Application Publication No. 2005-175718 so as to perform smoothing processing. It should be noted that the estimated amount of noise of the luminance signal will be represented by "NY" hereafter. The luminance signal subjected to the smoothing processing will be represented by "NR_Y" hereafter. The color difference signals subjected to the smoothing processing will be represented by "NR_Cb" and "NR_Cr" hereafter. The noise processing unit 600 transmits the estimated amount of noise NY with respect to the luminance signal to the false edge estimation unit 601, and transmits the luminance signal NR_Y and the color difference signals NR_Cb and NR_Cr thus subjected to the smoothing processing to the edge enhancement unit 112.

Under the control of the control unit 115, the edge extraction unit 109 sequentially extracts, from the luminance signal Y in the buffer 1304, the 3×3 pixel size target region $P_{ij}$ including the target pixel $P_{11}$ as shown in FIG. 2, so as to extract the edge signal E for the target pixel $P_{11}$ using a edge extraction filter as shown in FIG. 3. The edge extraction unit 109 transmits the edge signal E thus extracted to the edge correction unit 602.

Under the control of the control unit 115, the false edge estimation unit 601 reads out from the noise processing unit 600 the amount of noise NY with respect to the luminance signal, so as to estimate the false edge signal IE that arises due to the noise components for the target pixel $P_{11}$. The false edge estimation unit 601 transmits the false edge signal IE that arises due to the noise components thus estimated to the edge correction unit 602.

Under the control of the control unit 115, the edge correction unit 602 performs conversion processing on the edge signal E received from the edge extraction unit 109, using the false edge signal IE received from the false edge estimation unit 601 and a predetermined function (e.g., a cubic function as represented by the Expression 16). The edge correction unit 602 transmits the edge signal E' thus subjected to the conversion processing to the edge enhancement unit 112.

Under the control of the control unit 115, the edge enhancement unit 112 performs edge enhancement processing on the luminance signal NR_Y, which has been subjected to the smoothing processing by the noise processing unit 600, using the edge signal E' thus subjected to the conversion processing by the edge correction unit 602 as represented by the following Expression 21.

$$NR\_Y' = NR\_Y + g \cdot E' \qquad \text{[Expression 21]}$$

Note that the reference symbol g in the Expression 21 represents a predetermined gain value, which is set to a value ranging from 0.5 to 4.0, for example.

Then, the edge enhancement unit 112 transmits the luminance signal NR_Y' thus subjected to the edge enhancement processing, and the color difference signals NR_Cb and NR_Cr thus subjected to the smoothing processing, to the Y/C composition unit 1007.

Under the control of the control unit 115, the Y/C composition unit 1007 creates three RGB signals, i.e., R', G', and B' signals based upon the luminance signal Y' thus subjected to the smoothing processing and the edge enhancement processing, and the color difference signals thus subjected to the smoothing processing, according to a by the following Expression 22.

$$R' = NR\_Y' + 1.40200 NR\_Cr$$

$$G' = NR\_Y' - 0.34414 NR\_Cb - 0.71414 NR\_Cr$$

$$B' = NR\_Y' + 1.7720 NR\_Cb \qquad \text{[Expression 22]}$$

The Y/C composition unit 1007 transmits the R', G', and B' signals thus created to the signal processing unit 113.

Here, the aforementioned processing steps performed by the noise processing unit 600, the edge extraction unit 109, the false edge estimation unit 601, the edge correction unit 602, the edge enhancement unit 112, and the Y/C composition unit 1305 are performed synchronously in increments of the 3×3 pixel size target region $P_{ij}$ under the control of the control unit 115.

Under the control of the control unit 115, the signal processing unit 113 performs known color saturation enhancement processing, compression processing, etc., on the image signal thus subjected to the edge enhancement processing outputted from the edge enhancement unit 112, and transmits the signal thus processed to the output unit 114.

The output unit 114 stores the image signal outputted from the signal processing unit 113 in a storage medium such as a memory card or the like.

Description has been made above regarding an arrangement in which the image pickup unit is provided in the from of a single unit together with the image processing system. However, the present invention is not restricted to such an arrangement. Like the above-described embodiment 1, an arrangement may be made in which the image pickup device and the image processing system are provided in the form of separate units.

Description has been made above regarding a color image pickup device having a configuration in which a Bayer-type primary color filter is mounted on the front face of a single CCD. However, the present invention is not restricted to such an arrangement. Also, for example, an arrangement may be made in which a color-difference line-sequential complementary color filter is mounted on the front face of a single image pickup device. Also, the present invention may be applied to two or three image pickup devices.

Description has been made above regarding an arrangement in which such processing is performed by means of hardware. However, the present invention is not restricted to such an arrangement. Also, an arrangement may be made in which the image signal received from the color CCD 1300 is stored in a storage medium such as a memory card or the like in the form of unprocessed raw data, and additional information such as the shooting condition (e.g., the temperature, gain, white balance, etc., of the image pickup device in the shooting operation, which is received from the control unit 115) is also stored in the storage medium in the form of header information. With such an arrangement, the information stored in the storage medium may be read out and processed by a computer according to an image processing program provided in the form of software. It should be noted that the transmission of various kinds of information from the image pickup unit to the computer is not restricted to the transmission via a storage medium. Also, the various kinds of information may be transmitted via a communication line or the like.

Description will be made with reference to FIG. 35 regarding a main routine of the processing according to an image processing program. It should be noted that, of the processing steps shown in FIG. 35, generally the same processing steps as those shown in FIG. 22 described above in the embodiment 2 are denoted by the same reference numerals.

When the processing starts, the image signal is read out. Furthermore, the header information such as the temperature, gain, white balance coefficients, etc., of the image pickup device is read out (step S1).

Next, known interpolation processing is performed so as to create three color image signals (Step S80).

Subsequently, the luminance signal and the color difference signals are extracted as represented by the Expression 17 (Step S81).

Then, the 3×3 pixel size target region including the target pixel as shown in FIG. 2 is extracted for each of the luminance signal and the color difference signals (Step S2).

Subsequently, the edge signal is extracted for the target pixel with respect to the luminance signal using an isotropic edge extraction filter as shown in FIG. 3, for example (step S3).

Furthermore, as shown in FIG. 23, noise processing is performed for the target pixel with respect to each of the luminance signal and the color difference signals (Step S30).

Furthermore, as shown in FIG. 24, the false edge signal that arises due to the noise components is estimated for the target pixel with respect to the luminance signal (Step S31).

Subsequently, determination is made whether or not the absolute value of the edge signal is equal to or smaller than the false edge signal (Step S5).

In a case in which the edge signal is equal to or smaller than the false edge signal, the edge signal is converted using a cubic function as represented by the Expression 16 (Step S32).

After the processing in Step S30, in a case in which the processing in Step S32 has been performed, edge enhancement processing is performed on the luminance signal thus subjected to the noise processing, as represented by Expression 21 using the edge signal thus converted. On the other hand, after the processing in Step S30, in a case in which determination has been made in Step S5 that the absolute value of the edge signal is greater than the false edge signal, the edge signal which has not been subjected to any additional processing is employed as the "converted edge signal". Then, the edge enhancement processing is performed on the luminance signal thus subjected to the noise processing as represented by the Expression 21 using the "processed edge signal" thus employed (Step S10).

Next, determination is made whether or not the processing has been performed for all the target pixel regions (Step S11). In a case in which the processing has not been completed, the flow returns to the aforementioned Step S2, and the above-described processing is repeatedly performed for the next target pixel region.

On the other hand, in a case in which determination has been made that the processing has been completed for all the target pixel regions, three signals, i.e., R', G', and B' are created as represented by the Expression 22 (Step S82).

Subsequently, signal processing such as known color saturation processing, compression processing, etc., is performed (Step S12). Then, the image signal thus processed is outputted (Step S13), whereupon the processing series ends.

The embodiment 4 having such a configuration provides an image processing system having the following functions. That is to say, the luminance signal is separated from the image signal received from the color image pickup device so as to estimate the noise component, which is used for noise reduction processing. The false edge signal that arises due to the noise components is dynamically estimated based upon the noise component thus estimated. Then, the edge signal is corrected using the false edge signal thus estimated.

With such an image processing system, the edge signal is corrected based upon an edge signal having the same nature as that of the edge signal. Thus, such an arrangement allows the edge components to be stably extracted with high precision even if the image signal contains various kinds of noise components.

Furthermore, such an arrangement provides the noise reduction processing which suppresses the adverse effects of noise, thereby obtaining high-quality edge components while maintaining a minutely sized signal.

Furthermore, such an image processing system is applicable to a signal received from a color image pickup device. Thus, such an arrangement is applicable to various kinds of image pickup systems.

With such an arrangement, the noise processing and the edge processing are performed after the interpolation processing. Thus, such an arrangement is applicable to various kinds of image pickup systems, thereby providing a highly general-purpose image processing system.

Embodiment 5

Figure 36:
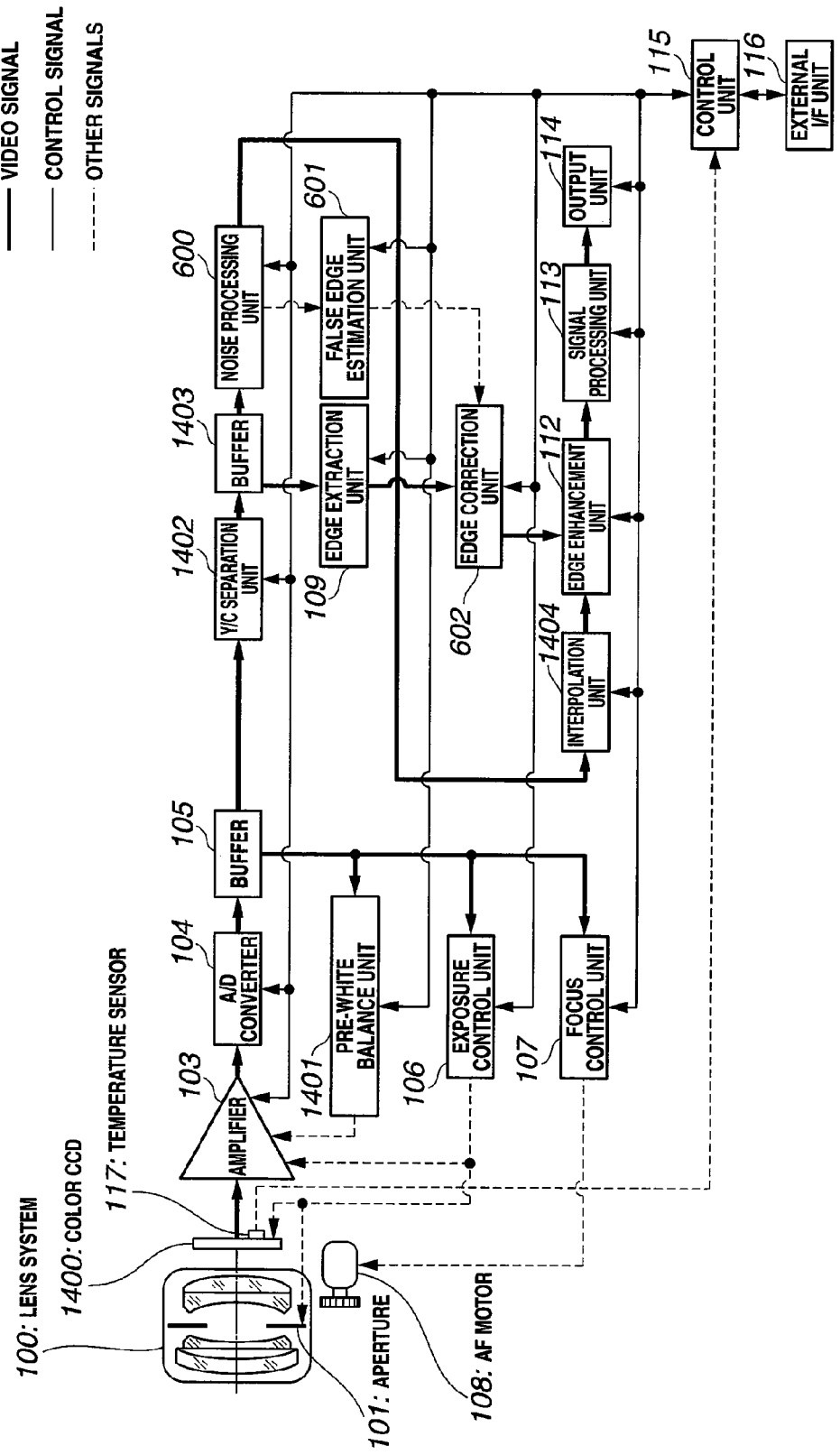
FIG. 36 is a block diagram which shows a configuration of an image processing system according to an embodiment 5 of the present invention.

FIG. 36 through FIG. 38D show an embodiment 5 according to the present invention. Specifically, FIG. 36 is a block diagram which shows a configuration of an image processing system. FIG. 37A, FIG. 37B, FIG. 37C, FIG. 37D, FIG. 37E, FIG. 37F, FIG. 37G, FIG. 37H, FIG. 37I, FIG. 37J, FIG. 37K, FIG. 37L, and FIG. 37M are diagrams which show an example of a method for separating Y/C signals from the image signal obtained from an image pickup device including a Bayer-type primary color filter mounted on the front face thereof. FIG. 38A, FIG. 38B, FIG. 38C, and FIG. 38D are diagrams which show the patterns of a horizontal edge extraction filter and a vertical edge extraction filter corresponding to color component of the target pixel.

The same components in the embodiment 5 as those in the above-described embodiments 1 through 4 are denoted by the same reference numerals, and description thereof will be omitted. Description will be mainly made only regarding the difference therebetween.

First, description will be made with reference to FIG. 36 regarding the configuration of the image processing system. FIG. 36 shows an example in which the image processing system according to the present invention is applied to a digital camera.

The image processing system shown in FIG. 36 has generally the same configuration as that of the above-described image processing system according to the embodiment 2 shown in FIG. 16, except that a part thereof is changed. Specifically, the image processing system shown in FIG. 36 has generally the same configuration as that of the embodiment 2, except that the CCD 102 shown in FIG. 16 is replaced by a color CCD 1400, and a pre-white balance unit 1401, a Y/C separation unit 1402 which is Y/C separating means, a buffer 1403, and an interpolation unit 1404 are further included. The other basic components are the same as those of the embodiment 2, and the same components will be referred to as the same terms, and are denoted by the same reference numerals.

Description will be mainly made below only regarding the difference therebetween.

The image signal acquired via the lens system 100, the aperture 101, and the color CCD 1400 is transmitted to the amplifier 103.

The buffer 105 is connected to each of the pre-white balance unit 1401, the Y/C separation unit 1402, the exposure control unit 106, and the focus control unit 107. The pre-white balance unit 1401 is connected to the amplifier 103. The Y/C separation unit 1402 is connected to the buffer 1403. The buffer 1403 is connected to each of the edge extraction unit 109 and the noise processing unit 600. The noise processing unit 600 is connected to each of the false edge estimation unit 601 and the interpolation unit 1404. The interpolation unit 1404 is connected to the edge enhancement unit 112.

Furthermore, the signal line from the temperature sensor 117 disposed near the color CCD 1400 is connected to the control unit 115.

Furthermore, the control unit 115 is connected in a bidirectional manner to the pre-white balance unit 1401, the Y/C separation unit 1402, and the interpolation unit 1404, thereby controlling these components.

Next, description will be made regarding the operation of the image processing system as shown in FIG. 36 with reference to the flow of the image signal. The operation of the image processing system according to the embodiment 5 is basically the same as that of the above-described embodiment 2. Accordingly, description will be mainly made only regarding the difference therebetween.

When the user half-presses the shutter button provided in the external I/F unit 116 in the form of a two-step switch, the digital camera enters the pre-shooting mode.

Then, the color CCD 1400 performs photoelectric conversion of the image of the subject formed through the lens system 100 and the aperture 101, thereby outputting the subject image in the form of an analog image signal.

The analog image signal is amplified by the amplifier 103 giving consideration to the ISO sensitivity and the white balance, following which the analog image signal is converted by the A/D converter 104 into a digital image signal. The digital image signal thus converted is stored in the buffer 105.

Description is being made in the present embodiment regarding the color CCD 1400 having a configuration in which a Bayer-type primary color filter as shown in FIG. 37A is mounted on the front face of a single CCD. The image pickup device is not restricted to such a CCD. Rather, CMOSs or other image pickup devices may be employed, like the above-described embodiments.

Subsequently, the image signal stored in the buffer 105 is transmitted to each of the exposure control unit 106, the focus control unit 107, and the pre-white balance unit 1401.

Of these components, the pre-white balance unit 1401 sums up for each color signal the image signal which is within a predetermined level range and which is stored in the buffer 105 (i.e., the image signal is summed up for each color), thereby calculating simple white balance coefficients. The pre-white balance unit 1401 transmits the coefficients thus calculated to the amplifier 103, which applies the gains that differ from one another in increments of color signals, thereby performing the white balance control processing.

After the processing for the focus control, exposure control, simple white balance control, etc., thus performed, when the user full-presses the shutter button provided in the external I/F unit 116 in the form of a two-step switch, the digital camera enters the real shooting mode.

Then, like the pre-shooting operation, the image signal is transmitted to the buffer 105. In the real shooting operation, the image is acquired based on the simple white balance coefficients obtained by the pre-white balance unit 1401, the exposure condition obtained by the exposure control unit 106 and the focus condition obtained by the focus control unit 107. These shooting conditions are transmitted to the control unit 115.

The image signal, which has been acquired in a single plane state in the real shooting operation and which is stored in the buffer 105, is transmitted to the Y/C separation unit 1402. The Y/C separation unit 1402 separates the luminance signal Y and the color difference signals Cb and Cr. It should be noted that, in the present embodiment, the G signal acquired in a single plane state is employed as the luminance signal Y. On the other hand, the R and B signals acquired in a single plane state are employed as the color difference signals Cb and Cr, respectively.

The luminance signal and the color difference signals thus separated by the Y/C separation unit 1402 are transmitted to and stored in the buffer 1403.

Under the control of the control unit 115, the noise processing unit 600 sequentially and separately extracts the 5×5 pixel size target regions with respect to the luminance signal as shown in FIG. 37B, FIG. 37E, FIG. 37H, and FIG. 37K, and the 5×5 pixel size target regions with respect to the color difference signals as shown in FIG. 37C, FIG. 37D, FIG. 37F, FIG. 37G, FIG. 37I, FIG. 37J, FIG. 37L, and FIG. 37M.

Accordingly, the patterns of the luminance signal Y and the color difference signals Cb and Cr with respect to the target region thus extracted by the noise processing unit 600 can be classified according to the kind of the target pixel into four patterns, i.e., the pattern as shown in FIG. 37B, FIG. 37C, and FIG. 37D, the pattern as shown in FIG. 37E, FIG. 37F, and FIG. 37G, the pattern as shown in FIG. 37H, FIG. 37I, and FIG. 37J, and the pattern as shown in FIG. 37K, FIG. 37L, and FIG. 37M.

Then, the noise processing unit 600 estimates the amount of noise with respect to the target pixel based upon a noise model as disclosed in Japanese Unexamined Patent Application Publication No. 2005-175718 so as to perform smoothing processing. It should be noted that the estimated amount of noise of the luminance signal will be represented by "NY" hereafter. The luminance signal subjected to the smoothing processing will be represented by "NR_Y" hereafter. The color difference signals subjected to the smoothing processing will be represented by "NR_Cb" and "NR_Cr" hereafter. The noise processing unit 600 transmits the estimated amount of noise NY with respect to the luminance signal to the false edge estimation unit 601, and transmits the luminance signal NR_Y and the color difference signals NR_Cb and NR_Cr thus subjected to the smoothing processing to the interpolation unit 1404.

Under the control of the control unit 115, the edge extraction unit 109 sequentially extracts the 5×5 pixel size target regions from the luminance signal Y stored in the buffer 1403, as shown in FIG. 37B, FIG. 37E, FIG. 37H, and FIG. 37K. Then, the edge extraction unit 109 extracts the edge signal E for the target pixel using the edge extraction filters as shown in FIG. 38A through FIG. 38D. Here, FIG. 38A shows an edge extraction filter Eh for extracting an edge along the horizontal direction for the target pixel of the R or B signal. FIG. 38B shows an edge extraction filter Eh for extracting an edge along the horizontal direction for the target pixel of the G signal. FIG. 38C shows an edge extraction filter Ev for extracting an edge along the vertical direction for the target pixel of the R or B signal. FIG. 38D shows an edge extraction filter Ev for extracting an edge along the vertical direction for the target pixel of the G signal.

The edge extraction unit 109 extracts the edge along the horizontal direction using the edge extraction filter Eh as shown in FIG. 38A or FIG. 38B. Furthermore, the edge extraction unit 109 extracts the edge along the vertical direction using the edge extraction filter Ev as shown in FIG. 38C or FIG. 38D. Subsequently, the edge extraction unit 109 calculates the edge signal E as represented by the Expression 1. The edge extraction unit 109 transmits the edge signal E thus extracted to the edge correction unit 602.

Under the control of the control unit 115, the false edge estimation unit 601 reads out from the noise processing unit 600 the amount of noise NY with respect to the luminance signal so as to estimate the false edge signal IE with respect to the target pixel that arises due to the estimated noise component. The false edge estimation unit 601 transmits the estimated false edge signal IE that arises due to the noise component to the edge correction unit 602.

Under the control of the control unit 115, the edge correction unit 602 performs conversion processing on the edge signal E received from the edge extraction unit 109 using the false edge signal IE received from the false edge estimation unit 601 and a predetermined function (e.g., a cubic function as represented by the Expression 16). The edge correction unit 602 transmits the edge signal E' thus subjected to the conversion processing to the edge enhancement unit 112.

Under the control of the control unit 115, the interpolation unit 1404 reads out from the noise processing unit 600 the luminance signal NR_Y and the color difference signals NR_Cb and VR_Cr, which have been subjected to the noise processing. Then, the interpolation unit 1404 performs known interpolation processing on the luminance signal NR_Y and the color difference signals NR_Cb and VR_Cr so as to create the luminance signal and the color difference signals in a three plane state. The interpolation unit 1404 transmits the luminance signal and the color difference signals thus created in a three plane state to the edge enhancement unit 112.

Under the control of the control unit 115, the edge enhancement unit 112 performs edge enhancement processing on the luminance signal NR_Y, which has been subjected to the interpolation processing by the interpolation unit 1404, as represented by the Expression 21 using the edge signal E' subjected to the conversion processing by the edge correction unit 602. Then, the edge enhancement unit 112 transmits the luminance signal NR_Y' thus subjected to the edge enhancement processing to the signal processing unit 113, in addition to the color difference signals NR_Cb and NR_Cr thus subjected to the interpolation processing. It should be noted that, in the present embodiment, the G signal is used as the luminance signal Y, and the R and B signals are used as the color difference signals Cb and Cr. Thus, with such an arrangement, the signal processing unit 113 performs the processing of these signals without involving the Y/C composition processing.

It should be noted that the aforementioned processing steps performed by the noise processing unit 600, the edge extraction unit 109, the false edge estimation unit 601, the edge correction unit 602, the interpolation unit 1404, and the edge enhancement unit 112 are performed synchronously in increments of the 5×5 pixel size target region $P_{ij}$ under the control of the control unit 115.

Under the control of the control unit 115, the signal processing unit 113 performs known color saturation enhancement processing, compression processing, etc., on the image signal thus subjected to the edge enhancement processing outputted from the edge enhancement unit 112, and transmits the signal thus processed to the output unit 114.

The output unit 114 stores the image signal outputted from the signal processing unit 113 in a storage medium such as a memory card or the like.

Description has been made above regarding an arrangement in which the image pickup unit is provided in the from of a single unit together with the image processing system. However, the present invention is not restricted to such an arrangement. Like the above-described embodiment 1, an arrangement may be made in which the image pickup device and the image processing system are provided in the form of separate units.

Description has been made above regarding an arrangement in which such processing is performed by means of hardware. However, the present invention is not restricted to such an arrangement. Also, an arrangement may be made in which the image signal received from the color CCD 1400 is stored in a storage medium such as a memory card or the like in the form of unprocessed raw data, and additional information such as the shooting condition (e.g., the temperature, gain, white balance coefficients, etc., of the image pickup device in the shooting operation from the control unit 115) is also stored in the storage medium in the form of header information. With such an arrangement, the information stored in the storage medium may be read out and processed by a computer according to an image processing program provided in the form of software. It should be noted that the transmission of various kinds of information from the image pickup unit to the computer is not restricted to the transmission via a storage medium. Also, the various kinds of information may be transmitted via a communication line or the like.

The embodiment 5 having such a configuration provides an image processing system having the following functions. That is to say, the luminance signal is separated from the image signal received from the color image pickup device so as to estimate the noise component, which is used for noise reduction processing. The false edge signal that arises due to the noise components is dynamically estimated based upon the noise component thus estimated. Then, the edge signal is corrected using the false edge signal thus estimated.

With such an image processing system, the edge signal is corrected based upon an edge signal having the same nature as that of the edge signal. Thus, such an arrangement allows the edge components to be stably extracted with high precision even if the image signal contains various kinds of noise components.

Furthermore, such an arrangement provides the noise reduction processing which suppresses the adverse effects of noise, thereby obtaining high-quality edge components while maintaining a minutely sized signal.

Furthermore, such an arrangement employs a combination of the noise reduction processing and the edge signal correction processing. This reduces the system scale, thereby providing a low-cost system.

Furthermore, such an image processing system is applicable to a signal received from a color image pickup device. Thus, such an arrangement is applicable to various kinds of image pickup systems.

In addition, with such an arrangement, the noise processing and the edge extraction processing are performed on an image signal in a single plane state before correction, thereby providing a high-quality image signal.

It should be noted that the present invention is not restricted to the above-described embodiments. Rather, various changes and applications may be made without departing from the spirit of the present invention.

[Additions]

The embodiments described above in detail provide the following configurations.

[Addition 1]

An image processing system for processing an image signal received from an image pickup device, comprising:

edge extracting means which extracts an edge signal from the image signal;

false edge estimating means which estimates an edge signal that arises due to noise components based upon the image signal; and edge correcting means which corrects the edge signal based upon the edge signal that arises due to the noise components.

Corresponding Embodiments of the Present Invention and Preferable Applications

This addition relates to the embodiment 1, the embodiment 2, the embodiment 3, the embodiment 4, and the embodiment 5. The edge extracting means corresponds to the edge extraction unit 109 shown in FIG. 1, FIG. 13, FIG. 16, FIG. 25, FIG. 34, and FIG. 36. The false edge estimating means corresponds to the false edge estimation unit 110 shown in FIG. 1, FIG. 5, FIG. 12, and FIG. 13, the false edge estimation unit 601 shown in FIG. 16, FIG. 18, and FIG. 19, or the false edge estimation unit 105 shown in FIG. 25, FIG. 28 and FIG. 29. The edge correcting means corresponds to the edge correction unit 111 shown in FIG. 1, FIG. 10, and FIG. 13, the edge correction unit 602 shown in FIG. 16 and FIG. 20, or FIG. 34 and FIG. 36, or the edge correction unit 1006 shown in FIG. 25 and FIG. 30.

Examples of preferable applications of the present invention include an image processing system in which an edge signal is extracted by the edge extraction unit 109, the edge signal that arises due to the noise components is estimated by the false edge estimation unit 110, the false edge estimation unit 601, or the false edge estimation unit 1005, and the edge signal is corrected based upon the edge signal that arises due to the noise components by the edge correction unit 111, the edge correction unit 602, or the edge correction unit 1006.

(Operation)

The edge signal that arises due to the noise components is dynamically estimated. Furthermore, the edge signal from the raw signal is corrected based upon the edge signal that arises due to the noise components.

(Advantage)

The edge signal is corrected based upon an edge signal having the same nature as that of the edge signal. Thus, such an arrangement provides high-precision and stable extraction of the edge components even if the image signal contains various kinds of noises.

[Addition 2]

The image processing system described in the Addition 1, further including Y/C separating means which separates a luminance signal from the image signal, wherein the edge extracting means extracts the edge signal from the luminance signal, and wherein the false edge estimating means estimates an edge signal that arises due to noise components based upon the luminance signal.

Corresponding Embodiments of the Present Invention and Preferable Applications

This Addition relates to the embodiment 3. The Y/C separating means corresponds to the Y/C separation unit 1003 shown in FIG. 25. The edge extracting means corresponds to the edge extraction unit 109 shown in FIG. 25. The false edge estimating means corresponds to the false edge estimation unit 1005 as shown in FIG. 25, FIG. 28 and FIG. 29.

Examples of preferable applications of the present invention include an image processing system in which the luminance signal is separated from the image signal by the Y/C separation unit 1003, the edge signal is extracted from the luminance signal by the edge extraction unit 109, and the edge signal of the luminance signal that arises due to the noise components is estimated by the false edge estimation unit 1005.

(Operation)

The luminance signal is separated from the image signal received from the image pickup device so as to dynamically estimate the edge signal that arises due to noise components. Furthermore, the edge signal from the luminance signal is corrected based upon the edge signal that arises due to the noise components.

(Advantages)

The edge signal is corrected based upon an edge signal having the same nature as that of the edge signal. Thus, such an arrangement provides high-precision and stable extraction of the edge components even if the image signal contains various kinds of noises. Furthermore, such an image processing system is applicable to a signal received from a color image pickup device. Thus, such an arrangement is applicable to various kinds of image pickup systems.

[Addition 3]

The image processing system described in Addition 1, further including noise processing means which performs noise reduction processing on the image signal, wherein the false edge estimating means estimates an edge signal that arises due to noise components, based upon predetermined information received from the noise processing means.

Corresponding Embodiments of the Present Invention and Preferable Applications

This Addition relates to the embodiment 2. The noise processing means corresponds to the noise processing unit 600 shown in FIG. 16 and FIG. 17. The false edge estimating means corresponds to the false edge estimation unit 601 shown in FIG. 16, FIG. 18, and FIG. 19.

Examples of preferable applications of the present invention include an image processing system in which the noise processing unit 600 estimates the noise components of an image signal so as to perform the noise reduction processing, and the false edge estimation unit 601 estimates, based upon the noise components thus estimated, an edge signal that arises due to noise components.

(Operation)

The noise components are estimated so as to perform the noise reduction processing. Furthermore, the edge signal that arises due to the noise components is dynamically estimated based upon the noise components thus estimated.

(Advantages)

The edge signal is corrected based upon an edge signal having the same nature as that of the edge signal. Thus, such an arrangement provides high-precision and stable extraction of the edge components even if the image signal contains various kinds of noises. Furthermore, such an arrangement provides the noise reduction processing which suppresses the adverse effects of noise, thereby obtaining high-quality edge components while maintaining a minutely sized signal. Moreover, such an arrangement employs a combination of the noise reduction processing and the edge signal correction processing. This reduces the system scale, thereby providing a low-cost system.

[Addition 4]

The image processing system described in Addition 1 further including:

noise processing means which performs noise reduction processing on the image signal; and Y/C separating means which separates a luminance signal from the image signal, wherein the edge extracting means extracts an edge signal from the luminance signal, and wherein the false edge estimating means estimates an edge signal that arises due to noise components based upon predetermined information received from the noise processing means.

Corresponding Embodiments of the Present Invention and Preferable Applications

This Addition relates to the embodiment 4 and the embodiment 5. The noise processing means corresponds to the noise processing unit 600 shown in FIG. 34 and FIG. 36. The Y/C separating means corresponds to the Y/C separation unit 1303 shown in FIG. 34 and the Y/C separation unit 1402 shown in FIG. 36. The edge extracting means corresponds to the edge extraction unit 109 shown in FIG. 34 and FIG. 36. The false edge estimating means corresponds to the false edge estimation unit 601 shown in FIG. 34 and FIG. 36.

Examples of preferable applications of the present invention include an image processing system in which the noise processing unit 600 estimates the noise components of the image signal so as to perform noise reduction processing, the Y/C separation unit 1303 or the Y/C separation unit 1402 separates a luminance signal from the image signal, the edge extraction unit 109 extracts an edge signal from a raw signal which has not been subjected to the noise reduction processing, and the false edge estimation unit 601 estimates an edge signal that arises due to the noise components based upon the noise components thus estimated.

(Operation)

The noise components are estimated so as to perform the noise reduction processing. Furthermore, a luminance signal is extracted from an image signal received from the image pickup device. Moreover, an edge signal that arises due to the noise components is dynamically estimated based upon the noise components thus estimated.

(Advantages)

The edge signal is corrected based upon an edge signal having the same nature as that of the edge signal. Thus, such an arrangement provides high-precision and stable extraction of the edge components even if the image signal contains various kinds of noises. Furthermore, such an arrangement provides the noise reduction processing which suppresses the adverse effects of noise, thereby obtaining high-quality edge components while maintaining a minutely sized signal. Moreover, such an arrangement employs a combination of the noise reduction processing and the edge signal correction processing. This reduces the system scale, thereby providing a low-cost system. Furthermore, such an arrangement is applicable to a signal received from a color image pickup device. Thus, such an arrangement is applicable to various kinds of image pickup systems.

[Addition 5]

The image processing system described in Addition 1, further including edge enhancement means which performs enhancement processing on the image signal based upon the corrected edge signal.

Corresponding Embodiments of the Present Invention and Preferable Applications

This Addition relates to the embodiment 1 and embodiment 3. The edge enhancement means corresponds to the edge enhancement unit 112 shown in FIG. 13 and FIG. 25.

Examples of preferable applications of the present invention include an image processing system in which the edge enhancement unit 112 performs edge enhancement processing on an image signal received from an image pickup device.
(Operation)

The image signal is subjected to edge enhancement processing using an edge signal corrected based upon an edge signal that arises due to noise components.
(Advantages)

Such an arrangement provides high-precision and stable edge enhancement processing even if the image signal contains various kinds of noises, thereby providing high-quality image processing.

[Addition 6]

The image processing system described in Addition 3 or Addition 4, further including edge enhancement means which performs edge enhancement processing on an image signal subjected to the noise reduction processing.

Corresponding Embodiments of the Present Invention and Preferable Applications

This Addition relates to the embodiment 2, the embodiment 4, and the embodiment 5. The edge enhancement means corresponds to the edge enhancement unit 112 shown in FIG. 16, FIG. 34, and FIG. 36.

Examples of preferable applications of the present invention include an image processing system in which the edge enhancement unit 112 performs edge enhancement processing on the image signal subjected to the noise reduction processing.
(Operation)

Edge enhancement processing is performed on an image signal, which has been subjected to the noise reduction processing, using the edge signal corrected based upon the edge signal that arises due to noise components.
(Advantages)

Such an arrangement provides high-precision and stable edge enhancement processing even if the image signal contains various kinds of noises, thereby providing high-quality image processing. Furthermore, such an arrangement enables a high-quality image signal to be created while suppressing the adverse effects of noise.

[Addition 7]

The image processing system described in Addition 1, wherein the false edge estimating means includes:

storage means which stores a parameter group with respect to a basic edge model;

parameter selecting means which selects a necessary parameter from the parameter group based upon the image signal; and interpolating means which obtains an edge signal that arises due to noise components by performing an interpolation computation based on the image signal and the parameter thus selected.

Corresponding Embodiments of the Present Invention and Preferable Applications

This Addition relates to the embodiment 1. The storage means corresponds to the parameter ROM 401 shown in FIG. 12. The parameter selecting means corresponds to the parameter selection unit 204 shown in FIG. 12. The interpolating means corresponds to the interpolation unit 205 shown in FIG. 12.

Examples of preferable applications of the present invention include an image processing system in which the parameter ROM 401 stores beforehand coefficients for a basic edge model used for estimating an edge signal that arises due to the noise components, which have been obtained based upon measurement results. Furthermore, with such an arrangement, the parameter selection unit 204 selects a coefficient for the basic edge model. Then, the interpolation unit 205 obtains an edge signal that arises due to noise components based upon the image signal and the basic edge model.
(Operation)

The interpolation processing is performed based upon the image signal and the basic edge model so as to obtain an edge signal that arises due to noise components.
(Advantages)

With such an arrangement, an edge signal that arises due to noise components is calculated based upon a model, thereby providing high-precision estimation of an edge signal. Furthermore, the interpolation processing can be implemented in a simple form, thereby providing a low-cost system.

[Addition 8]

The image processing system described in Addition 1, wherein the false edge estimating means includes table conversion means having a function whereby, upon input of the image signal, an edge signal that arises due to noise components is outputted.

Corresponding Embodiments of the Present Invention and Preferable Applications

This Addition relates to the embodiment 3. The table conversion means corresponds to the false edge table unit 1101 as shown in FIG. 29.

Examples of preferable applications of the present invention include an image processing system in which the edge signal that arises due to noise components is obtained based upon the image signal by the false edge table unit 1101.
(Operation)

With such an arrangement, an edge signal that arises due to noise components is obtained using an image signal and a conversion table.
(Advantages)

With such an arrangement, an edge signal that arises due to noise components is obtained using a conversion table, thereby providing high-precision and high-speed estimation of an edge signal.

[Addition 9]

The image processing system described in Addition 1, wherein the false edge estimating means includes:

storage means which stores a parameter group with respect to a basic edge model;

collection means which collects information with respect to the temperature value of the image pickup device and the gain value with respect to the image signal;

imparting means which imparts a standard value if the collection means cannot collect the information;

parameter selecting means which selects a necessary parameter from the parameter group based upon the information received from the collection means or the imparting means and the image signal; and interpolating means which obtains s an edge signal that arises due to noise components by performing an interpolation computation based upon the image signal and the parameter thus selected.

Corresponding Embodiments of the Present Invention and Preferable Applications

This Addition relates to the embodiment 1. The storage means corresponds to the parameter ROM 203 shown in FIG.

5. The collection means corresponds to the temperature sensor 117 and the control unit 115 shown in FIG. 1 and the gain calculation unit 201 shown in FIG. 5. The imparting means corresponds to the standard value imparting unit 202 shown in FIG. 5. The parameter selecting means corresponds to the parameter selection unit 204 shown in FIG. 5. The interpolating means corresponds to the interpolation unit 205 and the correction unit 206 shown in FIG. 5.

Examples of preferable applications of the present invention include an image processing system in which the temperature sensor 117, the control unit 115, and the gain calculation unit 201 collects the information used for estimating an edge signal that arises due to noise components. With such an arrangement, in a case in which the information cannot be obtained from the temperature sensor 117, the control unit 115, or the gain calculation unit 201, the standard value imparting unit 202 sets a standard value. Furthermore, the parameter ROM 203 stores beforehand the coefficients of the basic edge model and the correction coefficients, which are used for estimating an edge signal that arises due to noise components, and which have been obtained based upon measurement results. Moreover, the parameter selection unit 204 selects a coefficient of the basic edge model and a correction coefficient. Then, the edge signal that arises due to the noise components is obtained by the interpolation unit 205 and the correction unit 206 based upon the image signal and the basic edge model.

(Operation)

With such an arrangement, various kinds of information with respect to an edge signal that arises due to noise components is dynamically obtained every time an image is acquired. In a case in which the information cannot be obtained, a standard value is set. Then, the edge signal that arises due to noise components is obtained by performing interpolation processing based upon these various kinds of information, the image signal, and the basic edge model.

(Advantages)

Such an arrangement dynamically accommodates the condition that can change every time an image is acquired, thereby providing high-precision estimation of an edge signal that arises due to noise components. Furthermore, such an arrangement allows the edge signal that arises due to noise components to be estimated even if necessary information cannot be obtained, thereby ensuring stable processing results. Moreover, with such an arrangement, the edge signal that arises due to noise components is calculated based upon a model, thereby allowing the edge signal to be estimated with high precision. In addition, the interpolation processing is implemented in a simple form, thereby offering a low-cost system.

[Addition 10]

The image processing system described in Addition 1, wherein the false edge estimating means includes:

collection means which collects the information with respect to the temperature value using of the image pickup device and the gain value with respect to the image signal;

imparting means which imparts a standard value if the collection means cannot acquire the information; and table conversion means having a function whereby, upon input of the information received from the collection means or the imparting means and the image signal, an edge signal that arises due to noise components is outputted.

Corresponding Embodiments of the Present Invention and Preferable Applications

This Addition relates to the embodiment 3. The collection means corresponds to the temperature sensor 117 and the control unit 115 shown in FIG. 25, and the gain calculation unit 201 as shown in FIG. 28. The imparting means corresponds to the standard value imparting unit 202 as shown in FIG. 28. The table conversion means corresponds to the false edge table unit 1100 as shown in FIG. 28.

Examples of preferable applications of the present invention include an image processing system in which the temperature sensor 117, the control unit 115, and the gain calculation unit 201 collects the information used for estimating an edge signal that arises due to noise components. With such an arrangement, in a case in which the information cannot be obtained from the temperature sensor 117, the control unit 115, or the gain calculation unit 201, the standard value imparting unit 202 sets a standard value. Furthermore, the edge signal that arises due to noise components is obtained by the false edge table unit 1100 based upon the image signal.

(Operation)

With such an arrangement, various kinds of information with respect to an edge signal that arises due to noise components is dynamically obtained every time an image is acquired. In a case in which the information cannot be obtained, a standard value is set. Then, the edge signal that arises due to noise components is obtained using the information and the image signal with reference to a conversion table.

(Advantages)

Such an arrangement dynamically accommodates according to the condition that can change every time an image is acquired, thereby providing high-precision estimation of an edge signal that arises due to noise components. Furthermore, such an arrangement allows the edge signal that arises due to noise components to be estimated even if necessary information cannot be obtained, thereby ensuring stable processing results. Moreover, with such an arrangement, the edge signal that arises due to noise components is calculated with reference to a conversion table, thereby offering high-precision and high-speed estimation of an edge signal.

[Addition 11]

The image processing system described in Addition 3 or Addition 4, wherein the noise processing means includes:

noise estimating means which estimates an amount of noise based upon the image signal; and noise reducing means which performs smoothing processing on the image signal based upon the amount of noise.

Corresponding Embodiments of the Present Invention and Preferable Applications

This Addition relates to the embodiment 2. The noise estimating means corresponds to the temperature sensor 117 and the control unit 115 shown in FIG. 16, and the gain calculation unit 701, the standard value imparting unit 702, and the noise table unit 703 shown in FIG. 17. The noise reducing means corresponds to the first smoothing unit 705 and the second smoothing unit 706 shown in FIG. 17.

Examples of preferable applications of the present invention include an image processing system in which the information used for estimating the amount of noise is collected by means of the temperature sensor 117, the control unit 115, and the gain calculation unit 701. In a case in which the information cannot be obtained from the temperature sensor 117, the control unit 115, or the gain calculation unit 701, the standard value imparting unit 702 sets a standard value. Furthermore, the amount of noise is estimated by the noise table unit 703. In a case in which determination has been made that the amount of noise thus estimated is within a noise range, the first smoothing unit 705 performs smoothing processing on the image signal. On the other hand, in a case in which determination has been made that the amount of noise thus estimated is outside the noise range, the second smoothing unit 706 performs smoothing processing on the image signal.

(Operation)

With such an arrangement, various kinds of information with respect to the amount of noise is dynamically acquired every time an image is acquired. In a case in which the information cannot be obtained, a standard value is set. Then, the amount of noise is estimated with reference to a table using the information thus acquired. In a case in which determination has been made that the amount of noise is within a noise range, smoothing processing is performs on the image signal. On the other hand, in a case in which determination has been made that the amount of noise is outside the noise range, correction processing is performs on the image signal.

(Advantages)

Such an arrangement dynamically accommodates the condition that can change every time an image is acquired, thereby providing high-precision estimation of the amount of noise. Furthermore, such an arrangement allows the amount of noise to be estimated even if necessary information cannot be obtained, thereby ensuring stable noise reduction effects. Moreover, with such an arrangement, the amount of noise is calculated with reference to a table, thereby providing high-speed processing. Moreover, such an arrangement employs a combination of the smoothing processing and the correction processing, thereby obtaining a high-quality signal without involving discontinuity in the noise reduction processing.

[Addition 12]

The image processing system described in addition 11, wherein the false edge estimating means includes:

storage means which stores a parameter group with respect to a basic edge model;

parameter selecting means which selects a necessary parameter from the parameter group based upon the amount of noise received from the noise processing means; and interpolating means which obtains an edge signal that arises due to noise components by performing interpolation computation base on the amount of noise received from the noise processing means and the parameter thus selected.

Corresponding Embodiments of the Present Invention and Preferable Applications

Addition relates to the embodiment 2. The storage means corresponds to the parameter ROM 801 as shown in FIG. 18. The parameter selecting means corresponds to the parameter selection unit 800 as shown in FIG. 18. The interpolating means corresponds to the interpolation unit 802 as shown in FIG. 18.

Examples of preferable applications of the present invention include an image processing system in which the parameter ROM 801 stores beforehand the coefficients of a basic edge model which are used for estimating an edge signal that arises due to noise components and which have been obtained based upon measurement results. With such an arrangement, the parameter selection unit 800 selects a coefficient for the basic edge model. Then, the edge signal that arises due to noise components is calculated by the interpolation unit 802 based upon the amount of noise and the basic edge model.

(Operation)

The edge signal that arises due to noise components is obtained by performing interpolation processing based upon the amount of noise and the basic edge model.

(Advantages)

The edge signal that arises due to noise components is calculated based upon a model, thereby allowing the edge signal to be estimated with high precision. Furthermore, the interpolation processing implemented in a simple form, thereby offering a low-cost system.

[Addition 13]

The image processing system described in Addition 11, wherein the false edge estimating means includes table conversion means having a function whereby, upon input of an amount of noise from the noise processing means an edge signal that arises due to noise components is outputted.

Corresponding Embodiments of the Present Invention and Preferable Applications

This Addition relates to the embodiment 2. The storage means corresponds to the false edge table unit 803 as shown in FIG. 19.

Examples of preferable applications of the present invention include an image processing system in which an edge signal that arises due to noise components is obtained based upon the amount of noise by means of the false edge table unit 803.

(Operation)

An edge signal that arises due to noise components is obtained based upon the amount of noise with reference to a conversion table.

(Advantages)

With such an arrangement, an edge signal that arises due to noise components is calculated using a conversion table, thereby providing high-precision and high-speed estimation of an edge signal.

[Addition 14]

The image processing system described in Addition 9 or Addition 10, wherein the collection means includes temperature sensor which measures the temperature value of the image pickup device.

Corresponding Embodiments of the Present Invention and Preferable Applications

This Addition relates to the embodiment 1 and embodiment 3. The temperature sensor corresponds to the temperature sensor 117 shown in FIG. 1 and FIG. 25.

Examples of preferable applications of the present invention include an image processing system in which the temperature of the CCD 102 or the color CCD 1000 is measured by means of the temperature sensor 117 in a real-time manner.

(Operation)

The temperature of the image pickup device is measured when an image is acquired. The temperature thus measured is used as the information for estimating an edge signal that arises due to noise components.

(Advantages)

Such an arrangement dynamically adjusts its settings according to the change in temperature in the shooting step, thereby allowing the edge signal that arises due to noise components to be estimated with high precision.

[Addition 15]

The image processing system described in Addition 9 or Addition 10, wherein the collection means include gain calculating means which calculates the gain value based upon at least one of the ISO sensitivity, the exposure information, and the white-balance information.

Corresponding Embodiments of the Present
Invention and Preferable Applications

This Addition relates to the embodiment 1 and the embodiment 3. The gain calculating means corresponds to the gain calculation unit 201 and the control unit 115 as shown in FIG. 5 and FIG. 28.

Examples of preferable applications of the present invention include an image processing system in which the ISO sensitivity, the exposure information, and the white-balance information are transmitted by the control unit 115, and the gain in total in the shooting operation is calculated by the gain calculation unit 201.

(Operation)

The gain in the shooting operation is calculated based upon the ISO sensitivity, the exposure information, and the white-balance information. The gain thus calculated is used as the information for estimating an edge signal that arises due to noise components.

(Advantages)

Such an arrangement dynamically accommodates the change in the gain in the shooting operation, thereby allowing the edge signal that arises due to noise components to be estimated with high precision.

[Addition 16]

The image processing system described in Addition 1, wherein the edge correcting means includes coring means which performs coring processing on an edge signal based upon the edge signal that arises due to noise components.

Corresponding Embodiments of the Present
Invention and Preferable Applications

This Addition relates to the embodiment 1. The coring means corresponds to the addition unit 301, the subtraction unit 302, and the replacement unit 303 as shown in FIG. 10.

Examples of preferable applications of the present invention include an image processing system in which coring processing is performed on an edge signal based upon an edge signal that arises due to noise components which has been estimated by the addition unit 301, the subtraction unit 302, or the replacement unit 303.

(Operation)

Coring processing is performed on an edge signal based upon an edge signal that arises due to noise components.

(Advantages)

Coring processing is performed on an edge signal based upon an edge signal having the same nature as that of the edge signal. Such an arrangement allows the edge components to be stably obtained with high precision even if the image signal contains various kinds of noises.

[Addition 17]

The image processing system described in Addition 1, wherein the edge correcting means includes:

constant calculating means which calculates a constant term of a function used for correction of the edge signal based upon the edge signal that arises due to noise components; and function conversion means which converts the edge signal based upon the function having the constant term thus set.

Corresponding Embodiments of the Present
Invention and Preferable Applications

This Addition relates to the embodiment 2. The constant calculating means corresponds to the constant calculation unit 901 as shown in FIG. 20. The function conversion means corresponds to the conversion unit 902 as shown in FIG. 20.

Examples of preferable applications of the present invention include an image processing system in which the constant calculation unit 901 calculates a constant term of a function used for correction of the edge signal based upon an edge signal that arises due to noise components. With such an arrangement, the conversion unit 902 converts the edge signal based upon the function having the constant term set by the conversion unit 902.

(Operation)

The constant term of a function, which is to be used for correction of an edge signal, is calculated based upon an edge signal that arises due to noise components. Then, the edge signal is converted based upon the function having the constant term thus set.

(Advantages)

Such an arrangement performs optimum conversion processing according to an edge signal that arises due to noise components. Thus, such an arrangement allows the edge components to be stably obtained with high precision even if the image signal contains various kinds of noises.

[Addition 18]

The image processing system described in Addition 17, wherein, in a case in which the absolute value of the edge signal is greater than the edge signal that arises due to noise components, a linear function is employed as the function, and wherein, in a case in which the absolute value of the edge signal is equal to or smaller than the edge signal that arises due to noise components, a cubic function is employed as the function.

Corresponding Embodiments of the Present
Invention and Preferable Applications

This Addition relates to the embodiment 2.

Examples of preferable applications of the present invention include an image processing system which performs conversion of an edge signal using a combination of a linear function and a cubic function as shown in FIG. 21.

(Operation)

An edge signal is converted using a combination of a linear function and a cubic function.

(Advantages)

With such an arrangement, a combination of a linear function and a cubic function is used, thereby calculating the constant term in a simple manner. This provides high-speed and low-cost processing. Furthermore, such an arrangement ensures that the edge signal correction results are continuous, thereby providing high-quality edge signal.

[Addition 19]

The image processing system described in Addition 1, wherein the edge correcting means includes table correction means having a function whereby, upon input of the edge signal and the edge signal that arises due to noise components, a corrected edge signal is outputted.

Corresponding Embodiments of the Present
Invention and Preferable Applications

This Addition relates to the embodiment 3. The table correction means corresponds to the edge correction table unit 1200 shown in FIG. 30.

Examples of preferable applications of the present invention include an image processing system in which the edge signal is corrected by the edge correction table unit 1200 based upon the edge signal that arises due to noise components.

(Operation)

An edge signal is corrected based upon an edge signal that arises due to noise components with reference to a conversion table.

(Advantages)

With such an arrangement, an edge signal is corrected with reference to a conversion table, thereby providing high-precision and high-speed edge signal correction.

[Addition 20]

The image processing system described in Addition 2 or Addition 4, wherein the image pickup device is a single image pickup device including an RGB (red, green, and blue) Bayer-type primary color filter mounted on the front face thereof, or a single image pickup device including a Cy-Mg-Ye-G (cyan, magenta, yellow, and green) color-difference line-sequential complementary color filter mounted on the front face thereof.

Corresponding Embodiments of the Present Invention and Preferable Applications

This Addition relates to the embodiment 3 and embodiment 5.

Examples of preferable applications of the present invention include an image processing system in which a Bayer-type primary color filter as shown in FIG. 26 and FIG. 37A or a color-difference line-sequential complementary color filter as shown in FIG. 27 is mounted on the front face of a single image pickup device.

(Operation)

A single image pickup device, including a Bayer-type primary color filter or a color-difference line-sequential complementary color filter mounted on the front face thereof, is employed.

(Advantages)

Such an arrangement is highly compatible with a conventional image-pickup unit. Thus, such an arrangement is applicable to various kinds of image processing systems.

[Addition 21]

An image processing program which allows a computer to execute processing on an image signal received from an image pickup device, comprises:

an edge extraction step for extracting an edge signal from the image signal;

a false edge estimation step for estimating an edge signal that arises due to noise components based upon the image signal; and an edge correction step for correcting the edge signal based upon the edge signal that arises due to noise components.

Corresponding Embodiments of the Present Invention and Advantages

This addition is approximately the same as Addition 1. Note that the steps in this addition correspond to the steps shown in FIGS. 14 and 15, FIGS. 22 to 24, FIGS. 32 and 33, or FIG. 35.

[Addition 22]

The image processing program described in Addition 21, further including a Y/C separation step for separating a luminance signal from the image signal, wherein the edge extraction step is a step for extracting an edge signal from the luminance signal, and wherein the false edge estimation step is a step for estimating an edge signal that arises due to noise components, based upon the luminance signal.

Corresponding Embodiments of the Present Invention and Advantages

This addition is approximately the same as Addition 2. Note that the steps in Addition 22 corresponds to the steps shown in FIG. 32 and FIG. 33.

[Addition 23]

The image processing program described in Addition 21, further including a noise processing system for performing noise reduction processing on the image signal, wherein the false edge estimation step is a step for estimating an edge signal that arises due to noise components, based upon predetermined information obtained in the noise processing step.

Corresponding Embodiments of the Present Invention and Advantages

This addition is approximately the same as Addition 3. Note that the steps in this addition corresponds to the steps shown in FIG. 22, FIG. 23, and FIG. 24.

[Addition 24]

The image processing program described in Addition 21, further including:

a noise processing step for performing noise reduction processing on the image signal; and a Y/C separation step for separating a luminance signal from the image signal, wherein the edge extraction step is a step for extracting an edge signal from the luminance signal, and wherein the false edge estimation step is a step for estimating an edge signal that arises due to noise components, based upon predetermined information obtained in the noise processing step.

Corresponding Embodiments of the Present Invention and Advantages

This addition is approximately the same as Addition 4. Note that the steps in this Addition correspond to the steps shown in FIG. 35.

[Addition 25]

The image processing program described in Addition 21, wherein the false edge estimation step includes:

a parameter selection step for selecting a necessary parameter from a parameter group with respect to a basic edge model based upon the image signal; and an interpolation step for obtaining an edge signal that arises due to noise components by performing interpolation computation based upon the image signal and the parameter thus selected.

Corresponding Embodiments of the Present Invention and Advantages

This addition is approximately the same as Addition 7. Note that the steps in this addition correspond to the steps shown in FIGS. 14 and 15, FIGS. 22 to 24, FIGS. 32 and 33, or FIG. 35.

[Addition 26]

The image processing program described in Addition 21, wherein the false edge estimation step includes a table conversion step whereby, upon input of the image signal, an edge signal that arises due to noise components is outputted.

Corresponding Embodiments of the Present Invention and Advantages

This addition is approximately the same as Addition 8. Note that the steps in this addition correspond to the steps shown in FIG. 32 and FIG. 33.

[Addition 27]

The image processing program described in Addition 21, wherein the false edge estimation step includes:

a collection step for collecting information with respect to the temperature value of the image pickup device and the gain value with respect to the image signal;

an imparting step whereby, in a case in which the information cannot be obtained in the collection step, a standard value is imparted;

a parameter selection step for selecting a necessary parameter from a parameter group with respect to a basic edge model based upon the image signal and the information obtained in the collection step or the imparting step; and an interpolation step for obtaining an edge signal that arises due to noise components by performing interpolation computation based upon the image signal and the parameter thus selected.

Corresponding Embodiments of the Present Invention and Advantages

This addition is approximately the same as Addition 9. Note that the steps in this addition correspond to the steps shown in FIGS. 14 and 15, FIGS. 22 to 24, FIGS. 32 and 33, or FIG. 35.

[Addition 28]

The image processing program described in Addition 21, wherein the false edge estimation step includes:

a collection step for collecting information with respect to the temperature value of the image pickup device and the gain value with respect to the image signal;

an imparting step whereby, in a case in which the information cannot be obtained in the collection step, a standard value is imparted; and a table conversion step whereby, upon input of the image signal and the information obtained in the collection step or the imparting step, an edge signal that arises due to noise components is outputted.

Corresponding Embodiments of the Present Invention and Advantages

This addition is approximately the same as Addition 10. Note that the steps in this addition correspond to the steps shown in FIG. 32 and FIG. 33.

[Addition 29]

The image processing program described in Addition 23 or Addition 24, wherein the noise processing step includes:

a noise estimation step for estimating an amount of noise based upon the image signal; and a noise reduction step for performing smoothing processing on the image signal based upon the amount of noise.

Corresponding Embodiments of the Present Invention and Advantages

This addition is approximately the same as Addition 11. Note that the steps in this addition correspond to the steps shown in FIG. 22, FIG. 23, and FIG. 24.

[Addition 30]

The image processing program described in Addition 29, wherein the false edge estimation step includes:

a parameter selection step for selecting a necessary parameter from a parameter group with respect to a basic edge model based upon the amount of noise obtained in the noise processing step; and an interpolation step for obtaining an edge signal that arises due to noise components by performing interpolation computation based upon the amount of noise obtained in the noise processing step and the parameter thus selected.

Corresponding Embodiments of the Present Invention and Advantages

This addition is approximately the same as Addition 12. Note that the steps in this addition correspond to the steps shown in FIG. 22, FIG. 23 and FIG. 24.

[Addition 31]

The image processing program described in Addition 29, wherein the false edge estimation step includes a table conversion step whereby, upon input of the amount of noise obtained in the noise processing step, an edge signal that arises due to noise components is outputted.

Corresponding Embodiments of the Present Invention and Advantages

This addition is approximately the same as Addition 13. Note that the steps in this addition correspond to the steps shown in FIG. 22, FIG. 23, and FIG. 24.

[Addition 32]

The image processing program described in Addition 21, wherein the edge correction step includes a coring step for performing coring processing on the edge signal based upon the edge signal that arises due to noise components.

Corresponding Embodiments of the Present Invention and Advantages

This addition is approximately the same as Addition 16. Note that the steps in this addition correspond to the steps shown in FIGS. 14 and 15, FIGS. 22 to 24, FIGS. 32 and 33, or FIG. 35.

[Addition 33]

The image processing program described in Addition 21, wherein the edge correction step includes:

a constant calculation step for calculating a constant term of a function, which is to be used for correction of the edge signal, based upon the edge signal that arises due to noise components; and a function conversion step for converting the edge signal based upon the function having the constant term thus set.

Corresponding Embodiments of the Present Invention and Advantages

This addition is approximately the same as Addition 17. Note that the steps in this addition correspond to the steps shown in FIG. 22, FIG. 23, and FIG. 24.

[Addition 34]

The image processing program described in Addition 33, wherein the function conversion step is a step whereby, in a case in which the absolute value of the edge signal is greater than the edge signal that arises due to noise components, a linear function is used as the function, and whereby, in a case in which the absolute value of the edge signal is equal to or smaller than the edge signal that arises due to noise components, a cubic function is used as the function.

Corresponding Embodiments of the Present Invention and Advantages

This addition is approximately the same as Addition 18. Note that the steps in this addition correspond to the steps shown in FIG. 22, FIG. 23, and FIG. 24.

[Addition 35]

The image processing program described in Addition 21, wherein the edge correction step includes a table correction step whereby, upon input of the edge signal and the edge signal that arises due to noise components, a corrected edge signal is outputted.

Corresponding Embodiments of the Present Invention and Advantages

This addition is approximately the same as Addition 19. Note that the steps in this addition correspond to the steps shown in FIG. 32 and FIG. 33.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing system for processing an image signal received from an image pickup device, comprising:
   edge extracting means which extracts an edge signal from the image signal;
   false edge estimating means which estimates an edge signal that arises due to noise components based upon the image signal; and
   edge correcting means which corrects the edge signal based upon the edge signal that arises due to the noise components.

2. The image processing system according to claim 1, further including edge enhancement means which performs enhancement processing on the image signal based upon the corrected edge signal.

3. The image processing system according to claim 1, wherein the false edge estimating means includes:
   storage means which stores a parameter group with respect to a basic edge model;
   parameter selecting means which selects a necessary parameter from the parameter group based upon the image signal; and
   interpolating means which obtains an edge signal that arises due to noise components by performing an interpolation computation based upon the image signal and the parameter thus selected.

4. The image processing system according to claim 1, wherein the false edge estimating means includes table conversion means having a function whereby, upon input of the image signal, an edge signal that arises due to noise components is outputted.

5. The image processing system according to claim 1, wherein the edge correcting means includes coring means which performs coring processing on an edge signal based upon the edge signal that arises due to noise components.

6. The image processing system according to claim 1, wherein the edge correcting means includes table correction means having a function whereby, upon input of the edge signal and the edge signal that arises due to noise components, a corrected edge signal is outputted.

7. The image processing system according to claim 1, further including Y/C separating means which separates a luminance signal from the image signal,
   wherein the edge extracting means extracts the edge signal from the luminance signal,
   and wherein the false edge estimating means estimates an edge signal that arises due to noise components based upon the luminance signal.

8. The image processing system according to claim 7, wherein the image pickup device is a single image pickup device including an RGB (red, green, and blue) Bayer-type primary color filter mounted on the front face thereof, or a single image pickup device including a Cy-Mg-Ye-G (cyan, magenta, yellow, and green) color-difference line-sequential complementary color filter mounted on the front face thereof.

9. The image processing system according to claim 1, wherein the edge correcting means includes:
   constant calculating means which calculates a constant term of a function used for correction of the edge signal based upon the edge signal that arises due to noise components; and
   function conversion means which converts the edge signal based upon the function having the constant term thus set.

10. The image processing system according to claim 9, wherein, in a case in which the absolute value of the edge signal is greater than the edge signal that arises due to noise components, a linear function is employed as the function,
    and wherein, in a case in which the absolute value of the edge signal is equal to or smaller than the edge signal that arises due to noise components, a cubic function is employed as the function.

11. The image processing system according to claim 1, wherein the false edge estimating means includes:
    storage means which stores a parameter group with respect to a basic edge model;
    collection means which collects information with respect to the temperature value of the image pickup device and the gain value with respect to the image signal;
    imparting means which imparts a standard value if the collection means cannot collect the information;
    parameter selecting means which selects a necessary parameter from the parameter group based upon the information received from the collection means or the imparting means and the image signal; and
    interpolating means which obtains an edge signal that arises due to noise components by performing an interpolation computation based upon the image signal and the parameter thus selected.

12. The image processing system according to claim 11, wherein the collection means includes temperature sensor which measures the temperature value of the image pickup device.

13. The image processing system according to claim 11, wherein the collection means includes gain calculating means which calculates the gain value based upon at least one of the ISO sensitivity, the exposure information, and the white-balance information.

14. The image processing system according to claim 1, wherein the false edge estimating means includes:
    collection means which collects the information with respect to the temperature value of the image pickup device and the gain value with respect to the image signal;

imparting means which imparts a standard value if the collection means cannot collect the information; and table conversion means having a function whereby, upon input of the information received from the collection means or the imparting means and the image signal, an edge signal that arises due to noise components is outputted.

15. The image processing system according to claim 14, wherein the collection means includes temperature sensor which measures the temperature value of the image pickup device.

16. The image processing system according to claim 14, wherein the collection means includes gain calculating means which calculates the gain value based upon at least one of the ISO sensitivity, the exposure information, and the white-balance information.

17. The image processing system according to claim 1, further including noise processing means which performs noise reduction processing on the image signal,
wherein the false edge estimating means estimates an edge signal that arises due to noise components, based upon predetermined information received from the noise processing means.

18. The image processing system according to claim 17, further including edge enhancement means which performs edge enhancement processing on an image signal subjected to the noise reduction processing.

19. The image processing system according to claim 17, wherein the noise processing means includes:
noise estimating means which estimates an amount of noise based upon the image signal; and
noise reducing means which performs smoothing processing on the image signal based upon the amount of noise.

20. The image processing system according to claim 19, wherein the false edge estimating means includes:
storage means which stores a parameter group with respect to a basic edge model;
parameter selecting means which selects a necessary parameter from the parameter group based upon the amount of noise received from the noise processing means; and
interpolating means which obtains an edge signal that arises due to noise components by performing interpolation computation based upon the amount of noise received from the noise processing means and the parameter thus selected.

21. The image processing system according to claim 19, wherein the false edge estimating means includes table conversion means having a function whereby, upon input of an amount of noise from the noise processing means, an edge signal that arises due to noise components is outputted.

22. The image processing system according to claim 1, further including:
noise processing means which performs noise reduction processing on the image signal; and
Y/C separating means which separates a luminance signal from the image signal,
wherein the edge extracting means extracts an edge signal from the luminance signal,
and wherein the false edge estimating means estimates an edge signal that arises due to noise components based upon predetermined information received from the noise processing means.

23. The image processing system according to claim 22, further including edge enhancement means which performs edge enhancement processing on an image signal subjected to the noise reduction processing.

24. The image processing system according to claim 22, wherein the image pickup device is a single image pickup device including an RGB (red, green, and blue) Bayer-type primary color filter mounted on the front face thereof, or a single image pickup device including a Cy-Mg-Ye-G (cyan, magenta, yellow, and green) color-difference line-sequential complementary color filter mounted on the front face thereof.

25. The image processing system according to claim 22, wherein the noise processing means includes:
noise estimating means which estimates an amount of noise based upon the image signal; and
noise reducing means which performs smoothing processing on the image signal based upon the amount of noise.

26. The image processing system according to claim 25, wherein the false edge estimating means includes:
storage means which stores a parameter group with respect to a basic edge model;
parameter selecting means which selects a necessary parameter from the parameter group based upon the amount of noise received from the noise processing means; and
interpolating means which obtains an edge signal that arises due to noise components by performing interpolation computation based upon the amount of noise received from the noise processing means and the parameter thus selected.

27. The image processing system according to claim 25, wherein the false edge estimating means includes table conversion means having a function whereby, upon input of an amount of noise from the noise processing means, an edge signal that arises due to noise components is outputted.

28. An image processing method for processing an image signal received from an image pickup device, comprising:
an edge extraction step for extracting an edge signal from the image signal;
a false edge estimation step for estimating an edge signal that arises due to noise components based upon the image signal; and
an edge correction step for correcting the edge signal based upon the edge signal that arises due to noise components.

29. An image processing system for processing an image signal received from an image pickup device, comprising:
an edge extracting unit which extracts an edge signal from the image signal;
a false edge estimating unit which estimates an edge signal that arises due to noise components based upon the image signal; and
an edge correcting unit which corrects the edge signal based upon the edge signal that arises due to the noise components.

30. An image processing program product which allows a computer to execute processing on an image signal received from an image pickup device, comprising:
a first module which extracts an edge signal from the image signal;
a second module which estimates an edge signal that arises due to noise components based upon the image signal; and
a third module which corrects the edge signal based upon the edge signal that arises due to the noise components.

* * * * *